United States Patent
Wang et al.

(10) Patent No.: US 11,032,132 B2
(45) Date of Patent: Jun. 8, 2021

(54) RESOURCE LINK BINDING MANAGEMENT

(71) Applicant: CONVIDA WIRELESS, LLC, Wilmington, DE (US)

(72) Inventors: Chonggang Wang, Princeton, NJ (US); Mahmoud Watfa, Saint Leonard (CA); Xu Li, Plainsboro, NJ (US); Quang Ly, North Wales, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/638,601

(22) PCT Filed: Aug. 23, 2018

(86) PCT No.: PCT/US2018/047684
§ 371 (c)(1),
(2) Date: Feb. 12, 2020

(87) PCT Pub. No.: WO2019/040709
PCT Pub. Date: Feb. 28, 2019

(65) Prior Publication Data
US 2020/0177681 A1 Jun. 4, 2020

Related U.S. Application Data

(60) Provisional application No. 62/549,012, filed on Aug. 23, 2017.

(51) Int. Cl.
*H04L 12/24* (2006.01)
*H04L 29/08* (2006.01)
(Continued)

(52) U.S. Cl.
CPC ........ *H04L 41/0803* (2013.01); *H04L 45/507* (2013.01); *H04L 47/801* (2013.01);
(Continued)

(58) Field of Classification Search
CPC ..... H04L 45/50; H04L 45/507; H04L 47/724; H04L 47/801; H04L 41/0803;
(Continued)

(56) References Cited

U.S. PATENT DOCUMENTS

| | | | |
|---|---|---|---|
| 2002/0015395 A1* | 2/2002 | Karagiannis | H04L 47/801 370/338 |
| 2012/0014385 A1* | 1/2012 | Chen | H04L 45/507 370/389 |

FOREIGN PATENT DOCUMENTS

WO 2016/109473 A1 7/2016

OTHER PUBLICATIONS

"Web of Things (WoT) Architecture, W3C Editor's Draft", (https://w3c.github.io/wot-architecture/), May 4, 2017, 52 pages.
(Continued)

*Primary Examiner* — Kyung H Shin
(74) *Attorney, Agent, or Firm* — BakerHostetler

(57) ABSTRACT

Methods and systems for Link Binding Management (LBM), including architectural design, detailed procedures, and embodiments to related standards, are described herein. In a first embodiment, an LBM Architecture A is disclosed which includes four logical entities: a Resource Creator (RC), a Source Resource Host (SRH), a Destination Resource Host (DRH), and a Link Binding Coordinator (LBC). Interactions are defined for these four entities to cooperate in order to efficiently manage link bindings (e.g. link binding creation, link binding update, etc) between source and destination resources. In a second embodiment, an LBM Architecture B is also disclosed which includes a Resource Repository (RR), a $SRH_2$, a DRH, and a LBC. Interactions on those actors are developed towards efficient link binding management. Detailed procedures for LBM Architecture B are also disclosed.

20 Claims, 45 Drawing Sheets

(51) Int. Cl.
*H04L 12/927* (2013.01)
*H04L 12/723* (2013.01)
*H04L 29/06* (2006.01)
*H04L 12/913* (2013.01)
*H04L 12/911* (2013.01)

(52) U.S. Cl.
CPC ............ *H04L 67/146* (2013.01); *H04L 45/50* (2013.01); *H04L 47/70* (2013.01); *H04L 47/724* (2013.01); *H04L 47/824* (2013.01); *H04L 47/825* (2013.01); *H04L 69/16* (2013.01); *H04L 69/167* (2013.01)

(58) Field of Classification Search
CPC ..... H04L 47/824; H04L 47/825; H04L 47/70; H04L 69/16; H04L 69/167
See application file for complete search history.

(56) References Cited

OTHER PUBLICATIONS

"Web of Things (WoT) Current Practices", http://w3c.github.io/wot/current-practices/wot-practices.html), Apr. 27, 2017, 11 pages.
"Web of Things (WoT) Thing Description, W3C Editor's Draft", (https://w3c.github.io/wot-thing-description/), Mar. 6, 2017, 43 pages.
ETSI TS 118 101 V2.10.0, Technical Specification, "oneM2M Functional Architecture (oneM2M TS-0001 version 2.10.0 Release 2)", Oct. 2016, 422 pages.
OneM2M-TS-0001 V-2014-08, "oneM2M Functional Architecture Baseline Draft", Aug. 2014, 297 pages.
Shelby et al., CoRE Working Group Internet-Draft, "Dynamic Resource Linking for Constrained RESTful Environments draft-ietf-core-dynlink-03", Mar. 2017, 16 pages.

* cited by examiner

```
{
    "@context": ["https://w3c.github.io/wot/w3c-wot-td-context.jsonld",
                 "https://w3c.github.io/wot/w3c-wot-common-context.jsonld"],
    "@type": "Sensor",
    "name": "myTempSensor",
    "base": "coap:///www.example.com:5683/temp/",
    "interactions": [
    {
            "@id": "val",
            "@type": ["Property","Temperature"],
            "unit": "celsius",
            "reference": "threshold",
            "name": "myTemp",
            "outputData": {"valueType": {"type": "number"}},
            "writable": false,
            "links": [{
                        "href": "val",
                        "mediaType": "application/json"
            }]
    },{
            "@id": "threshold",
            "@type": ["Property","Temperature"],
            "unit": "celsius",
            "name": "myThreshold",
        "outputData": {"valueType": {"type": "number"}},
        "writable": true,
        "links": [{
            "href": "thr",
            "mediaType": "application/json"
                }]
    },{
        "@type": ["Event"],
        "outputData": {"valueType": {"type": "number"}},
        "name": "myChange",
        "property": "temp",
        "links": [{
            "href": "val/changed",
            "mediaType": "application/json"
                }]
    },{
        "@type": ["Event"],
        "outputData": {"valueType": {"type": "number"}},
        "name": "myWarning",
        "links": [{
            "href": "val/high",
            "mediaType": "application/json"
                }]
    }
    ]
}
```

FIG. 5

RESOURCE LINK BINDING MANAGEMENT

CROSS-REFERENCE TO RELATED APPLICATIONS

This application claims the benefit of U.S. Provisional Patent Application No. 62/549,012, filed Aug. 23, 2017, the disclosure of which is incorporated herein by reference in its entirety.

BACKGROUND

Link binding between a source resource and a destination resource has been described, for example, in Z. Shelby et al., "Dynamic Resource Linking for Constrained RESTful Environments." Each link binding may be described and recorded as a binding entry. A binding table at a Source Resource Host (SRH) or a Destination Resource Host (DRH) may maintain some or all of the binding entries. Each binding entry may define a binding relationship between the source resource and the destination resource and may consist of a few binding attributes. Binding attributes may specify a binding method and conditions for state synchronization. The following example binding attributes have been defined:

SUMMARY

Methods and systems for Link Binding Management (LBM), including architectural design, detailed procedures, and embodiments to related standards, are described herein. In a first embodiment, an LBM Architecture A is disclosed which includes four logical entities: a Resource Creator (RC), a Source Resource Host (SRH), a Destination Resource Host (DRH), and a Link Binding Coordinator (LBC). Interactions are defined for these four entities to cooperate in order to efficiently manage link bindings (e.g. link binding creation, link binding update, etc) between source and destination resources. Detailed procedures for LBM Architecture A are disclosed including resource creation with binding support, resource discovery for link binding, link binding creation, binding-aware content synchronization, link binding update, link binding suspension, link binding restoration, and link binding cancellation.

In a second embodiment, an LBM Architecture B is also disclosed which includes a Resource Repository (RR), a SRH, a DRH, and a LBC. Interactions on those actors are developed towards efficient link binding management. Detailed procedures for LBM Architecture B are disclosed including resource registration with binding hint, resource discovery for link binding, link binding creation, link binding registration, binding-aware content synchronization, link binding update, link binding suspension, link binding restoration, and link binding cancellation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 5 shows a TD example of a temperature sensor;

DETAILED DESCRIPTION OF ILLUSTRATIVE EMBODIMENTS

Link binding between a source resource and a destination resource has been described, for example, in Z. Shelby et al., "Dynamic Resource Linking for Constrained RESTful Environments." Each link binding may be described and recorded as a binding entry. A binding table at a Source Resource Host (SRH) or a Destination Resource Host (DRH) may maintain some or all of the binding entries. Each binding entry may define a binding relationship between the source resource and the destination resource and may consist of a few binding attributes. Binding attributes may specify a binding method and conditions for state synchronization. The following example binding attributes have been defined:

Binding Method: may be defined as a Poll, Push, or Observe. In the rest of this disclosure, a binding method may also be referred to as a binding mode;

Minimum Period (pmin): may indicate the minimum time to wait (in seconds) before triggering a new state synchronization (even if it has just changed);

Maximum Period (pmax): may indicate the maximum time in seconds between two consecutive state synchronizations (regardless if it has changed);

Change step (cs): may indicate how much the value of a resource should change before triggering a new state synchronization;

Greater Than (gt): may indicate the upper limit that the resource value should cross before triggering a new state synchronization; and Less Than (lt): may indicate the lower limit that the resource value should cross before triggering a new state synchronization.

Figure 1A:
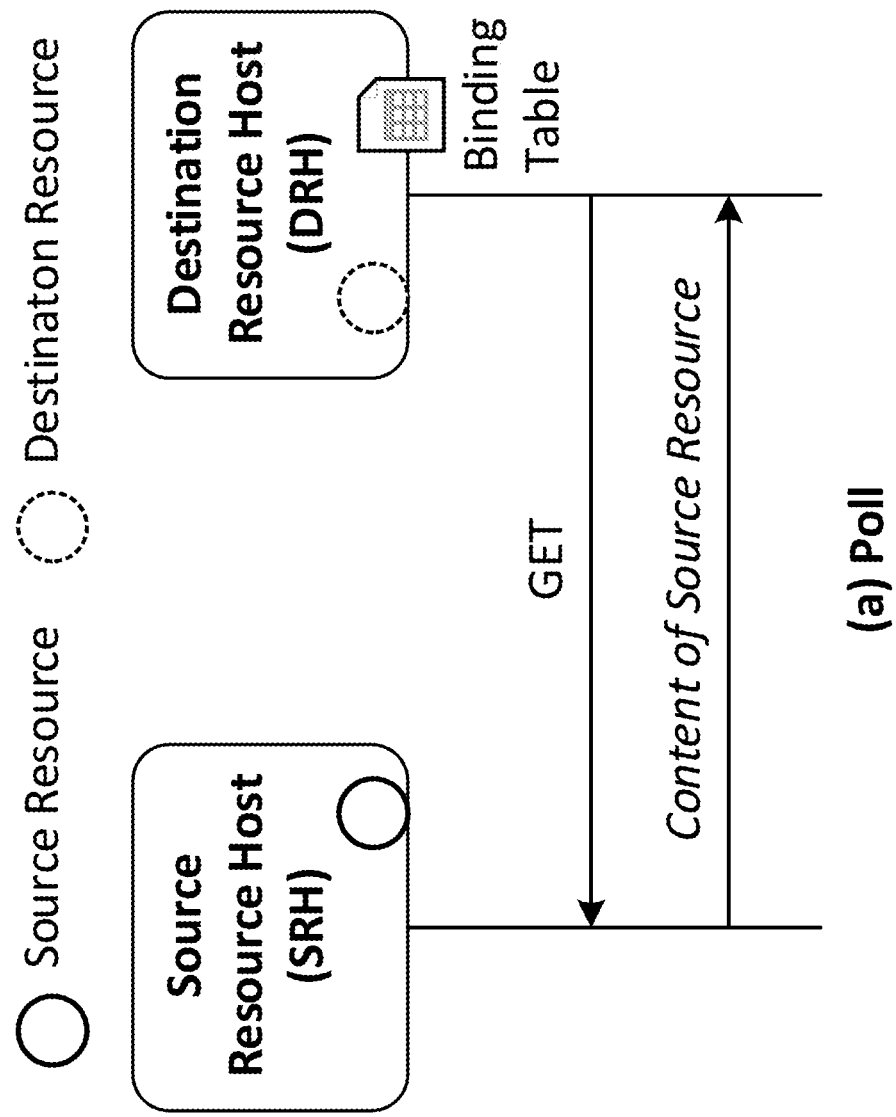
FIG. 1A shows an example call flow of a Poll binding method.
Figure 1B:
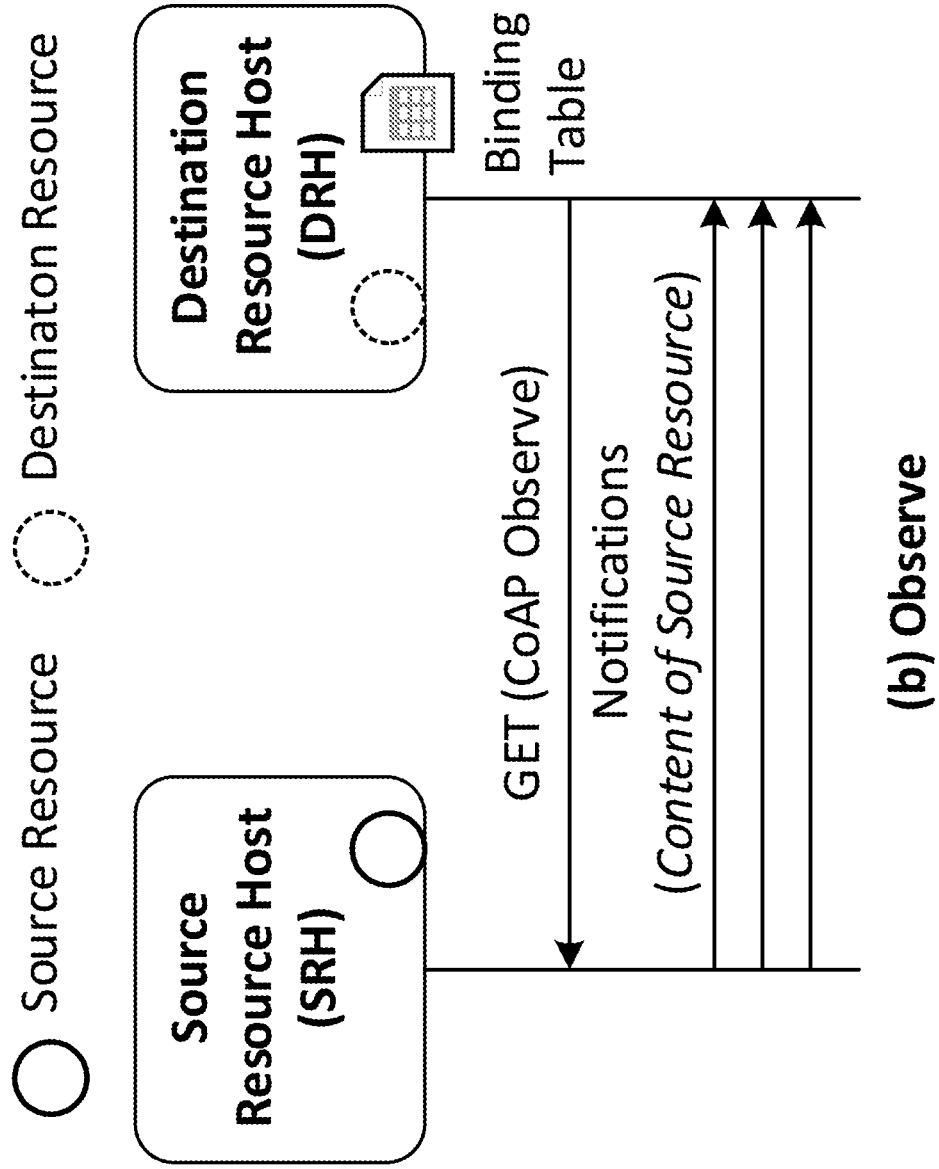
FIG. 1B shows an example call flow of an Observe binding method.
Figure 1C:
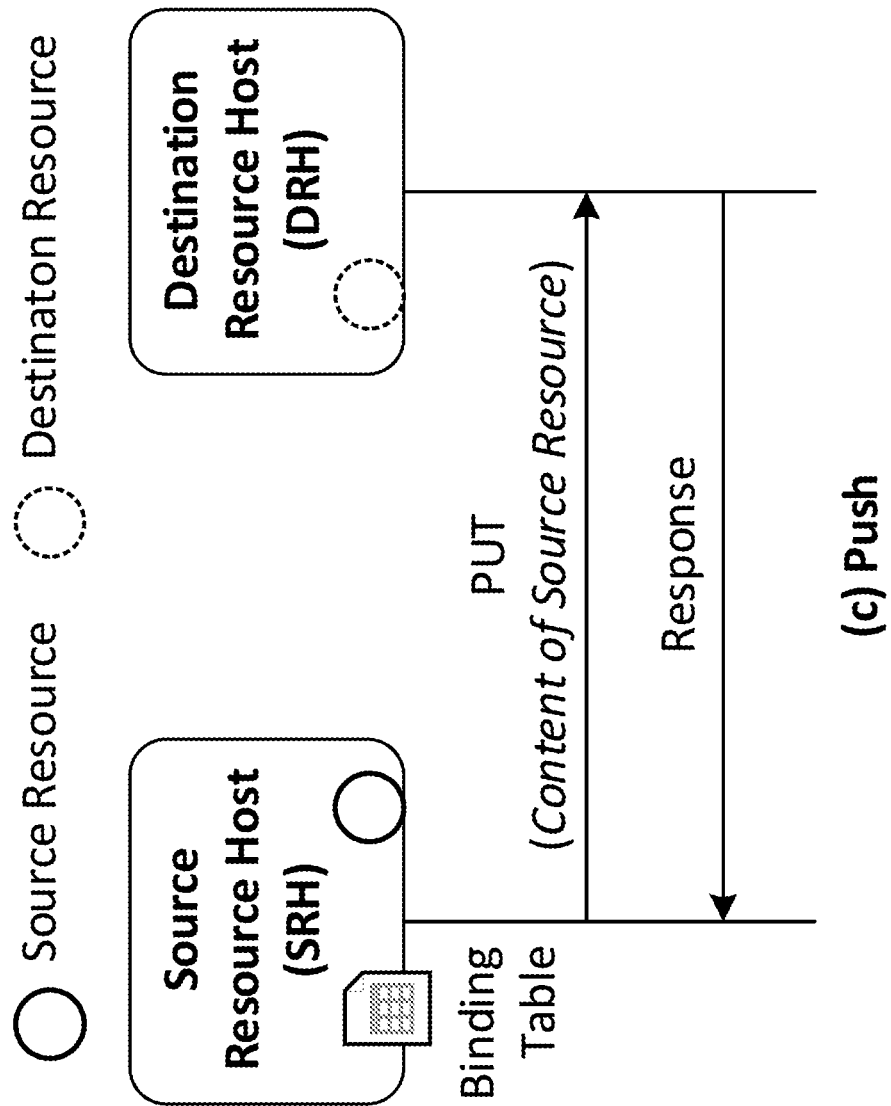
FIG. 1C shows an example call flow of a Push binding method.

The following three binding methods may be used to synchronize the content of a source resource to a destination resource, as shown in the example of FIGS. 1A-1C. It is understood that the terms binding method and binding mode may be used interchangeably.

Poll: In this method, a DRH may send periodic GET requests to a SRH to copy the content of a source resource to a destination resource. The binding entry for this method may be stored on the DRH. The DRH may need to ensure that the polling frequency does not exceed the limits defined by Minimum Period and Maximum Period attributes of the binding entry. The copying process may filter out content from the GET requests using value-based conditions (e.g., based on the Change step, Less Than, Greater Than attributes).

Observe: In this method, a DRH may create an observation/subscription relationship between the DRH and the source resource hosted on a SRH. The creation of the observation relationship may require a CoAP Observe mechanism as defined, for example, in IETF RFC7641. For each notification which is to be triggered according to some value-based conditions (e.g., based on the Change step, Less Than, Greater Than attributes), the content from the source resource may be copied to the destination resource. The binding entry for this method may be stored on the DRH.

Push: In this method, a SRH may send PUT requests to the destination resource when the binding condition attributes are satisfied for the source resource. The binding entry for this method may be stored on the SRH.

Figure 2:
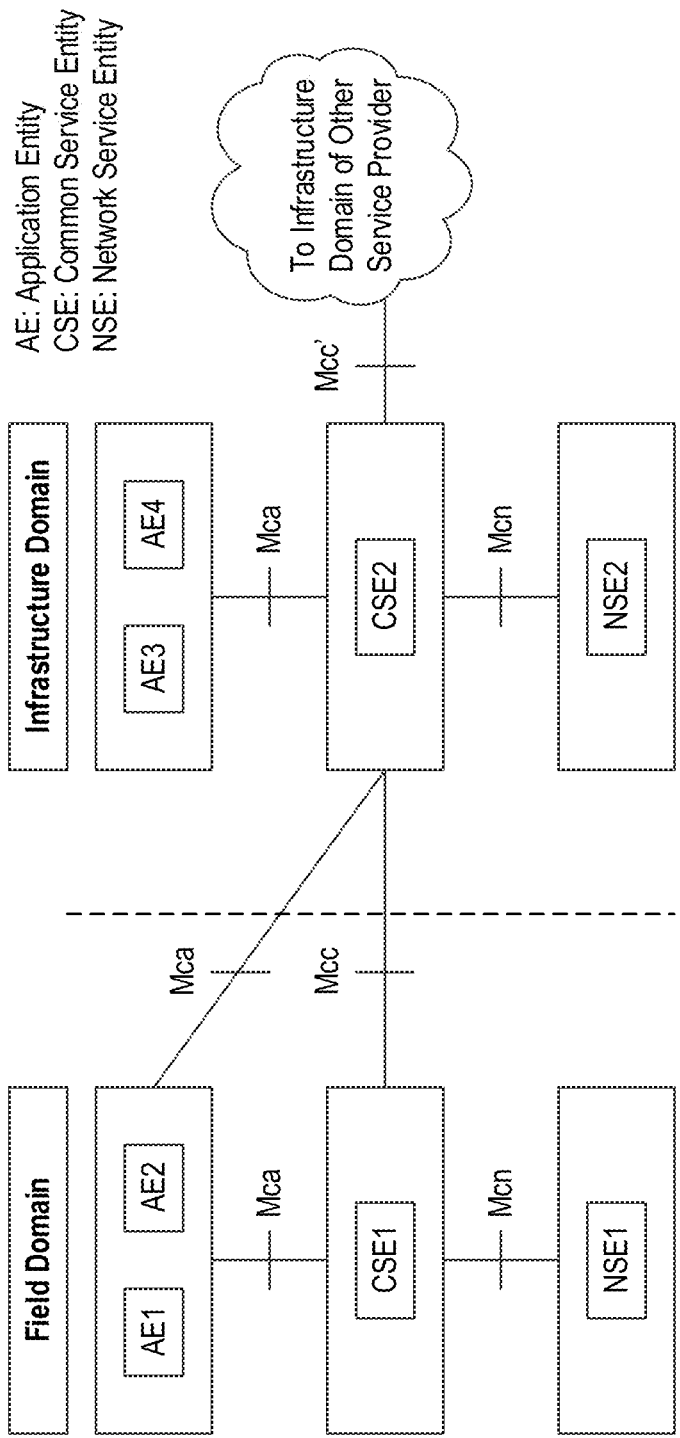
FIG. 2 shows an example oneM2M architecture.

The oneM2M standard defines a service layer called a "Common Service Entity (CSE)." The purpose of the service layer is to provide "horizontal" services that can be utilized by different "vertical" M2M systems and applications. The CSE may support four reference points as shown in FIG. 2. The Mca reference point may interface with the Application Entity (AE). The Mcc reference point may interface with another CSE within the same service provider domain and the Mcc' reference point may interface with another CSE in a different service provider domain. The Mcn reference point may interface with the underlying network service entity (NSE). An NSE may provide underlying network services to the CSEs, such as device management, location services and device triggering. A CSE may contain multiple logical functions called "Common Service Functions (CSFs)" such as "Discovery" and "Data Management & Repository."

The oneM2M architecture enables the following example types of nodes and example functionality of those nodes, as shown in FIG. 2:

Application Service Node (ASN): A node that contains one CSE and contains at least one Application Entity (AE). Example of physical mapping: an ASN could reside in an M2M Device.

Application Dedicated Node (ADN): A node that contains at least one AE and does not contain a CSE. There may be zero or more ADNs in the Field Domain of the oneM2M System. Example of physical mapping: an ADN could reside in a constrained M2M device.

Middle Node (MN): A node that contains one CSE and contains zero or more AEs. There may be zero or more MNs in the Field Domain of the oneM2M System. Example of physical mapping: a MN could reside in an M2M Gateway.

Infrastructure Node (IN): A node that contains one CSE and contains zero or more AEs. There may be one IN in the Infrastructure Domain per oneM2M Service Provider. A CSE in an IN may contain CSE functions not applicable to other node types. Example of physical mapping: an IN could reside in an M2M Service Infrastructure.

Non-oneM2M Node (NoDN): A Node that does not contain oneM2M Entities (neither AEs nor CSEs). Such Nodes may represent devices attached to the oneM2M system for interworking purposes, including management.

The W3C Web of Things (WoT) functional architecture has been designed with three primary requirements: flexibility by aiming to support a wide range of physical WoT devices, upper compatibility to current IoT standards and legacy IoT solutions, and security and privacy. In a WoT system, the major functional entity may be the "WoT Servient" which is an entity consisting of a web client, a web server, and device control capabilities. A WoT Servient may become a WoT Server if it only has a web server and device control capabilities, or a WoT client if it does not have a web server but a web client. Through a WoT Servient, IoT physical devices can be accessed, monitored, and controlled (e.g., to get their status and data values from those devices).

Figure 3:
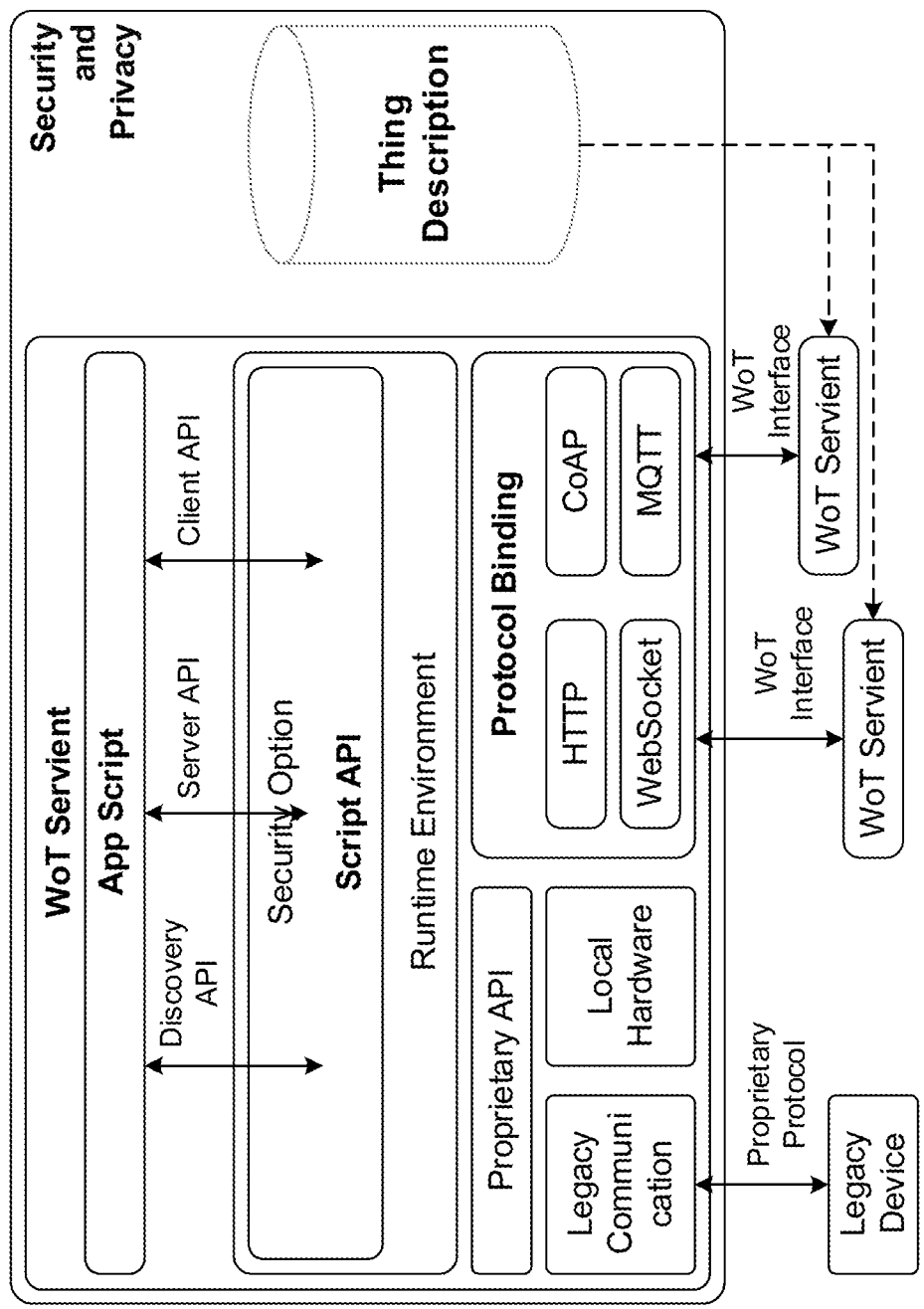
FIG. 3 shows an example functional architecture of a WoT Servient.

The general WoT Servient functional architecture as defined in the Web of Things (WoT) Architecture is illustrated in FIG. 3. Servients may communicate with each other through a "WoT Interface," a resource-oriented Web Application Program Interface (API). A Servient can be in client role (e.g., it may only consume other things), server role (e.g., it may only expose things and provides capabilities), or both. A "Thing" is the abstract concept of a physical entity that can either be a real-world artifact, such as a device, or a virtual entity that represents physicality, such as a room or group of devices. In general, a WoT Thing (e.g., a legacy device only providing proprietary interface) may have an associated WoT Servient, which is the representation of this Thing in the WoT system, with which other WoT Servients can interact. Servients can also provide access to virtual things such as a collection of physical things (e.g., all lights in a room). In addition, Servients can be hosted in different places such as inside a smartphone, a local gateway, or the cloud. The functionalities of several major modules of a WoT Servient are described below in accordance with the WoT Architecture.

Thing Description: Each WoT Thing may be described by a WoT Thing Description (TD), which may describe the semantics of a Thing as well as its WoT Interface. The TD may be acquired before the Thing can be accessed and/or interested with. Things can provide their own TDs locally, but the TD can also be hosted externally (e.g., if there is not enough space on the thing/device). To ease TD discovery, TDs can be registered with a well-known TD Repository, where the TD for Things of interest can be queried.

App Script: The application logic of a WoT Thing (e.g., a servient) can be implemented natively, for instance in the device firmware, which is expected to be common for very resource-constrained Things. Following the patterns in the Web, however, application logic may also be provided by scripts. This may be supported through a scripting runtime environment—similar to the Web browser—that may be provided by a servient. App scripts may implement application logic in a modular and portable way, and can access local hardware, locally connected legacy devices, and remote things through the WoT Interface.

Script API: Portability of such scripts may be ensured through a common Scripting API (e.g., a Client API, Server API, Discovery API, and Proprietary API) that allows an application to discover things (via Discovery API), to consume things (via Client API), to expose things (via Server API), and/or to access/control the hardware physically attached to the servient (via Proprietary API). Scripting API is more like an internal API used by application scripts, while the WoT Interface is the external interaction interface between different WoT Servients.

Protocol Binding: may support binding Script API messages to different underlying protocols with various communication patterns such as push, pull, pub-sub and bi-directional messaging. After protocol binding, a message may be transmitted over a WoT interface from one WoT Servient to another WoT Servient. This may be realized by standardized Binding Template.

Security and Privacy: Security and privacy features may be embedded in other modules like a TD, Script API, Protocol Binding, etc. As a result, W3C WoT WG may not generate a standalone specification for security and privacy, but may include security and privacy design in a TD specification, Script API specification, and binding template specification.

Figure 4:
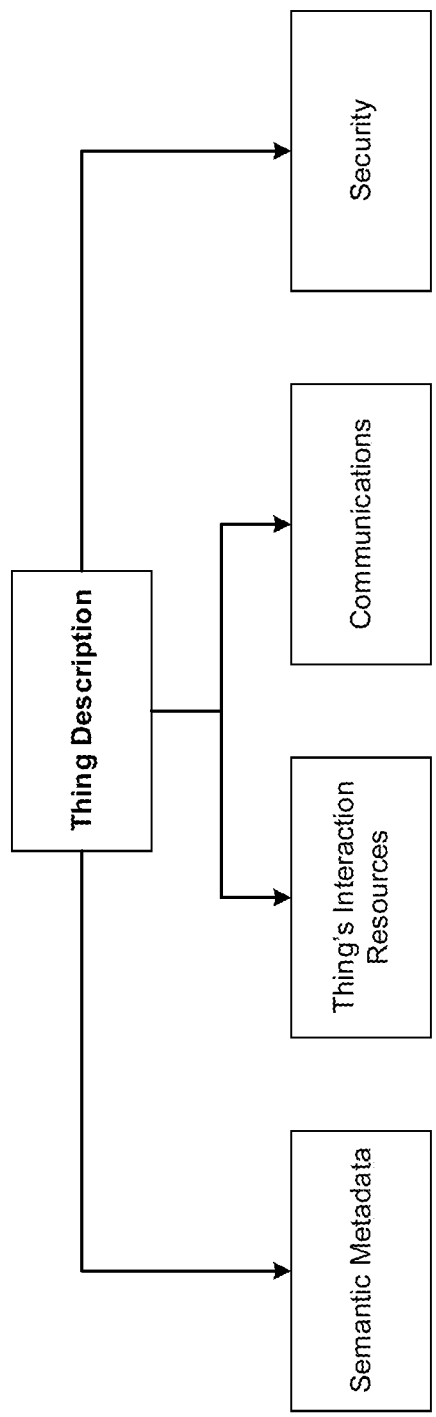
FIG. 4 shows example concepts of a Thing Description (TD)

Resource Description Framework (RDF) has been used as an underlying data model for TD representation. A TD may actually be a RDF document. Four example pieces of content contained in a TD, as described in the WoT Architecture, are shown in FIG. 4:

Semantic Metadata: may provide generic thing information and context enrichment (e.g., linking to external vocabularies and ontologies).

Interaction Resources (of a Thing): may describe the capabilities of a thing in terms of Properties, Actions, and Events. Readable/Writable data or resources on a thing may be described as Properties; changes and processes on a thing may be described as Actions; Events may be used as a mechanism to enable notification about the thing under certain conditions.

Communication: This piece may describe bindings to different communications protocols (e.g., HTTP, CoAP, etc.).

Security: A TD can also provide content related to security mechanisms, policies, and parameters to securely access the thing and the TD itself.

A TD example for a temperature sensor is illustrated in FIG. 5. Although this example is based on JavaScript Object Notation for Linked Data (JSON-LD) serialization, W3C WoT IG/WG has been investigating other options and may define a general TD model independent of serialization format. This TD example defines a thing myTempSensor which has two properties (e.g., myTemp and myThreshold). Both properties have the type of "Temperature" and the unit of "celsius." myThreshould can be updated, but myTemp which is the actual measurement from the temperature sensor is read-only. "base" and "links" together give the URI for accessing those two properties. For example, the Uniform Resource Identifier (URI) for myTemp is coap:///www.example.com:5683/temp/val. In addition, "@context" as provided by JSON-LD allows a TD to link to and reuse existing external models and vocabularies (e.g., ontology) to enhance semantic interoperability.

In M2M/IoT systems, there are use cases where the representation of a destination resource may need to be synchronized with the representation of a source resource. In other words, the content of the destination resource may be automatically updated or copied from the source resource. To facilitate such state or content synchronization between a source and a destination resource, the concept of dynamic link binding has been proposed. A link binding may be described as the unidirectional binding relationship from a source resource to a destination resource. The link binding may have an associated binding method and other binding attributes, which together describe how state synchronization between both resources should be performed (e.g., initiated by the source resource or the destination resource, how frequently the state synchronization may need to be conducted, etc.). However, one problem that may need to be addressed is how to efficiently establish and manage link bindings among different resources, referred to as Link Binding Management (LBM). LBM may span over the entire lifecycle of a link binding such as discovering both source resources and destination resources, creating a link binding, state synchronization based on the link binding, updating a link binding, pausing a link binding, resuming a link binding, cancelling a link binding, etc. An M2M/IoT system may have huge number of data and resources, which may also be dynamically created and removed. Such aspects along with other unique characteristics in an M2M/IoT system (e.g., sleeping devices) make LBM a truly critical and in the meantime a challenging issue to be solved. A complete solution for LBM, which includes architectural design, detailed procedures, and embodiments to related standards, is disclosed herein. For example, the following ideas are disclosed:

LBM Architecture A may include four logical entities: a Resource Creator (RC), a Source Resource Host (SRH), a Destination Resource Host (DRH), and a Link Binding Coordinator (LBC). Interactions are defined for these four entities to cooperate in order to efficiently manage link bindings (e.g., link binding creation, link binding update, etc.) between source and destination resources.

LBM Architecture B may include a Resource Repository (RR), a SRH, a DRH, and a LBC. Interactions on those actors are developed towards efficient link binding management.

Detailed procedures for LBM Architecture A may include resource creation with binding support, resource discovery for link binding, link binding creation, binding-aware content synchronization, link binding update, link binding suspension, link binding restoration, and link binding cancellation.

Detailed procedures for LBM Architecture B may include resource registration with binding hint, resource discovery for link binding, link binding creation, link binding registration, binding-aware content synchronization, link binding update, link binding suspension, link binding restoration, and link binding cancellation.

In addition, embodiments to oneM2M and W3C WoT are disclosed.

In the following description, the following terms may have the following example meanings:

Link Binding: A unidirectional logical link and abstract relationship between a source resource and a destination resource. The purpose of a binding may be to synchronize the content between a source and a destination resource.

Source Resource: In a link binding, a source resource may be the resource whose content may be copied or provided to a destination resource.

Source Resource Host (SRH): A logical entity which hosts source resources. As an example, an oneM2M CSE, a WoT Servient, or an OIC Server can be a SRH.

Destination Resource: In a link binding, a destination resource may be the resource whose content may be synchronized to and copied from the content of a source resource.

Destination Resource Host (DRH): A logical entity which hosts destination resources. As an example, a oneM2M CSE, a WoT Servient, or an OIC Server can be a DRH.

Binding Method: A binding method may define the rules to generate the web-transfer exchanges that synchronize states between source and destination resources.

Binding Entry: A binding entry may define and record the details of a link binding between a source resource and a destination resource. A binding entry may include several binding attributes which describe this particular binding. Since a binding may be unidirectional, the binding entry is present only on the source resource host or destination resource host.

Binding Attribute: A binding attribute may be a parameter used to describe a property of a binding entry. Examples of binding attributes include binding method (e.g., Poll, Push, or Observe), minimum period (for triggering a new state synchronization), maximum period (between two consecutive state synchronizations), change step (indicates how much the value of a resource should change before triggering a new state synchronization), greater than (indicates the upper limit that the resource value should cross before triggering a new state synchronization), less than (indicates the lower limit that the resource value should cross before triggering a new state synchronization, etc.). Except for the binding method, all other binding attributes may describe certain conditions and may be referred to as binding condition attributes.

State Synchronization or Content Synchronization: Depending on the binding method (Poll, Observe, Push) different REST methods may be used to synchronize the resource values between a source and a destination. The process of using a REST method to achieve this may be defined as "State Synchronization" or "Content Synchronization."

Binding Table: The binding table may be a special resource that contains and gives access to all binding entries on a source resource host (for Push) or a destination resource host (for Poll and Observe).

Link Binding Coordinator (LBC): A logical entity or a management application which manages link bindings between source resources and destination resources (e.g., to discover source resources and destination resources, to formulate appropriate link bindings, to create a link binding and set attributes of a binding entry, to update a link binding by changing the attributes of a binding entry, and to cancel a link binding, etc.). As an example, an oneM2M AE/CSE, a WoT Client, an OIC Client can be a LBC.

Resource Repository (RR): A logical entity where source resources and destination resources register themselves. A LBC/SRH/DRH may register binding entries to a RR. An LBC can discover source resources, destination resources, and binding entries from the RR. A RR example is an IETF CoRE resource directory.

Resource Creator (RC): A logical entity which creates source resources at a SRH or destination resources at a DRH. For example, a oneM2M AE or an OIC Client can be a RC.

Resource Host (RH): A destination resource host or a source resource host. A RH may host both source resources and destination resources. For example, a oneM2M CSE, a WoT Servient, or an OIC Server can be a RH.

Figure 6:
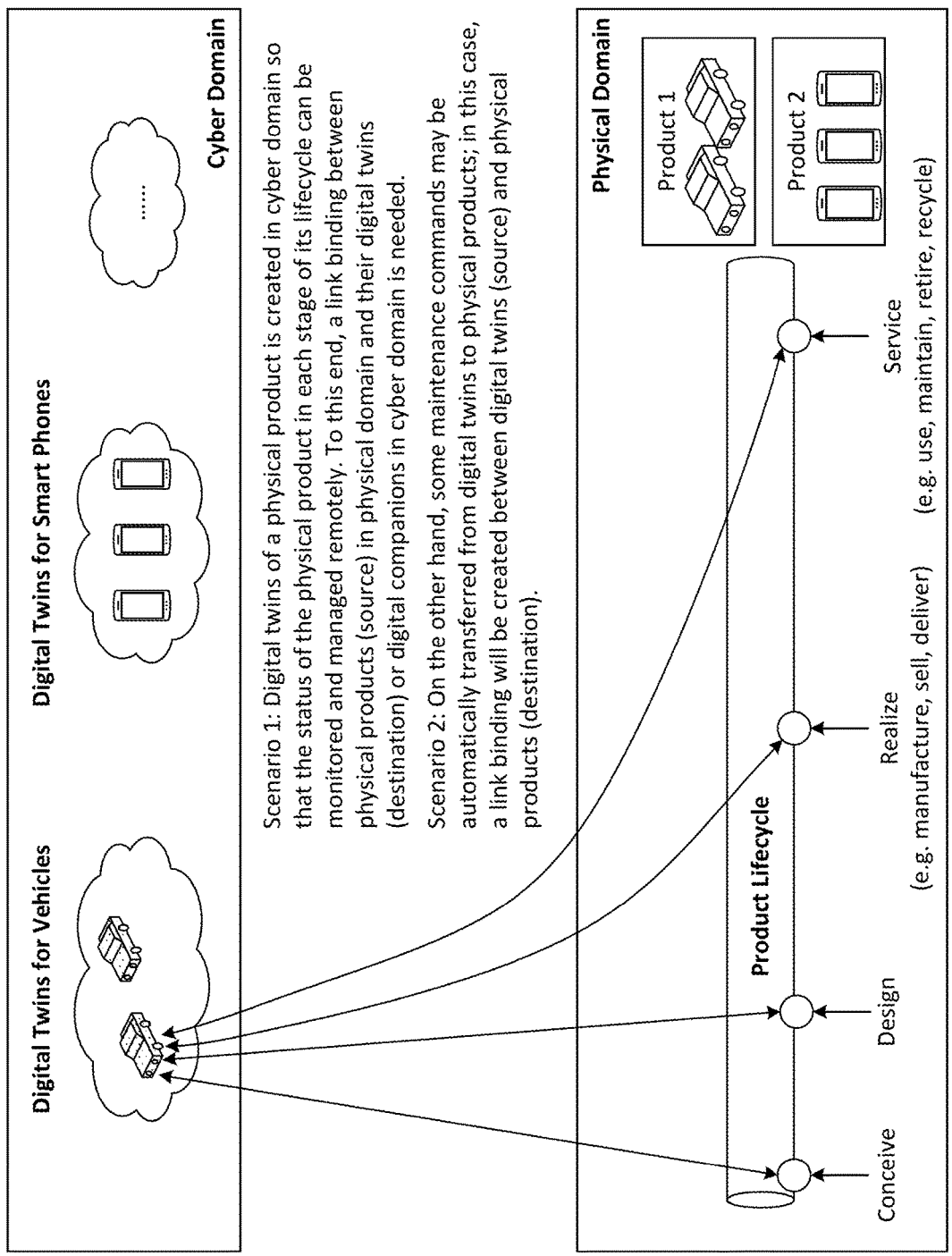
FIG. 6 shows an example digital twin in smart manufacturing.

FIG. 6 illustrates an example smart manufacturing use case in emerging Industry 4.0 and/or Industrial Internet, where physical domain and cyber domain are connected via Internet technologies toward industrial Cyber-Physical Systems. Various sensors and actuators may be installed and/or attached to physical parts, machines, and devices in the physical domain so that their status and information is effectively collected to the cyber domain or the Internet. On the other hand, reverse control commands may be issued from the cyber domain to a single physical part, machines, and/or devices. Smart manufacturing in general may aim to render the manufacturing process more efficient, autonomous, and smart by leveraging Internet of Things (IoT) and the convergence of Information Technology (IT) and Operation Technology (OT) in product lifecycle, as shown in the four phases of FIG. 6 (e.g., conceive, design, realize, and service). For example, in the 'realize' phase, the product may be manufactured in a factory, sold to the customer, and delivered to the customer in sequential steps. The efficiency of those phases may be greatly improved based on IoT. For example, IoT my enable the collection of more complete and timely information about a sold product and customer feedback during a "service" phase, which in turn can be fed to the "realize" phase in a real-time fashion to eventually improve manufacturing efficiency.

To exploit the full range of benefits from smart manufacturing, the concept of "digital twins" may be utilized. Digital twins may refer to digital or virtual companions of physical products; digital twins may use collected data from sensors installed on physical products to represent their near real-time status, working condition, and/or other information. Through digital twins, a physical product can be monitored, managed, and maintained remotely and even more efficiently without sending any technician to check the product physically. Digital twins may facilitate link binding and resulting automatic content synchronization from physical products to their digital twins or vice versa. FIG. 6 shows two example scenarios of digital twins:

Scenario 1: In order to create digital twins in the cyber domain, the status of the physical product in each phase of its lifecycle may need to be monitored and connected. Then, a link binding between physical products (e.g., source resource) in the physical domain and their digital twins (e.g., destination source) in the cyber domain can be established to enable automatic content synchronization from sensors of a physical product to its digital twins.

Scenario 2: some maintenance commands may need to be automatically transferred from digital twins to the corresponding physical products; in this case, a link binding may be created between digital twins (e.g., source resource) and physical products (e.g., destination resource).

Figure 7:
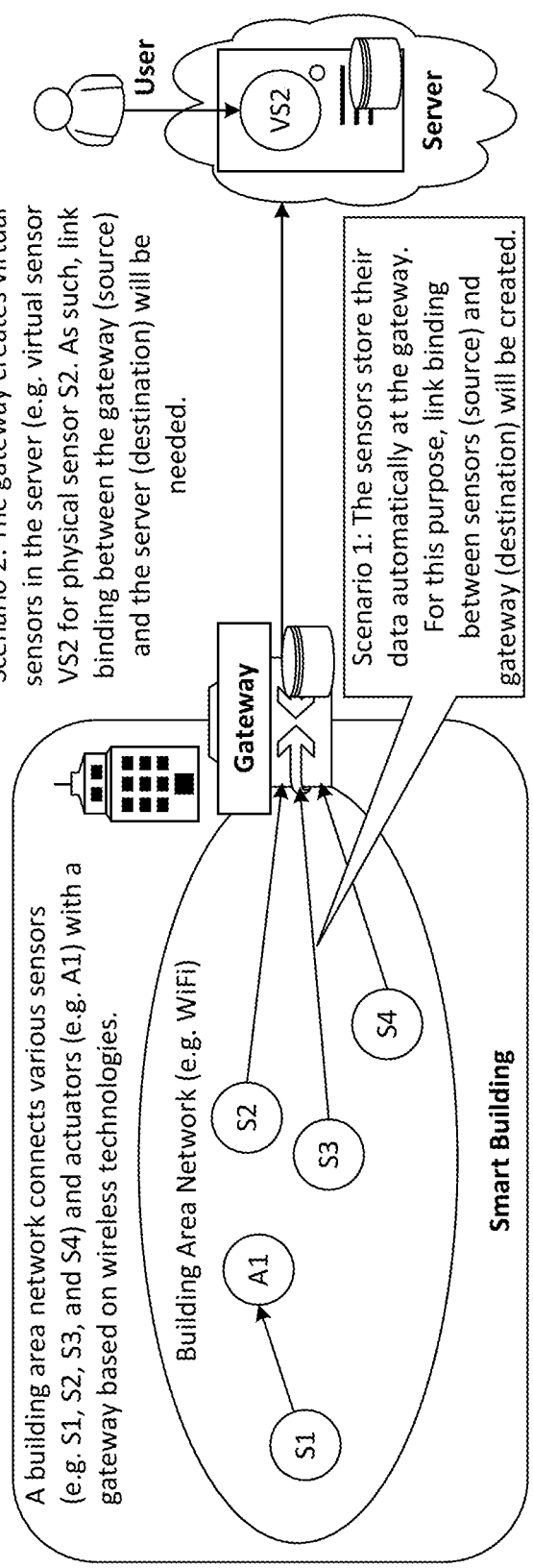
FIG. 7 shows an example smart building use case.

State synchronization may exist in smart building use cases and accordingly link binding may be required. In the example smart building use case shown in FIG. 7, various physical sensors (e.g., S1, S2, S3, and S4) and actuators (e.g., A1) may be installed inside the building, which are connected to a gateway via building area networks. The gateway collects data from those physical sensors and stores them locally, so that applications can retrieve sensory data directly from the gateway and avoid reaching physical sensors. Furthermore, virtual sensors (e.g., VS2) are created at the server for physical sensors, which may allow users to obtain the status of corresponding physical sensors by accessing those virtual sensors only. FIG. 7 shows two scenarios where state synchronization and link binding may be needed.

Scenario 1: Physical sensors may report their data to the gateway. In this scenario, sensor readings at physical sensors may refer to source resources and physical sensors may be the SRH. In contrast, sensory data stored at the gateway may be a destination resource and the gateway may be the DRH. To make automatic state synchronization between sensor readings at a physical sensor and sensory data stored at the gateway, a link binding between them may be needed.

Scenario 2: The gateway may send sensory data to virtual sensors (e.g., digital objects of physical sensors) at the server. In this scenario, the source resource is sensory data stored at the gateway (e.g., the SRH) and the destination resource is the virtual sensor at the server (e.g., the DRH). A link binding between sensory data at the gateway and a virtual sensor at the server may be required to guarantee automatic state synchronization between them.

The concept of link binding between a source resource and a destination resource has been proposed where three binding methods (e.g., Poll, Observe, and Push) and a few other binding attributes are also specified. But potential benefits of a link binding may depend on the way the link binding is managed (e.g., how to find appropriate source resource and destination resource, how to create a link binding, whether/how to update a link binding, and when/how to cancel a link binding). Several specific problems related to link binding management are described below:

Problem 1: How to determine binding role of a resource and find matching source resource and destination resource. In one embodiment, a resource may play the role of source resource (or destination resource) only and as such it cannot be used as destination resource (or source resource). In the previous smart building use case, some sensory data at the gateway is the destination resource for the link binding in Scenario 1, while the gateway plays the role of a source resource for the link binding in Scenario 2. In general, a resource host (e.g., an oneM2M CSE) may maintain a huge number of resources, without knowing the roles that resources can play, and thus link bindings may be established inappropriately or inefficiently leading to unnecessary data exchange and system signaling.

Problem 2: An established link binding may become invalid. The source resource and/or the destination resource in a link binding can be removed or become unavailable (e.g., due to new access control rules). As a result, the link binding may become invalid because the content synchronization from the source resource to the destination resource cannot be performed anymore. An invalid link binding may need to be identified and managed timely; otherwise, useless state synchronization may be continued.

Problem 3: The SRH and DRH may not be aware of link binding during state synchronization. For State synchronization or content exchange, the DRH may issue regular GET messages to the SRH for Poll mode or the SRH may send regular PUT messages to the SRH in Push mode. In either case, the receiver of a GET message or a PUT message may not know that this message has been issued due to a link binding. Those GET/PUT messages from a link binding may be repeated in nature. If the receiver is aware of this, it may have a better idea of the incoming message and can have a better schedule for receiving them.

Problem 4: An existing service layer may not support link binding management. Although oneM2M subscription and notification CSF does support Observe, it does not support the other two binding methods (e.g., Poll and Push) and there is no link binding management.

Described herein are two example LBM Architectures. Both may have a LBC, a SRH, and a DRH. However, the LBM Architecture A may have no RR while there may be a RR in LBM Architecture B. The RR may be a logical entity for providing a resource directory and maintaining resource records; the RR may not store the representation or content of any resource. Since there may be no RR in LBM Architecture A, resources may be created by a RC at the DRH or the SRH and the LBC may discover resources directly from the SRH or the DRH. In contrast, in LBM Architecture B, the resource host (e.g., a SRH or a DRH) may register its resources to the RR, from which the LBC discovers both source resources and destination resources. In addition, the LBC can register any established link bindings to the RR under LBM Architecture B.

In LBM Architecture A, there may not be an RR. Instead, an RC is introduced to create source resources at SRHs and destination resources at DRHs. The RC can simultaneously indicate some binding hints or create new link bindings when creating new resources at SRHs and/or DRHs. Then, a LBC can discover resources from SRHs and/or DRHs using new filters for link binding purpose. After appropriate resources are discovered, the LBC starts to create link bindings at SRHs or DRHs. This process may be be coordinated between SRHs and DRHs so that both are aware of each other's context information and the created link binding. Once a link binding is created, binding-aware content synchronization may be automatically and periodically triggered between the SRH and the DRH which are involved in this link binding. A new binding indicator is described in this process to make the SRH or the DRH aware that this content synchronization is not an ordinary one-time content exchange, but due to an existing link binding, that may be periodically synchronized. The LBC, the DRH, and/or the SRH can update or cancel an existing link binding triggered by various conditions (e.g., content synchronization is too frequent, the source resource becomes unavailable, the destination resource gets deleted, etc.)

Figure 8:
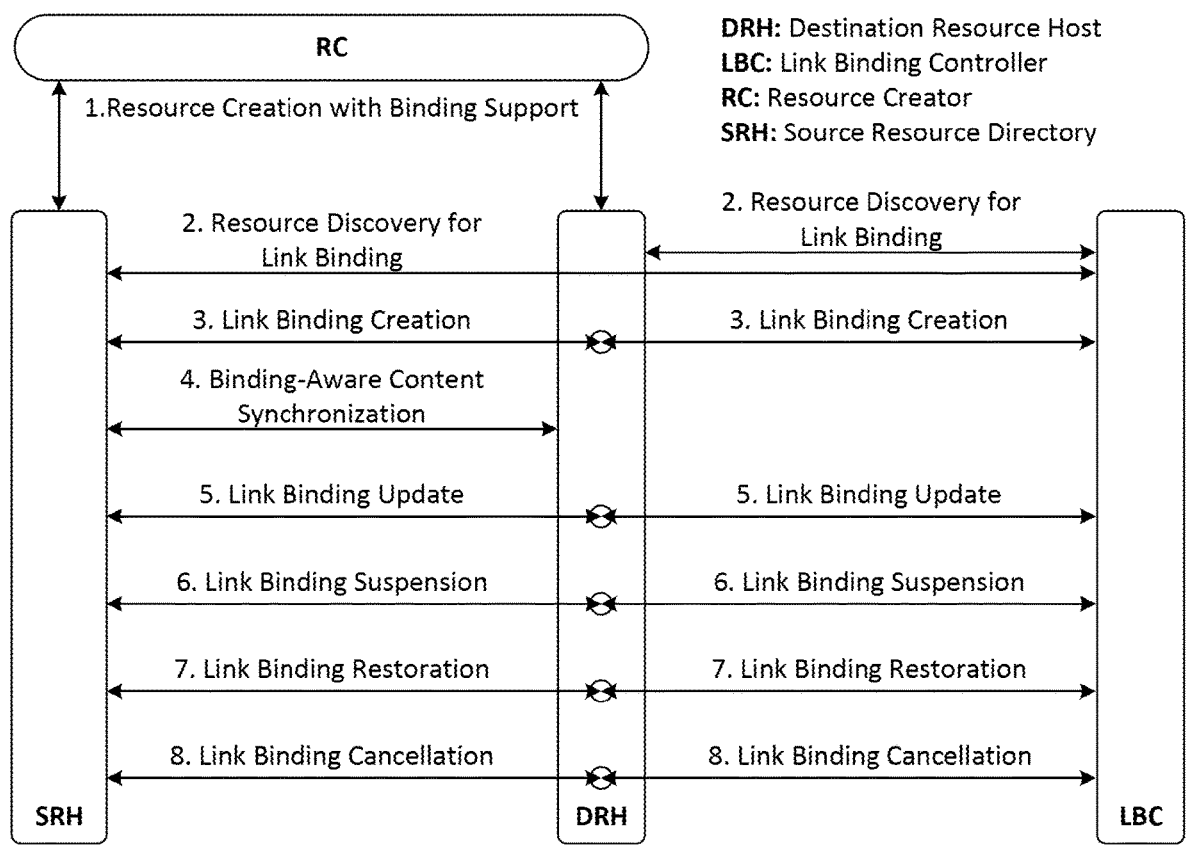
FIG. 8 shows an example link binding management architecture A.

FIG. 8 illustrates example overall procedures under LBM Architecture A. Note that step 3-step 6 have options and alternatives, respectively for Poll/Observe and Push mode, which although not explicitly presented in the figure as discussed further below. In addition, although only one RC is shown in FIG. 8, different RCs may be configured to interact with the SRH and DRH, respectively.

In step 1, the RC may create source resources at the SRH or destination resources at the DRH. In the meantime, the RC may provide binding support in this process along two aspects: 1) The RC can indicate certain binding hints for the resource to be created. The binding hints could be the binding role of the resource (e.g., source resource or destination resource), the type of the resource to be bound to, binding attributes the resource can support, etc. Such binding hints could be provided to the RC via a user interface or previsioned to the RC. 2) The RC can also create link binding in this step. In other words, the RC may create new resources and new link bindings simultaneously. For example, when creating a source resource at the SRH, the RC can provide the destination resource and binding attributes to the SRH and accordingly create a link binding from the resource to be created to the destination resource at the SRH (e.g., for Push mode) or at the DRH (e.g., for Poll/Observe mode). Likewise, when creating a destination resource at the DRH, the RC can provide the source resource and binding attributes to the DRH and in turn create a link binding from the source resource to the destination resource to be created at the DRH (e.g., for Poll/Observe mode) or at the SRH (e.g., for Push mode).

In step 2, the LBC may discover appropriate resources (e.g., source resources and destination resources) from the DRH and the SRH. The LBC may provide new filters related to link binding such as link binding role (e.g., source resource or destination resource), binding attributes which the resource to be discovered can support, etc. Based on those new filters, more appropriate resources for link binding may be identified and returned from the DRH/SRH to the LBC. Before discovering any resource, the LBC may not know if a resource host maintains source resources, destination resources, or both. It may simply issue a resource discovery request to a resource host. The resource discovery request may indicate whether it intends to search source resources or destination resources.

In step 3, the LBC may trigger to create a link binding at the DRH for Poll/Observe mode or at the SRH for Push mode. In either case, the LBC instructs both the DRH and the SRH to be aware of each other's context information and binding attributes of the created link binding. Alternatively, the SRH can initiate to send a request to the DRH to create the link binding for Poll/Observe mode and similarly the DRH can initiate to send a request to the SRH to create the link binding for Push mode.

In step 4, based on the created link binding in step 3, binding-aware content synchronization may be repeatedly conducted from the SRH to the DRH. In Poll/Observe mode, the DRH may send GET messages to the SRH (and accordingly a response message to GET may be sent from the SRH to the DRH), while PUT messages may be sent from the SRH to the DRH for Push mode (and accordingly a response message to PUT may be sent from the DRH to the SRH). In either case, link binding indicators such as binding attributes may be contained in GET or PUT messages so that the SRH or the DRH knows that the corresponding context exchange is not an ordinary one-time content exchange, but repeatable content synchronization due to a link binding. As such, both the SRH and the DRH may be aware of binding attributes during content synchronization and in turn can be better prepared (e.g., adjust its sleep schedule) for content synchronization in the future. Being aware of binding attributes, the SRH (or the DRH) can also authenticate whether each received GET message (or PUT message) satisfies the conditions as specified in binding attributes.

In step 5, an established link binding can be updated by the LBC, the DRH, or the SRH. A link binding update can be triggered under various conditions. For example, the LBC may update the link binding with a more frequent content synchronization. The source resource or the destination resource involved in the link binding can also be changed to a new resource.

In step 6, an established link binding can be suspended by the LBC, the DRH, or the SRH. Link binding suspension can be triggered under various conditions. For example, the DRH under Push mode may request to halt a link binding at the SRH when it is too overloaded to receive any future PUT messages from the SRH. The SRH under Pull mode may request to pause a link binding at the DRH when it aims to reduce energy consumption by stopping receiving future GET messages from the DRH.

In step 7, a halted link binding can be restored or resumed after certain time by the LBC, the DRH, or the SRH. Link binding restoration can be triggered under various conditions. For example, the DRH under Push mode may request to resume the halted link binding at the SRH when it becomes underloaded and able to receive PUT messages from the SRH. Similarly, the SRH under Pull mode may request to resume the halted link binding at the DRH.

In step 8, an existing link binding may be removed by the LBC, the DRH, or the SRH for various scenarios. For example, the LBC may just simply cancel the link binding and disable the content synchronization. In this case, both the source resource and the destination resource may still be kept. In another example, when the source resource becomes unavailable, the link binding may actually be invalid and may need to be removed accordingly.

In LBM Architecture B, there may be a RR which actually acts as a resource directory for both source resources and destination resources. SRHs and DRHs may first register their resources to the RR and in the meantime may indicate some binding hints (e.g., preferences on binding role, binding methods and other binding attributes) associated with each registered resource. Based on those binding hints, the RR may make link binding recommendations and send them to the SRH, the DRH, and/or the LBC. The LBC can discover source and/or destination resources from the RR using new filters for link binding purposes. During this process, the RR may also send link binding recommendations to the LBC. After appropriate resources are discovered or certain link binding recommendations are notified, the LBC may start to create link bindings at SRHs or DRHs. This process may be coordinated between SRHs and DRHs so that both are aware of each other's context information and the created link binding. The LBC can register any created link binding to the RR so that the RR has full knowledge of all created link bindings and involved source and destination resources, which the RR can leverage to optimize the performance of searching resources and recommending link bindings in the future. Once a link binding is created, binding-aware content synchronization may be automatically and repeatedly triggered between the SRH and the DRH which are involved in this link binding. A new binding indicator may be configured to make the SRH or the DRH aware that this content synchronization is not an ordinary one-time content exchange, but due to an existing link binding and may be repeated. The LBC, the DRH, and/or the SRH can update or cancel an existing link binding triggered by various conditions (e.g., content synchronization is too frequent, the source resource becomes unavailable, the destination resource gets deleted, etc.). If the link binding being updated or removed has a record in the RR, the RR may be instructed to update or delete this record.

Figure 9:
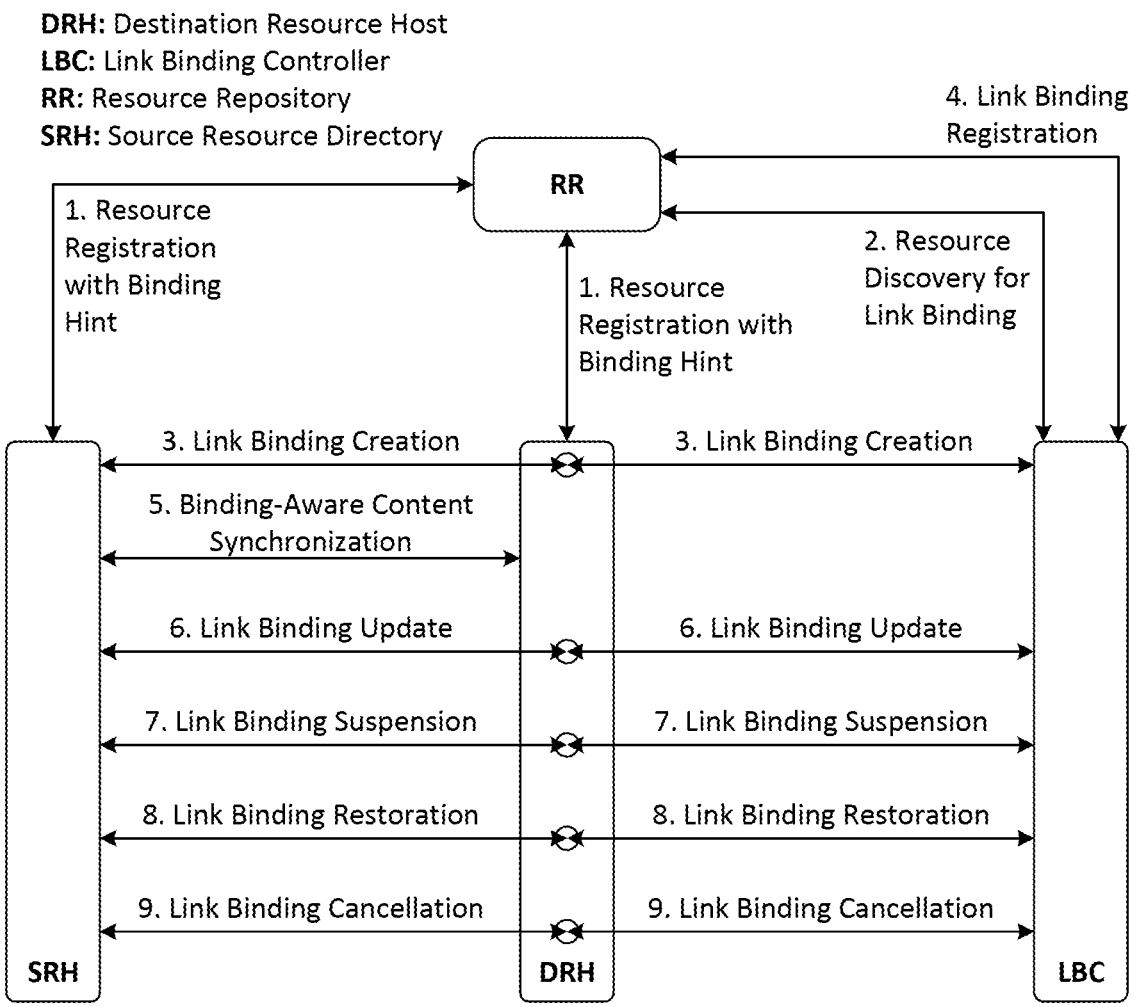
FIG. 9 shows an example link binding management architecture B.

FIG. 9 illustrates an example procedure under LBM Architecture B. Note that step 3 and step 5-step 7 have options and alternatives, respectively, for Poll/Observe and Push mode. step 3 in LMA Architecture B may be the same as that in LBM Architecture A; step 5 in LBM Architecture B may correspond to step 4 in LBM Architecture A.

In step 1, a resource host (either a SRH or a DRH) may register resources to the RR. Several new attributes related to link binding may be indicated and associated with the resource to be registered. For example, a linkBindingRole parameter is described to indicate if a resource acts as a source resource or a destination resource. After this process, the RR may know whether a resource is a source resource or destination resource, what are the binding attributes the resource can support, etc. Therefore, the RR may be able to make link binding recommendations. An example of link binding recommendation could be "resource A as the source resource binds to resource B as destination resource under Push mode with binding attributes pmin=1 minute and pmax=1.5 minutes." The RR can run certain algorithms to generate link binding recommendation periodically or whenever a new resource is registered or an existing resource is deregistered.

In step 2, the LBC may discover appropriate resources (e.g., source resources and destination resources) from the RR. The LBC may provide new filters related to link binding such as link binding role (e.g., source resource or destination resource), the binding attributes which the resource to be discovered can support, etc. Based on those new filters, more appropriate resources for link binding may be identified and returned from the RR to the LBC. Before discovering any resource, the LBC may not know if a resource host maintains source resources, destination resources, or both.

In step 3, this step may be the same as step 3 in LBM Architecture A.

In step 4, the LBC may register the created link binding to the RR so that the RR knows how many link bindings have been established for a source resource. The RR can take this information into account when it serves resource discovery or generates link binding recommendations. For example, when generating new link binding recommendation, the RR can balance the number of link bindings associated with a source resource.

In step 5, this may be the same as step 4 in LBM Architecture A

In step 6, this may be similar to step 5 in LBM Architecture A. In LBM Architecture B, an updated link binding additionally may need to be re-registered to the RR so that the RR has the latest information about any active and valid link binding.

In step 7, this may be similar to step 6 in LBM Architecture A. In LBM Architecture B, a suspended link binding additionally may need to be re-registered to the RR so that the RR is aware if the suspension of this link binding.

In step 8, this may be similar to step 7 in LBM Architecture A. In LBM Architecture B, a resumed link binding may be additionally re-registered to the RR so that the RR is aware that this link binding has been resumed.

In step 9, this may be similar to step 8 in LBM Architecture A. In LBM Architecture B, a cancelled link binding may be additionally de-registered from the RR.

Procedures associated with Link Binding Management Architecture A are disclosed. When a new resource is created, certain binding support can be conducted simultaneously. In one embodiment, binding hints may be indicated during resource creation; the binding hints could be, for example, the link binding role for the created resource, the link binding attributes which the created resource can support, the other type of resource which the created resource may bind to, etc. Additionally or alternatively, a new resource and a new link binding may be created simultaneously, which may reduce message overhead from creating link binding separately.

Figure 10:
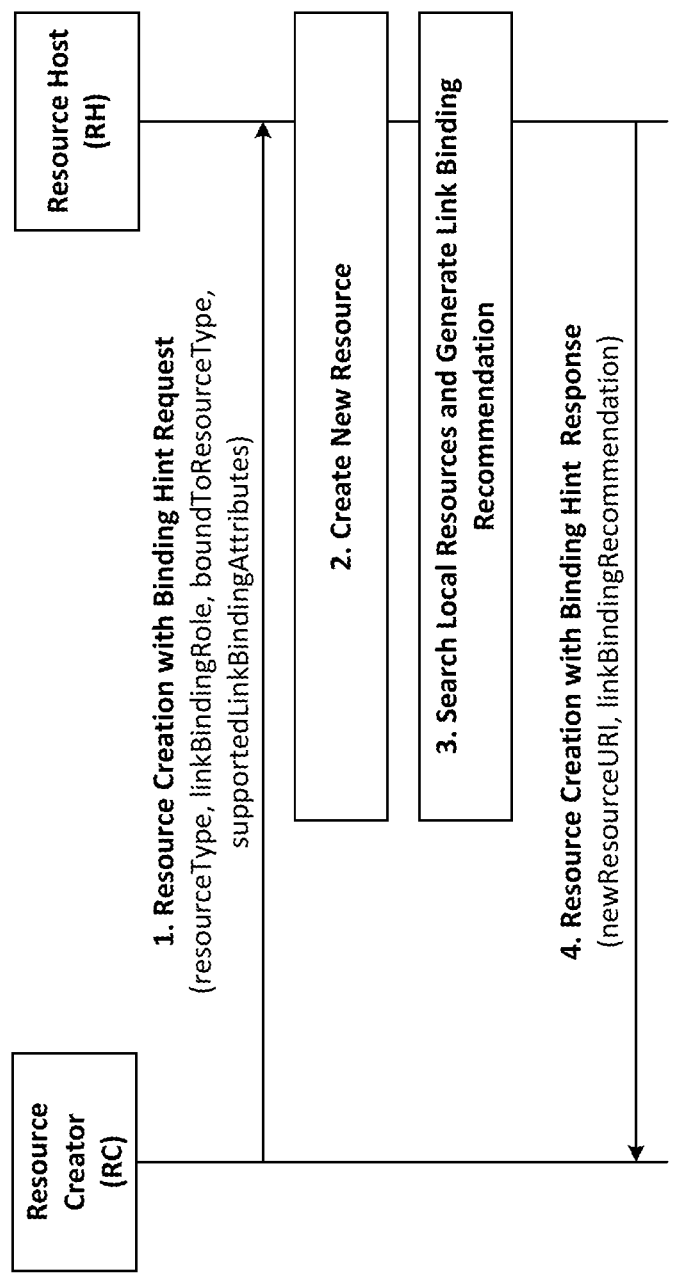
FIG. 10 shows an example resource creation with binding hint.

FIG. 10 illustrates an example method for resource creation with binding hint between a RC and a RH. The following steps may be conducted between the RC and the RH.

In step 1, the RC may send a Resource Creation with Binding Hint Request message to the RH for creating a new resource at the RH, which could be a DRH or a SRH. This message may contain the following parameters. In one embodiment, the first parameter is mandatory while the other three parameters that give binding hints for the new source to be created are optional:

resourceType: the type of a new resource to be created (e.g., temperature).

linkBindingRole: the link binding role of the new resource to be created. For example, the new resource could be a source resource, a destination resource, either of a source resource or a destination resource, or neither of them if it is not involved in a link binding. As a result, the value of this parameter could be: sourceResourceRole, destinationResourceRole, eitherSourceOrDestinationRole, or noRole.

boundToResourceType: the type of target resource which the new resource may be bound to. If the created resource is a source resource (e.g., linkBindingRole="sourceResourceRole"), this parameter may represent the type of destination resource. If the created resource is a destination resource (e.g., linkBindingRole="destinationResourceRole"), this parameter may represent the type of source resource. If linkBindingRole="noRole," this parameter may not be needed and may not be presented in the Resource Creation with Binding Hint Request message.

supportedLinkBindingMethodsAndAttributes: the potential link binding modes and other attributes which the new resource can support or prefer to support. For example, this parameter may indicate if the new resource supports Poll, Observe, and/or Push mode. For each binding mode, this parameter may also contain supported and/or preferred values of other binding attributes such as, but not limited to, "maximum period," "minimum period," "change step," "greater than," and "less than."

In step 2, the RH may create a new source according to the parameter resourceType contained in step 1. The three binding hint parameters (e.g., linkBindingRole, boundToResourceType, and supportedLinkBindingMethodsAndAttributes) may be added as the new attributes of the new resource.

In step 3, after the new resource is created in step 2, the RH may search its local resources (which could be locally hosted resources and announced resources by other RHs) to find pairs of matching source resource and destination resource, based on the binding hints of the new resource and existing resources. Accordingly, the RH generates link binding recommendations for or related to the new resource. In one example, a link binding can be recommended for two resources A and B if all following conditions are satisfied. The RH may store the newly generated link binding recommendation locally (e.g., as standalone resources, or as child resources, or an attribute of the new resource). Each generated and stored link binding recommendation may have a few attributes: binding method, source resource type, source resource URI, destination resource type, destination resource URI, link binding status, maximum period, minimum period, change step, greater than, and less than, etc. As an example, possible values of link binding status could be "recommended" (which may mean it is just a link binding recommendation) or "created and enforced" (which may mean that this link binding has been created and enforced at a DRH or a SRH).

Resource A may be a source resource and Resource B may be a destination resource. This can be known from "linkBindingRole" parameter.

The type of Resource B matches "boundToResourceType" of Resource A, or the type of Resource A matches "boundToResourceType" of Resource B.

There is an overlapping set between "supportedLinkBindingMethodsAndAttributes" of Resource A and "supportedLinkBindingMethodsAndAttributes" of Resource B. For example, both Resource A and Resource B may support/prefer the same binding mode> In addition, both resources may support/prefer the same "maximum period" and other binding attributes.

In step 4, the RH may send a Resource Creation with Binding Hint Response message to the RC. In addition to containing the URI of the new resource created in step 2, this message may include the representation or the URI of link binding recommendation generated in step 3. The representation of a link binding recommendation may include: source resource URI, destination resource URI, binding method, and/or other binding attributes. If only the URI of link binding recommendation is contained in this step, the RC can retrieve the representation of a link binding recommendation later.

Figure 11:
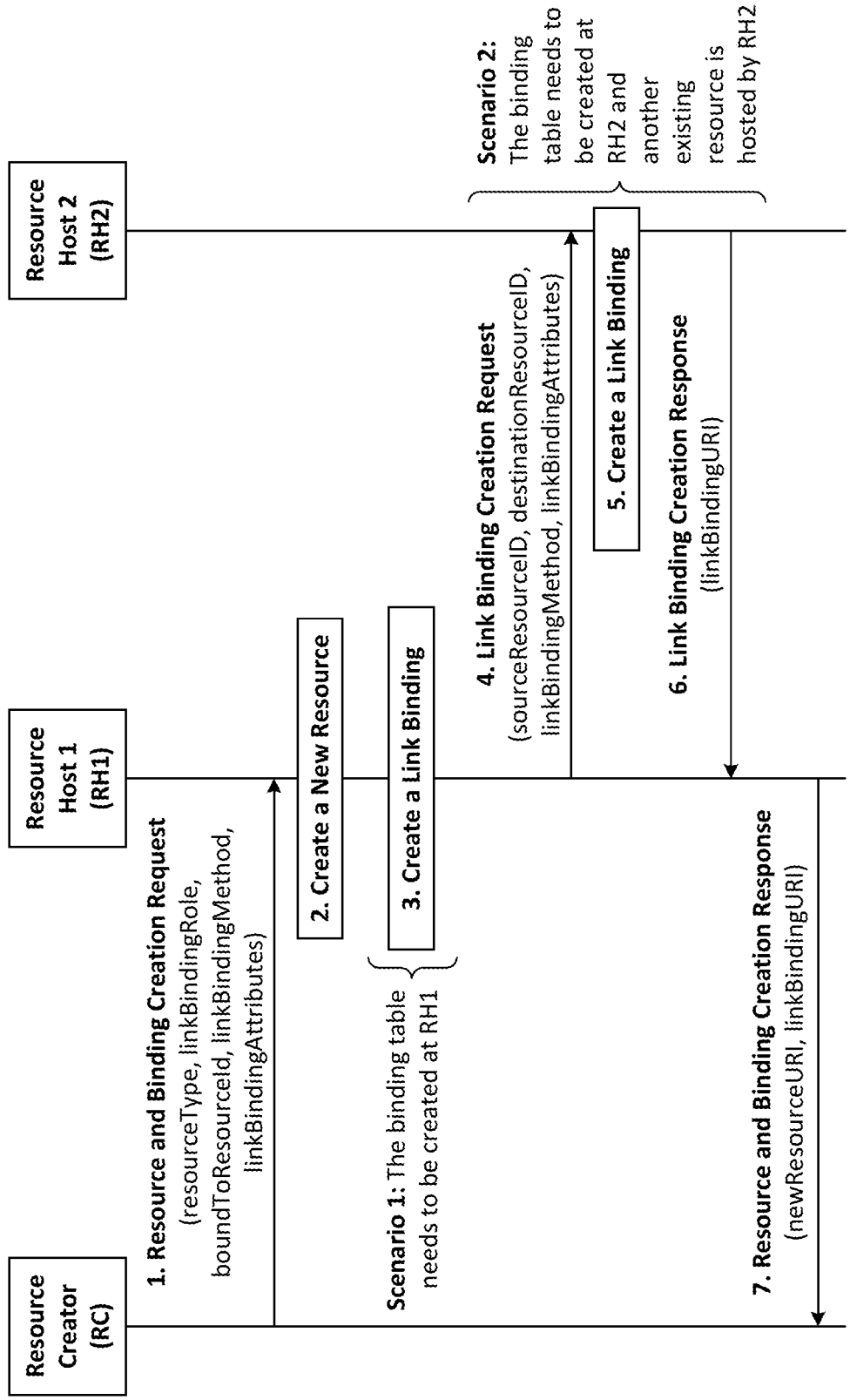
FIG. 11 shows an example joint resource and link binding creation.

FIG. 11 shows an example joint resource and link binding creation, where the following steps may be needed between a RC, RH1, and RH2.

In step 1, the RC may send a Resource and Binding Creation Request message to RH1. This message may comprise a request to create a new source at RH1 and a new link binding at RH1 or RH2. This message may contain the following parameters. The first parameter may be for creating the new resource and other parameters may be used for creating the new link binding. The new link binding may be created on RH1 or RH2 to associate (or link) the newly created resource on RH1 with an existing resource on RH1 or RH2.

resourceType: the type of the new resource to be created (e.g., temperature), which could be a source resource or a destination resource.

linkBindingRole: the role of the new resource to be created (e.g., a source resource only, a destination resource only, a source and a destination resource, and neither a source nor a destination resource).

boundToResourceId: the URI of another existing resource which the new source may be bound to. If the new resource is a source resource (e.g., linkBindingRole="sourceResourceRole"), the existing resource as denoted by this parameter may be a destination resource. If the new resource is a destination resource (e.g., linkBindingRole="destinationResourceRole"), the existing resource as denoted by this parameter may be a source resource.

linkBindingMethod: the binding method (e.g., Poll, Observe, or Push) specified for the new link binding to be created in step 3 or step 5.

linkBindingAttributes: other binding attribute specified for the new link binding to be created in step 3 or step 5.

In step 2, RH1 may create a new source according to the parameter resourceType contained in step 1. linkBindingRole, boundToResourceTypeId, linkBindingMethod, and linkBindingAttributes can be added as the new attribute of this new resource.

Scenario 1: The binding table may need to be created at RH1 (e.g., the new resource created in step 2 is a destination resource and the binding method is Poll or Observe; or the new resource created in step 2 is a source resource and the binding method is Push). For this scenario, step 3 may be required and steps 4-6 can be skipped.

In step 3, RH1 may create a new link binding for the new resource created in step 2 according to parameters given in step 1 (e.g., linkBindingRole, boundToResourceId, linkBindingMethod, and linkBindingAttributes). RH1 may create a standalone resource for this new link binding and add a reference link to the new resource being created in step 2, or add it as a child resource of the new resource.

Scenario 2: The binding table may need to be created at RH2 for the link relationship between the new resource created at step 2 and an existing resource hosted by RH2 (e.g., the new resource created in step 2 is a source resource and the binding method is Poll or Observe; or the new resource created in step 2 is a destination resource and the binding method is Push). For this scenario, step 3 is skipped and steps 4-6 are required.

In step 4, RH1 may send a Link Binding Creation Request message to the RH2. This message may request to create a new link binding at RH2. For this purpose, the following parameters may be contained in this message.

sourceResourceID: the URI of the source resource which could be the new resource created in step 2 or the boundToResourceID contained in step 1.

destinationResourceID: the URI of the destination resource which could be boundToResourceID contained in step 1 or the new resource created in step 2.

linkBindingMethod: may have the same value of linkBindingMethod as contained in step 1.

linkBindingAttributes: may have the same value of linkBindingAttributes as contained in step 1.

In step 5, RH2 may receive the message sent at step 4 and accordingly may create a new link binding. RH2 may create a standalone resource for this new link binding and add a reference link to the local resource as denoted by boundToResourceID or add it as a child resource of the local resource as denoted by boundToResourceID.

In step 6, RH2 may send a Link Binding Creation Response message to RH1. This message contains the URI of the link binding created in step 5, referred to as linkBindingURI. After receiving this message, RH1 can add linkBindingURI as a new attribute of the resource created in step 2.

In step 7, RH1 may send a Resource and Binding Creation Response message to the RC. This message may contain the linkBindingURI received from step 6 as well as the URI for the new resource created in step 2.

As shown in FIG. 10 and FIG. 11, resources may be created with some new attributes related to link binding. Those new attributes can be leveraged by LBC (or other entities such as SRH and DRH) to more efficiently discover resources with certain binding requirements; in other words, LBC and other entities can use those binding-related attributes as new filters to be contained in resource discovery request. For example, LBC and other entities can indicate in a resource discovery request to only discover resources which are source resource (or destination resource). In another example, LBC and other entities can indicate in a resource discovery request to only discover resources which support a specific binding mode (e.g., Poll, Observe, or Push).

Figure 12:
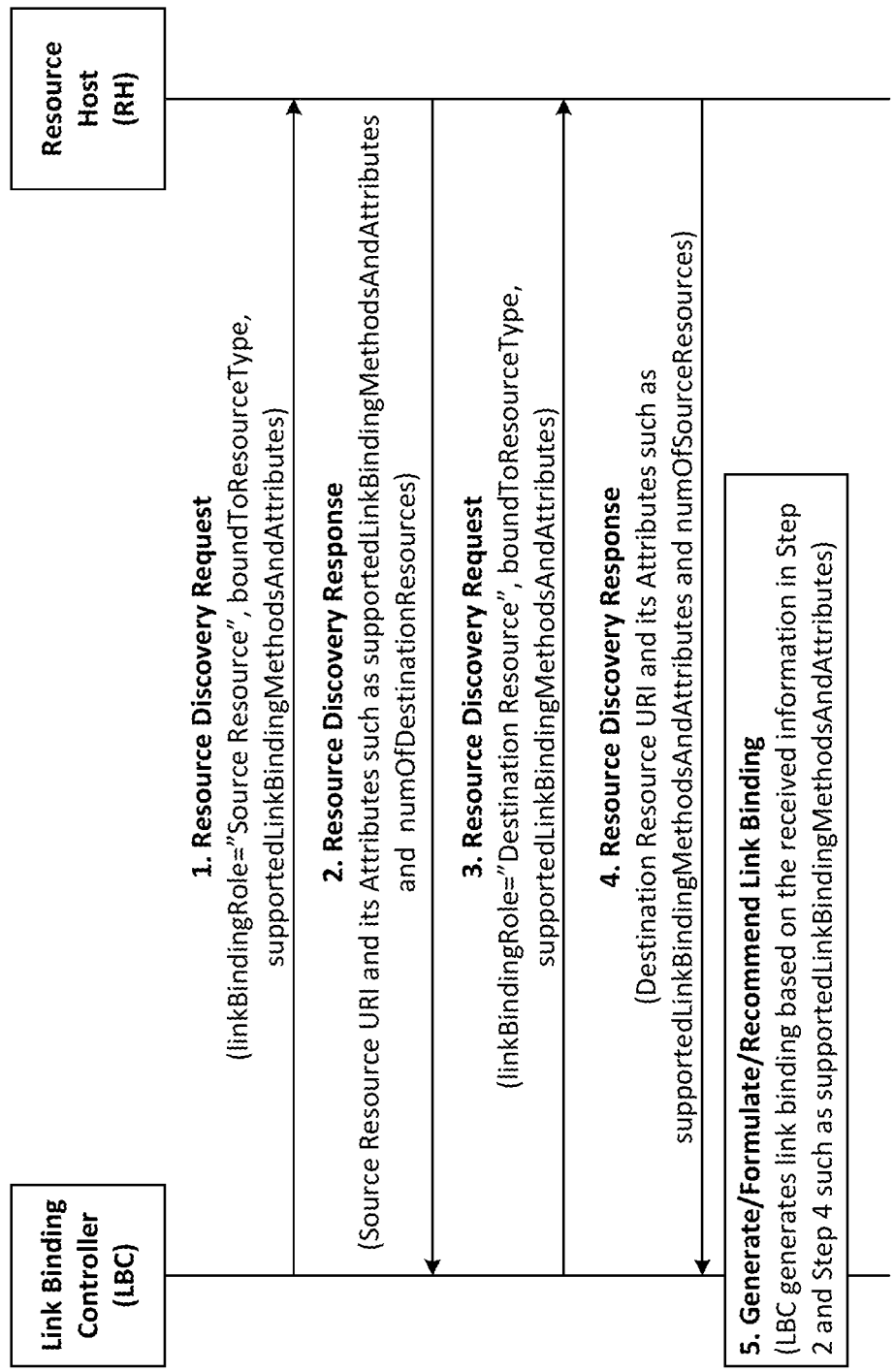
FIG. 12 shows an example resource discovery for link binding creation.

FIG. 12 illustrates an example resource discovery procedure for link binding where a LBC (or other entities such as a SRH or a DRH) discovers source resources and destination resources in order to generate/formulate/recommend a link binding relationship between them. The corresponding link binding may not be created or enforced yet. In other words, generating a link binding may be similar to recommending a link binding, while to create a link binding means to create and enforce a link binding entry at a SRH or a DRH. Note that steps 1 and 2 may take place before steps 3 and 4; the LBC may combine step 1 and step 3 in one step to discover both source resources and destination resources (as such, step 2 and step 4 may be combined); and step 1 and step 2 may be performed with one RH while step 3 and step 4 may be conducted with the other RH.

In step 1, LBC may send a Resource Discovery Request message to RH. This message may contain the following parameters as filters, which the RH may use to search expected resources.

linkBindingRole: indicates to discover resources which support the binding role as specified by this parameter. In the example with linkBindingRole="Source Resource," the LBC requests to find source resources only.

boundToResourceType: indicates the type of resources to be bound to. Since linkBindingRole="Source Resource," this parameter may denote the type of destination resources, which discovered source resources can be bound to.

supportedLinkBindingAttributes: indicates other binding attributes which discovered resources can support.

In step 2, the RH may search resources which meet the filters contained in step 1. The RH may send a Resource Discovery Response message to LBC. This message may contain a list of discovered source resources with their URI and other attributes. In this disclosure, a numOfDestinationResources parameter may be introduced as a new attribute for a source resource to track the number of destination resources which the source resource has already bound to. The numOfDestinationResources parameter can be contained in step 2; it can also be contained in step 1 to be used as a filter, for example, to discover source resources which destination resources are equal to or less than a certain number.

In step 3, similar to step 1, the LBC aims to discover destination resources which meet certain criteria as specified by parameters such as boundToResoureType, supportedLinkBindingMethodsAndAttributes, etc.

In step 4, similar to step 2, the RH sends a list of discovered destination resources to LBC. In this disclosure, the numOfSourceResources parameter may be introduced as a new attribute for a destination resource to track the number of source resources which the destination resource has already bound to. The numOfSourceResources parameter can be contained in step 4; it can also be contained in step 3 to be used as a filter, for example, to discover destination resources which source resources are equal to or less than a certain number.

In step 5, based on discovered source resources and destination resources in step 2 and step 4, the LBC may now have better knowledge on each of them including their binding-related attributes such as boundToResourceType and supportedLinkBindingMethodsAndAttributes. Then, the LBC may generates/formulates/recommends potential link bindings for pairs of a source resource and a destination resource. For example, assume there are two resources: 1) Resource1 is a Type-A resource with linkBindingRole="Source Resource," boundToResourceType="Type-B," and it supports Push binding mode; 2) Resource2 is a Type-B resource with linkBindingRole="Destination Resource," boundToResourceType="Type-A," and it supports Push binding mode. Those two resources may match with each other in term of link binding requirements and the LBC can generate a link binding between those two resources. However, the link binding may not be created yet. There may be a separate procedure for LBC to create generated link bindings at a SRH or a DRH.

In order to take into effect any generated/formulated/recommended link binding, the LBC may need to create recommended link bindings at a DRH (for Poll or Observe mode) or a SRH (for Push mode). One idea behind link binding creation is to let the DRH and the SRH coordinate to notify each other to verify the created link binding so that both entities are aware of the created link binding and its binding attributes; the DRH and the SRH can even exchange their context information during this coordination process. Without this idea, the SRH may not be aware of link bindings created at a DRH for Poll/Observe mode; similarly, the DRH may not be aware of link bindings created at a SRH for Push mode. Such link binding awareness and context exchange between the DRH and the SRH may improve content synchronization between them.

Figure 13:
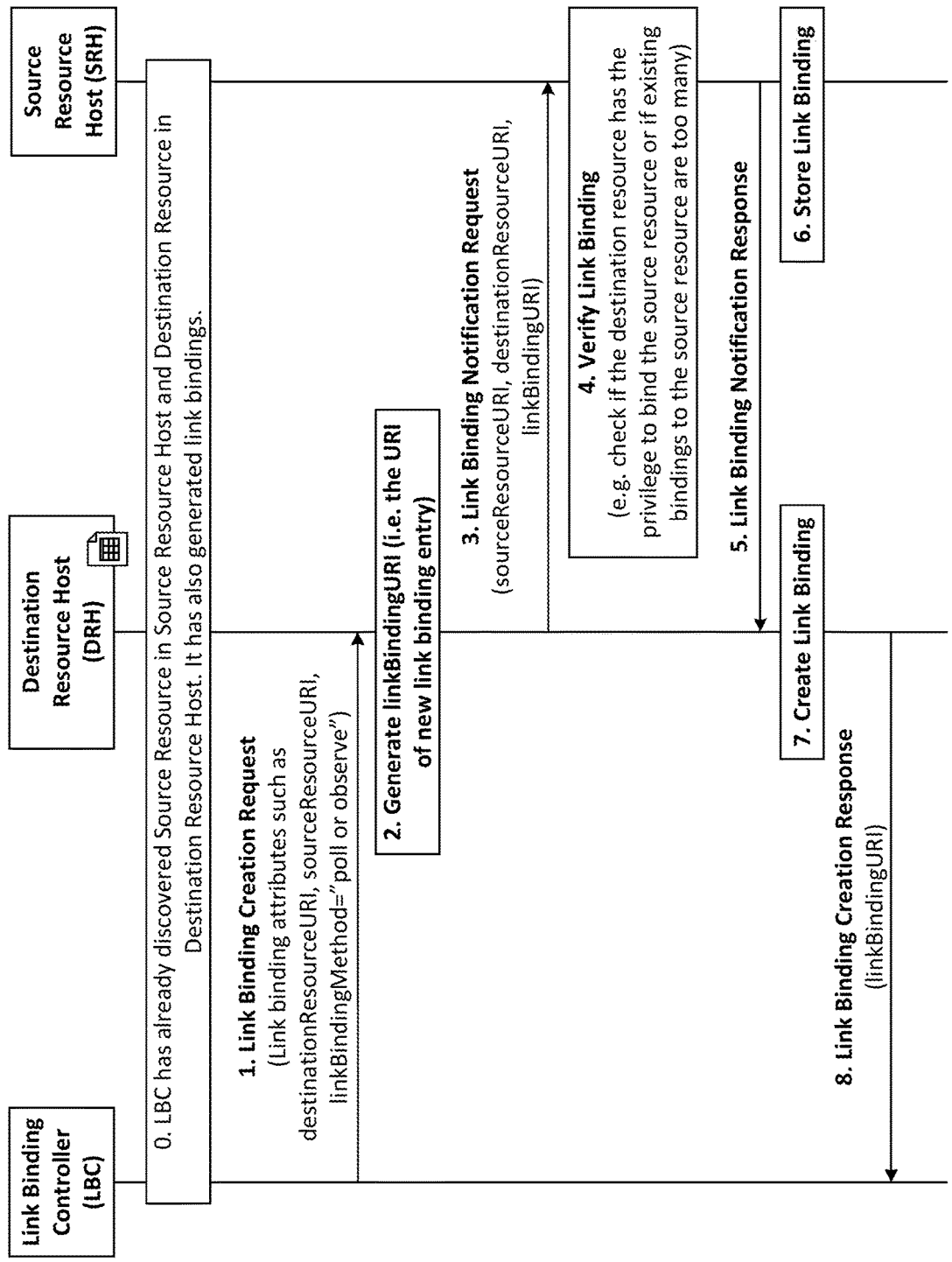
FIG. 13 shows an example option 1 for link binding creation for a poll/observe method.
Figure 14:
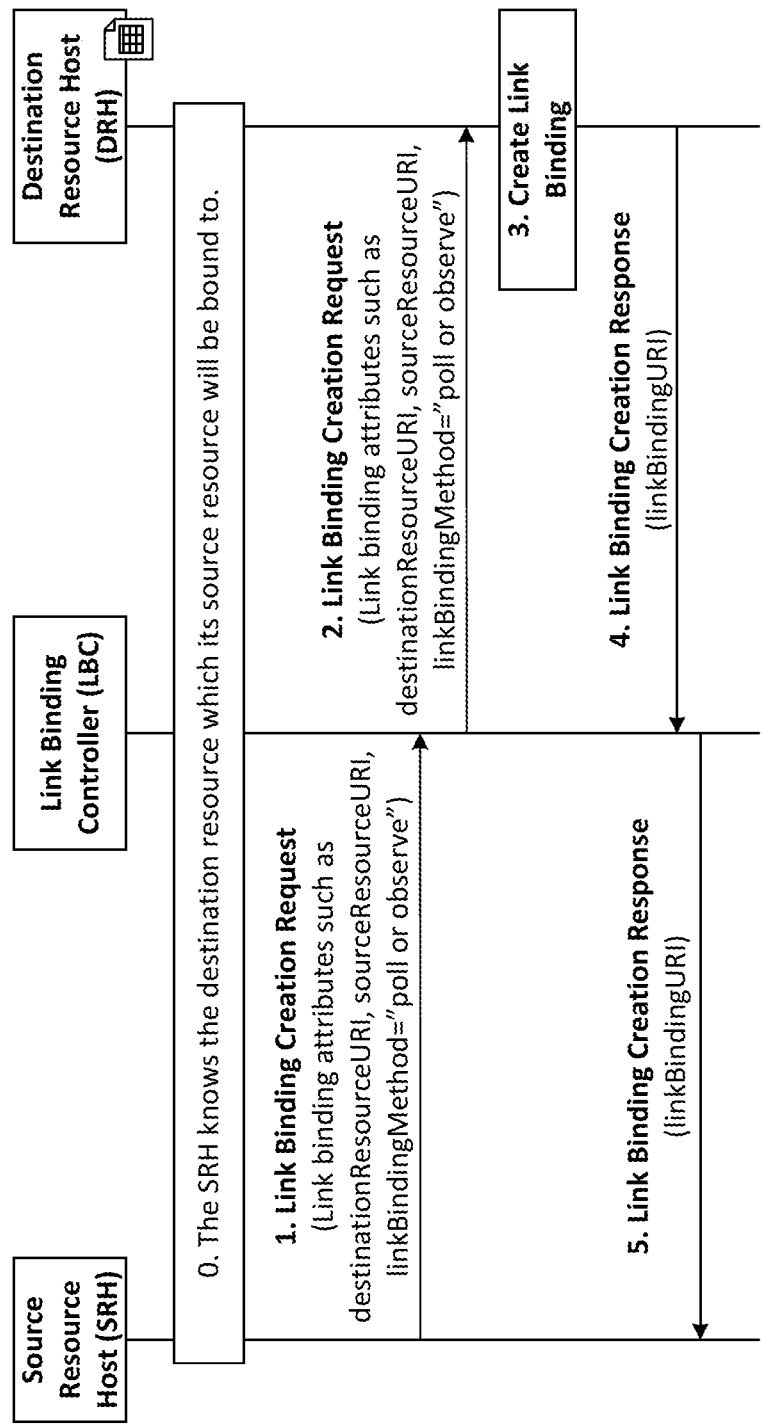
FIG. 14 shows an example option 2 for link binding creation for a poll/observe method.
Figure 15:
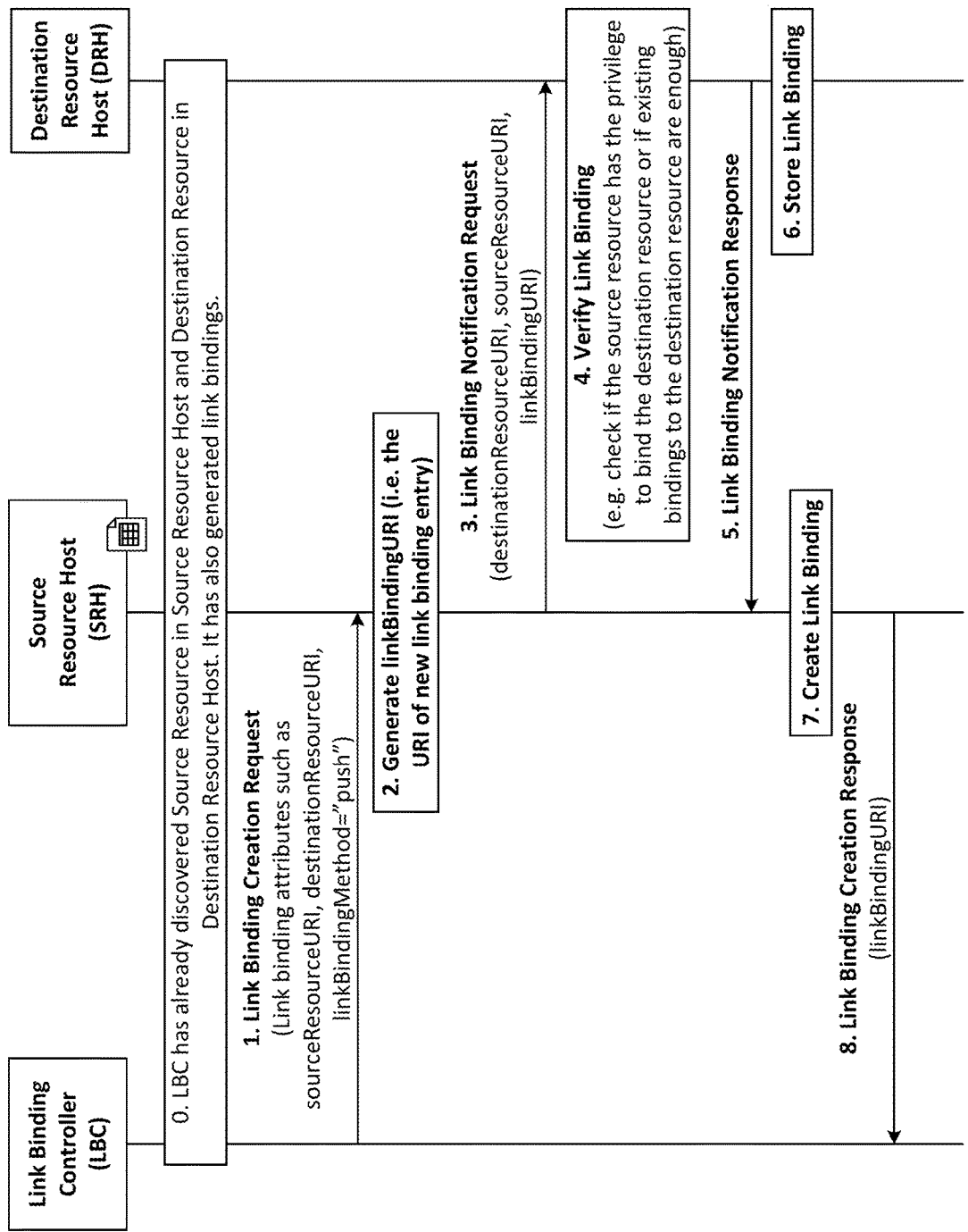
FIG. 15 shows an example option 1 for link binding creation for push method.
Figure 16:
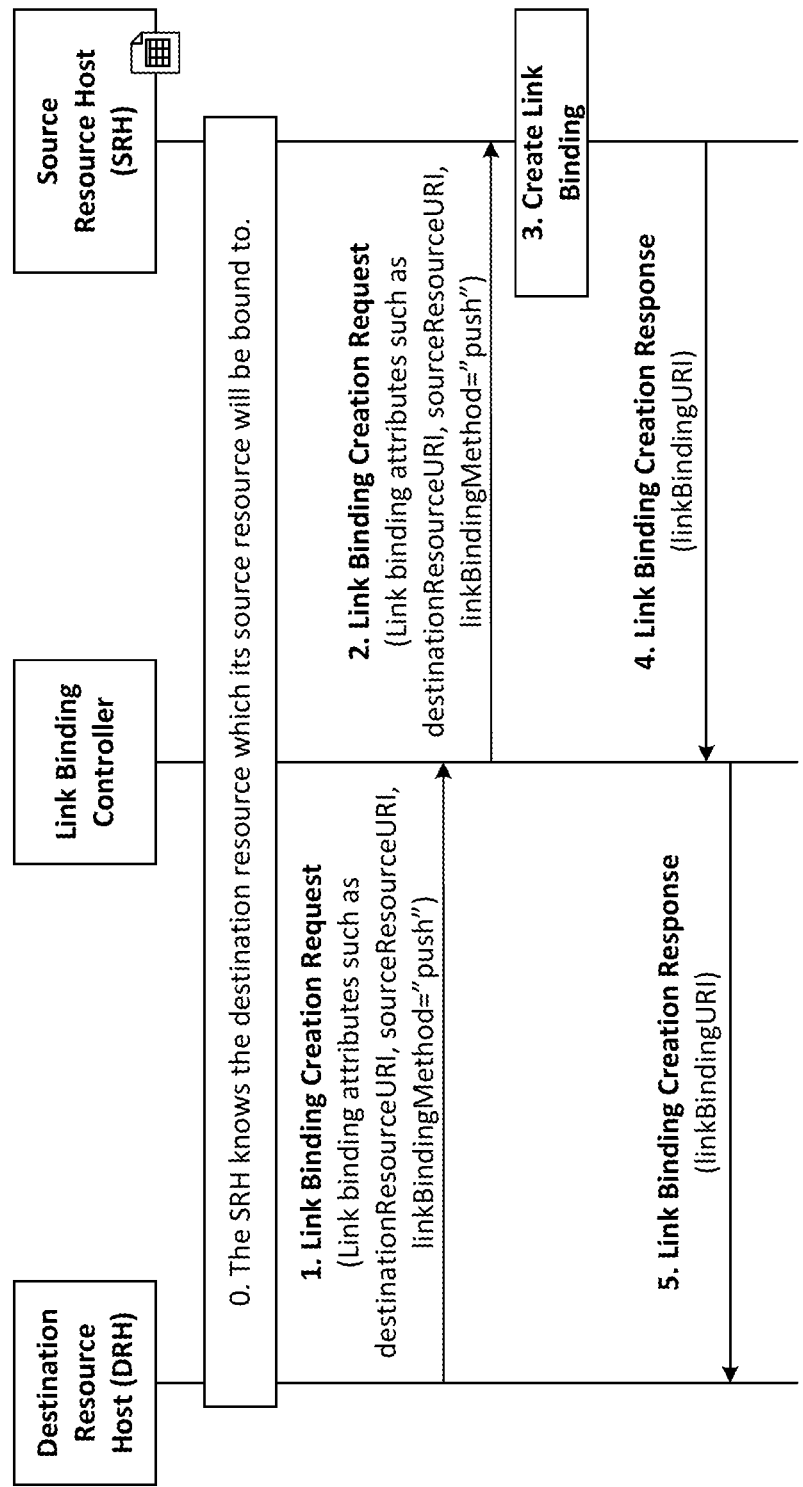
FIG. 16 shows an example option 2 for link binding creation for push method.

FIG. 13 and FIG. 14 provide solutions for creating link bindings at a DRH for Poll/Observe mode, while FIG. 15 and FIG. 16 present mechanisms for creating link bindings at a SRH for Push mode.

steps for the procedure in FIG. 13 are described below:

In step 0, assume the LBC has generated some link bindings (e.g., step 5 in FIG. 12) or has obtained certain link binding recommendations from a RH (e.g., step 4 in FIG. 10). In the following steps, the LBC may create or enforce link bindings at a DRH.

In step 1, the LBC may send a Link Binding Creation Request to the DRH. This message requests to create a new link binding entry/instance at the DRH and may contain the following parameters:

linkBindingMethod: Indicates the method or mode of the link binding entry/instance to be created.

linkBindingAttributes: Contains the values of other attributes of the link binding entry/instance to be created, such as the destination resource URI (e.g., destinationResourceURI), the source resource URI (e.g., sourceResourceURI), minimum period (pmin), maximum period (pmax), change step (cs), greater than (gt), and less than (lt).

In step 2, the DRH may generate a URI for the link binding entry to be created, referred to as linkBindingURI. But the link binding entry may not be created yet because the DRH may first check with the SRH before creating it locally.

In step 3, the DRH may send a Link Binding Notification Request to the SRH. The message serves two potential purposes: 1) inform the SRH that a link binding entry may be created at the DRH and this link binding has an associated source resource hosted at the SRH; and/or 2) request the SRH to verify and approve the link binding entry to be created. This message may include binding attributes as contained in step 1 and linkBindingURI as generated in step 2. Note that the DRH may change the received link binding attributes from step 1 and send their new values in this step 3 to the SRH.

In step 4, the SRH may verify the link binding notification request received from step 3. For example, the SRH may check if the destination resource has the privilege to bind with the source resource. In another example, if existing bindings with the same source resource exceed a threshold, the SRH may reject the link biding request in step 3. Also, if link binding attributes contained in step 3 are inappropriate (e.g., the change step (cs) is too small, maximum period (pmin) is too small, etc.), the SRH may refuse the link binding request in step 3 and/or propose new link binding attributes in step 5 (e.g., based on its context information like sleeping schedule cycle).

In step 5, the SRH may send a Link Binding Notification Response to the DRH. This message is used to inform the DRH if the link binding request in step 3 is approved or rejected. As a result, this message may contain a link binding request status (approved or rejected) and the reason (e.g., the destination resource does not have privilege to bind with the source resource). The SRH may contain its context information (e.g., sleeping schedule cycle, etc.) in this response message so that the DRH may be aware of its context information and can conduct content synchronization more efficiently (e.g., stop sending GET message to the SRH when the SRH may be in sleeping status).

In step 6, if the link binding request in step 3 was approved in step 4, the SRH may store destinationResourceURI, linkBindingURI and other binding attributes locally in different forms (e.g., add them as new attributes of the source resource).

In step 7, the DRH may receive the response in step 5 from the SRH. If the link binding request does get approved, the DRH may now create the link binding entry which has the URI as generated step 2. The created link binding may have several attributes such as destinationResourceURI, sourceResourceURI, linkBindingMethod, minimum period (pmin), maximum period (pmax), change step (cs), greater than (gt), and less than (lt); then the DRH adds linkBindingURI as a new attribute to the destination resource or alternatively, the DRH can directly add those binding attributes (e.g., sourceResourceURI, linkBindingMethod, minimum period (pmin), maximum period (pmax), change step (cs), greater than (gt), and less than (lt)) to the destination resource as its new attributes. If in step 5, the SRH rejects the link binding request, the DRH may discard linkBindingURI being generated in step 2. Alternatively, the DRH may not generate a linkBindingURI in step 2, but generate it in this step when the link binding entry is created. In this case, the DRH may need separate steps to inform the SRH of the generated linkBindingURI.

In step 8, the DRH may send a Link Binding Creation Response to the LBC. If the link binding entry was created in step 7, this message may contain its URI (e.g., linkBindingURI). Alternatively, the DRH may contain the rejected reason (e.g., as received from step 5) in this message. In one embodiment, a SRH can instruct a LBC to create a link binding entry/instance at a DRH if it knows the destination resource. For example, according to procedures in FIG. 10, a RH is able to generate some link binding recommendations including destination resources. FIG. 14 presents steps for this scenario:

In step 0, assume that the SRH knows the destination resource which the source resource may be bound to.

In step 1, the SRH may send a Link Binding Creation Request to the LBC. The SRH may contain its context information (e.g., sleeping schedule cycle, etc.) in this request message so that the DRH may be aware of its context information and can conduct content synchronization more efficiently (e.g., stop sending GET message to the SRH when the SRH may be in sleeping status). This message may contain the following parameters to instruct the LBC to create a link binding entry/instance.

linkBindingMethod: Indicates the method or mode of the link binding entry/instance to be created.

linkBindingAttributes: Contains the values of other attributes of the link binding entry/instance to be created, such as the destination resource URI (e.g., destinationResourceURI), the source resource URI (e.g., sourceResourceURI), minimum period (pmin), maximum period (pmax), change step (cs), greater than (gt), and less than (lt).

In step 2, the LBC may receive the message in step 1, identify the DRH from the parameter destinationResourceURI, and forward the link binding creation request to the DRH.

In step 3, the DRH may create the link binding entry according to parameters contained in step 2. The DRH may use the same process as described in step 4 in FIG. 13 to verify if the link binding creation request should be approved or rejected.

In step 4, the DRH may send a Link Binding Creation Response to the LBC. This message may contain the URI of the created link binding entry/instance (e.g., linkBindingURI), or the rejection reason if step 2 was rejected and the DRH does not create any link binding entry/instance in step 3.

In step 5, the LBC may forward the Link Binding Creation Response to the SRH.

As an alternative to FIG. 14, the SRH may send Link Binding Creation Request directly to the DRH. In this case, the LBC, step 2 and step 4 in FIG. 14 may not be needed. Instead, the SRH may send the Link Binding Creation Request directly to the DRH which then creates the link binding, optionally after authorizing the request with an LBC, and then responds directly with the Link Binding Creation Response message to the SRH.

The procedure in FIG. 15 may be used for creating a link binding entry/instance at a SRH for Push mode. The following steps may be needed:

In step 0, assume a LBC has generated some link bindings (e.g., step 5 in FIG. 12) or has obtained certain link binding recommendations from a RH (e.g., step 4 in FIG. 10). In the following steps, the LBC may create or enforce link bindings at a DRH.

In step 1, the LBC may send a Link Binding Creation Request to the SRH. This message may request to create a new link binding entry/instance at the SRH and may contain the following parameters:

linkBindingMethod: Indicates the method or mode of the link binding entry/instance to be created.

linkBindingAttributes: Contains the values of other attributes of the link binding entry/instance to be created, such as the destination resource URI (e.g., destinationResourceURI), the source resource URI (e.g., sourceResourceURI), minimum period (pmin), maximum period (pmax), change step (cs), greater than (gt), and less than (lt).

In step 2, the SRH may generate a URI for the link binding entry to be created, referred to as linkBindingURI. But the link binding entry may not be created yet because the SRH may first check with the DRH before creating it locally.

In step 3, the SRH may send a Link Binding Notification Request to the DRH. The message may serve two potential purposes: to inform the DRH that a link binding entry may be created at the SRH and this link binding has an associated destination resource hosted at the DRH, and/or to request the DRH to verify and approve the link binding entry to be created. This message may include binding attributes as contained in step 1 and linkBindingURI as generated in step 2. The SRH may change the received link binding attributes from step 1 and send their new values in this step 3 to the DRH.

In step 4, the DRH may verify the link binding notification request received from step 3. For example, it may check if the source resource has the privilege to bind with the destination resource. In another example, if existing bindings with the same destination resource exceed a threshold, the DRH may reject the link biding request in step 3. Also, if link binding attributes contained in step 3 are inappropriate (e.g., the change step (cs) is too small, maximum period (pmin) is too small, etc.), the DRH may refuse the link binding request in step 3 and/or propose new link binding attributes in step 5 (e.g., based on its context information like sleeping schedule cycle).

In step 5, the DRH may send a Link Binding Notification Response to the SRH. This message may not be used to inform the SRH if the link binding request in step 3 is approved or rejected. As a result, this message may contain a link binding request status (approved or rejected) and the reason (e.g., the source resource does not have privilege to bind with the destination resource). The DRH may contain its context information (e.g., sleeping schedule cycle, etc.) in this response message so that the SRH may be aware of its context information and can conduct content synchronization more efficiently (e.g., stop sending PUT message to the DRH when the DRH may be in sleeping status.

In step 6, if the link binding request in step 3 was approved in step 4, the DRH may store sourceResourceURI, linkBindingURI and other binding attributes locally in different forms (e.g., add them as new attributes of the destination resource).

In step 7, the SRH may receive the response in step 5 from the DRH. If the link binding request does get approved, the SRH my now create the link binding entry which has the URI as generated step 2. The create link binding may have several attributes such as destinationResourceURI, sourceResourceURI, linkBindingMethod, minimum period (pmin), maximum period (pmax), change step (cs), greater than (gt), and less than (lt). The SRH may add linkBindingURI as a new attribute to the source resource or alternatively, the SRH can directly add those binding attributes (e.g., destinationResourceURI, linkBindingMethod, minimum period (pmin), maximum period (pmax), change step (cs), greater than (gt), and less than (lt)) to the source resource as its new attributes. If in step 5, the DRH rejects the link binding request, the SRH may discard linkBindingURI being generated in step 2. Alternatively, the SRH may not generate a linkBindingURI in step 2, but may generate it in this step when the link binding entry is created. In this case, the SRH may need separate steps to inform the DRH of the generated linkBindingURI.

In step 8, the DRH my send a Link Binding Creation Response to the LBC. If the link binding entry was created in step 7, this message may contain its URI (e.g., linkBindingURI); otherwise, the DRH may contain the rejected reason (e.g., as received from step 5) in this message.

Alternatively, a DRH can instruct a LBC to create a link binding entry/instance at a SRH if it knows the source resource. For example, according to procedures in FIG. 10, a RH is able to generate some link binding recommendations including source resources. FIG. 16 presents steps for this scenario:

In step 0, assume that the DRH knows the source resource which the source resource may be bound to.

In step 1, the DRH may send a Link Binding Creation Request to the LBC. This message may contain the following parameters to instruct LBC to create a link binding entry/instance:

linkBindingMethod: Indicates the method or mode of the link binding entry/instance to be created.

linkBindingAttributes: Contains the values of other attributes of the link binding entry/instance to be created, such as the destination resource URI (e.g., destinationResourceURI), the source resource URI (e.g., sourceResourceURI), minimum period (pmin), maximum period (pmax), change step (cs), greater than (gt), and less than (lt).

In step 2, the LBC may receive the message in step 1, identify the SRH from the parameter sourceResourceURI, and forward the link binding creation request to the SRH.

In step 3, the SRH may create the link binding entry according to parameters contained in step 2. The SRH may use the same process as described in step 4 in FIG. 15 to verify if the link binding creation request should be approved or rejected.

In step 4, the SRH may send a Link Binding Creation Response to the LBC. This message may contain the URI of the created link binding entry/instance (e.g., linkBindingURI), or the rejection reason if step 2 was rejected and the SRH does not create any link binding entry/instance in step 3.

In step 5, the LBC may forward the Link Binding Creation Response to the DRH. As an alternative to FIG. 16, the DRH may send a Link Binding Creation Request directly to the SRH. In this case, the LBC, step 2 and step 4 in FIG. 16 may not be needed. The DRH may send the Link Binding Creation Request directly to the SRH which may then create the link binding, optionally after authorizing the request with an LBC, and then respond directly with the Link Binding Creation Response message to the DRH.

After link bindings are created between a SRH and a DRH, for example, according to the schemes in FIGS. 17-20, the corresponding SRH and DRH may automatically perform content synchronization based on specified binding methods and other attributes in the created link binding. This binding-aware content synchronization enables:

In Poll mode, when the DRH uses a GET operation to retrieve the content of the source resource, the DRH may additionally inform the SRH that this GET operation is not a regular GET operation, but a special GET operation triggered by a link binding entry/instance by containing binding attributes in this GET operation. Thus, the SRH may be aware of existing link bindings and in turn can be better prepared for upcoming GET operations.

In Push mode, when the SRH sends a PUT operation to push the content of the source resource to the DRH, the SRH may additionally inform the DRH that this PUT operation is not a regular PUT operation, but a special PUT operation triggered by a link binding entry/instance by containing binding attributes in this PUT operation. Thus, the DRH may be aware of existing link bindings and in turn can be better prepared for upcoming PUT operations.

Figure 17:
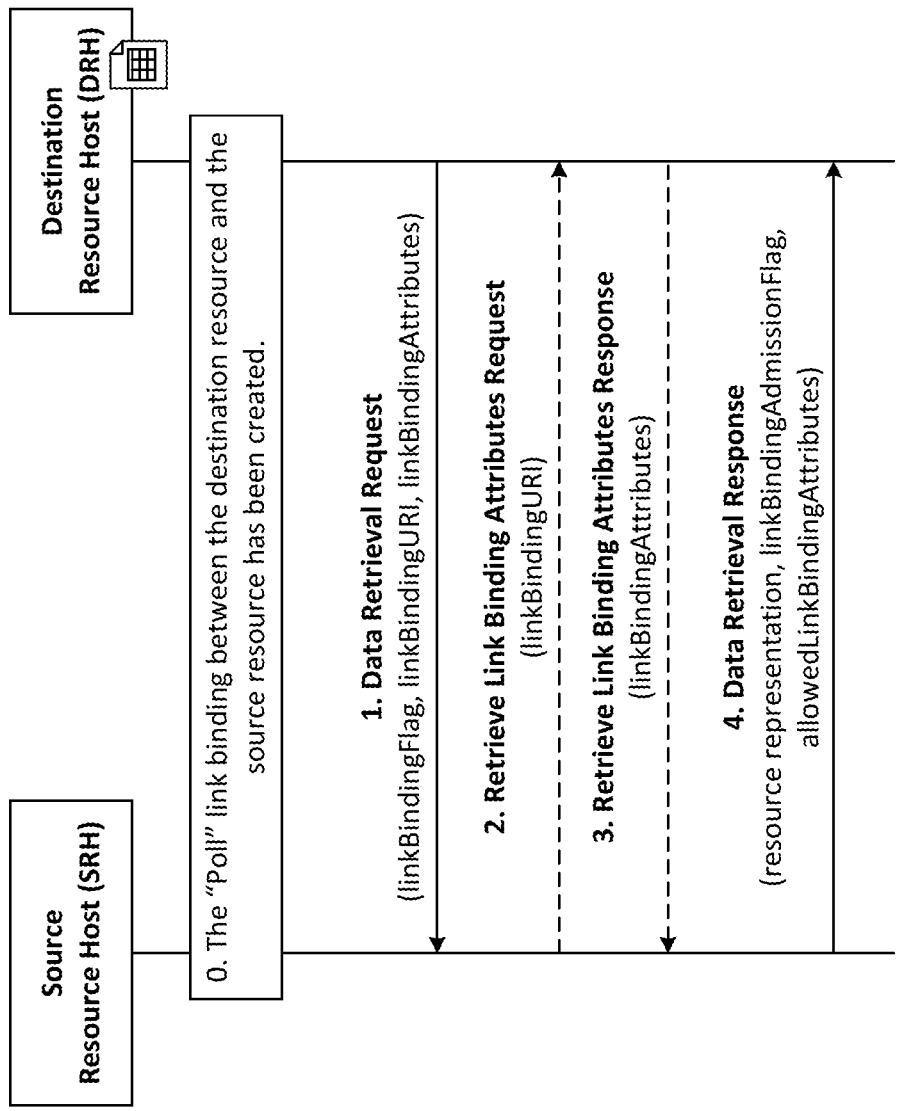
FIG. 17 shows an example binding aware content synchronization under poll method.

FIG. 17 shows an example binding-aware content synchronization procedure for Poll mode.

In step 0, assume a "Poll" link binding between a source resource and a destination resource has been created.

In step 1, the DRH may send a Data Retrieval Request (e.g., a GET operation) to the SRH to retrieve the content of the corresponding source resource. To enable the SRH to be aware of corresponding link binding, this message may contain one or more of the following parameters:

linkBindingFlag: Indicates this GET operation is not a regular GET but a special GET triggered by a link binding.

linkBindingURI: Indicates the URI of corresponding link binding entry which has been created at the DRH. If the GET operation only contains this parameter, the SRH can use separate steps (e.g., step 2 and step 3) to retrieve binding attributes of this link binding.

linkBindingAttributes: Contains the value of other binding attributes for this link binding, for example, minimum period (pmin), maximum period (pmax), change step (cs), greater than (gt), and less than (lt). If this parameter is contained in step 1, step 2 and step 3 may not be needed.

In step 2, the SRH may send a request containing linkBindingURI to retrieve binding attributes of corresponding link binding indicated in step 1.

In step 3, the DRH may send a response back to the SRH. This response message contains linkBindingAttributes of the corresponding link binding as indicated by linkBindingURI.

In step 4, the SRH may send a Data Retrieval response to the DRH. In addition to containing the representation of source resource, this message may also contain the following parameters:

linkBindingAdmissionFlag: This parameter may indicate multiple values: 1) indicate to the DRH that this link binding is rejected and the DRH may not sent any future GET operation on the source resource; 2) indicate to the DRH that this link binding is accepted with the original binding attributes; 3) indicate to the DRH that this link binding is accepted with new binding attributes. The new binding attributes may be contained in next parameter allowedLinkBindingAttributes.

allowedLinkBindingAttributes: this parameter may indicate new binding attributes which the SRH agrees.

Figure 18:
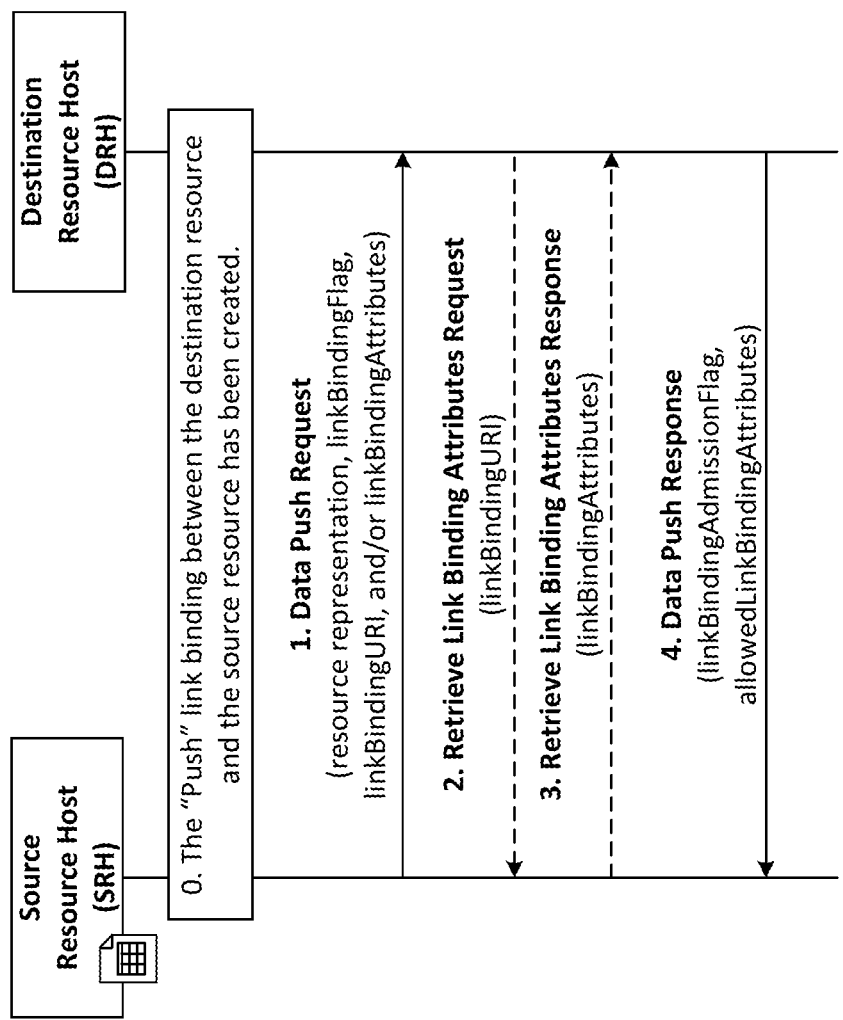
FIG. 18 shows an example binding aware content synchronization under push method.

FIG. 18 shows an example binding-aware content synchronization procedure for Push mode.

In step 0, assume a "Push" link binding between a source resource and a destination resource has been created.

In step 1, the SRH may send a Data Push Request (e.g., a PUT operation) to the DRH to push the content of the corresponding source resource. To enable the DRH to be aware of corresponding link binding, this message may contain one or more of the following parameters linkBindingFlag: Indicates this PUT operation is not a regular PUT but a special PUT triggered by a link binding.

linkBindingURI: Indicates the URI of corresponding link binding entry which has been created at the SRH. If the PUT operation only contains this parameter, the DRH can use separate steps (e.g., step 2 and step 3) to retrieve binding attributes of this link binding.

linkBindingAttributes: Contains the value of other binding attributes for this link binding, for example, minimum period (pmin), maximum period (pmax), change step (cs), greater than (gt), and less than (lt). If this parameter is contained in step 1, step 2 and step 3 may not be needed.

In step 2, the DRH may send a request containing linkBindingURI to retrieve binding attributes of corresponding link binding indicated in step 1.

In step 3, the SRH may send a response back to the DRH. This response message may contain linkBindingAttributes of the corresponding link binding as indicated by linkBindingURI.

In step 4, the DRH may send a Data Push response to the SRH. In addition to containing the representation of source resource, this message may also contain the following parameters:

linkBindingAdmissionFlag: This parameter may indicate multiple values: 1) indicate to the SRH that this link binding is rejected and the SRH may not send any future PUT operation on the source resource; 2) indicate to the SRH that this link binding is accepted with the original binding attributes; and 3) indicate to the SRH that this link binding is accepted with new binding attributes. New binding attributes may be contained in next parameter allowedLinkBindingAttributes.

allowedLinkBindingAttributes: Indicate new binding attributes which the DRH agrees.

Figure 19:
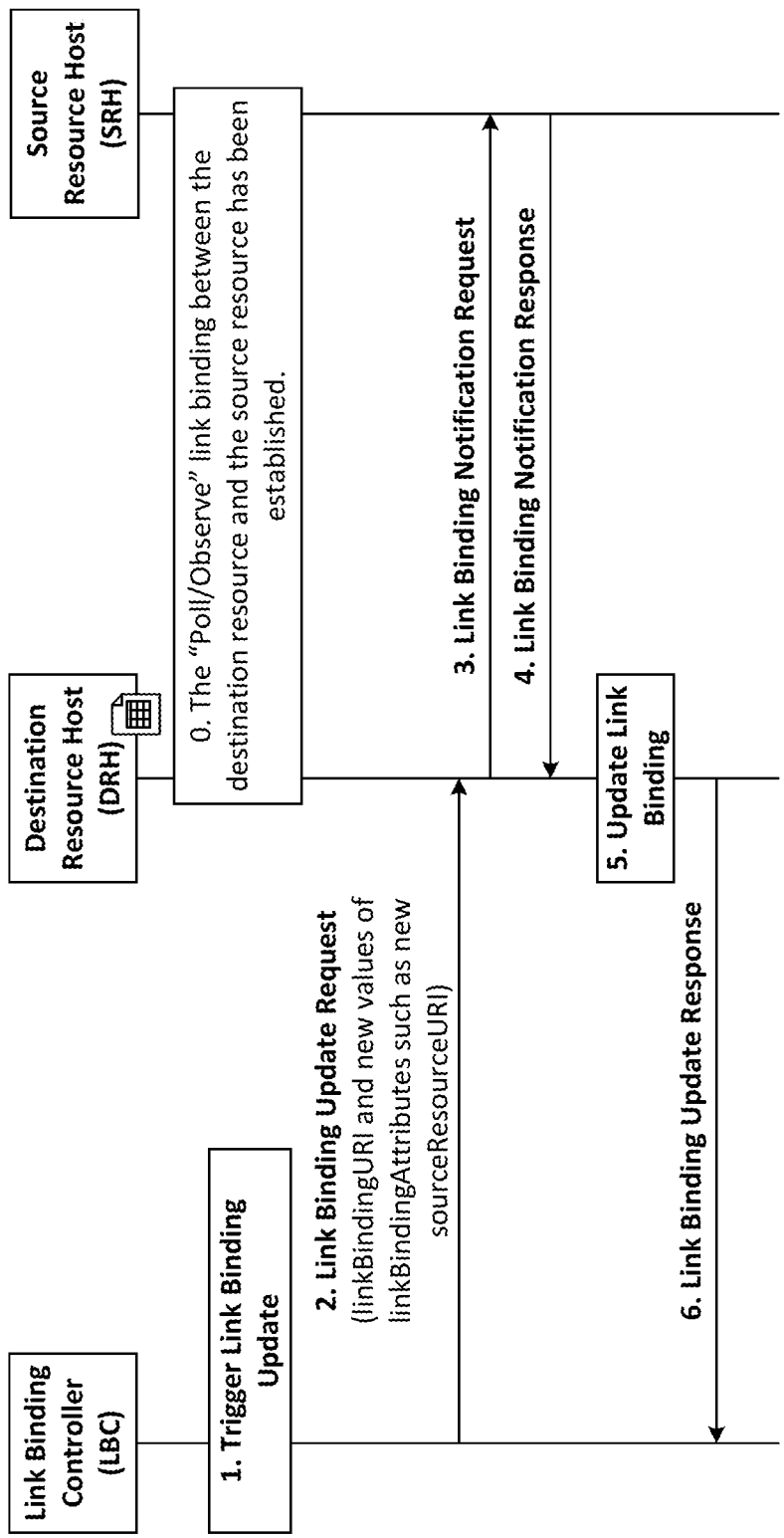
FIG. 19 shows an example option 1 for a link binding update for a poll/observe method.
Figure 20:
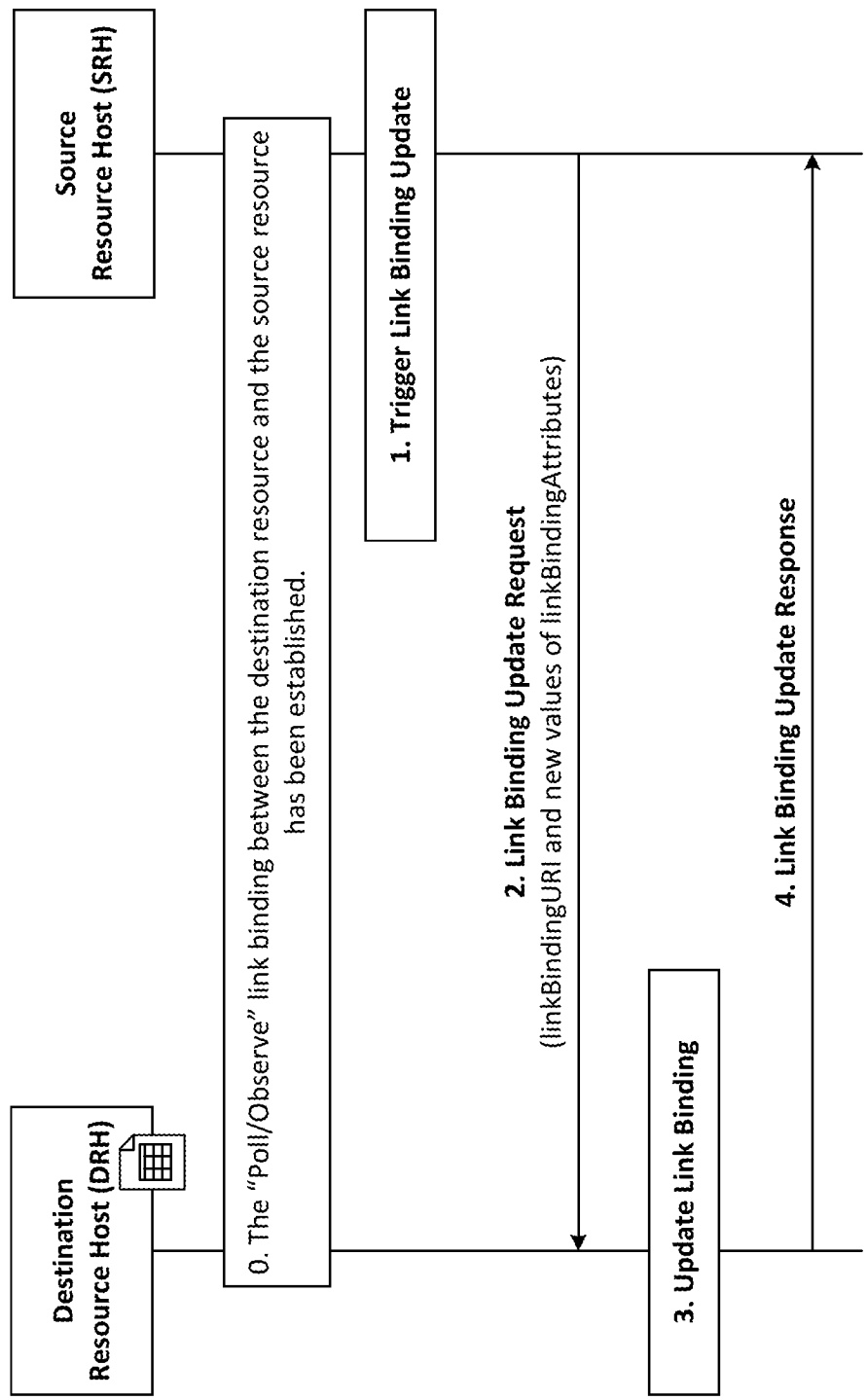
FIG. 20 shows an example option 2 for a link binding update for a poll/observe method.
Figure 21:
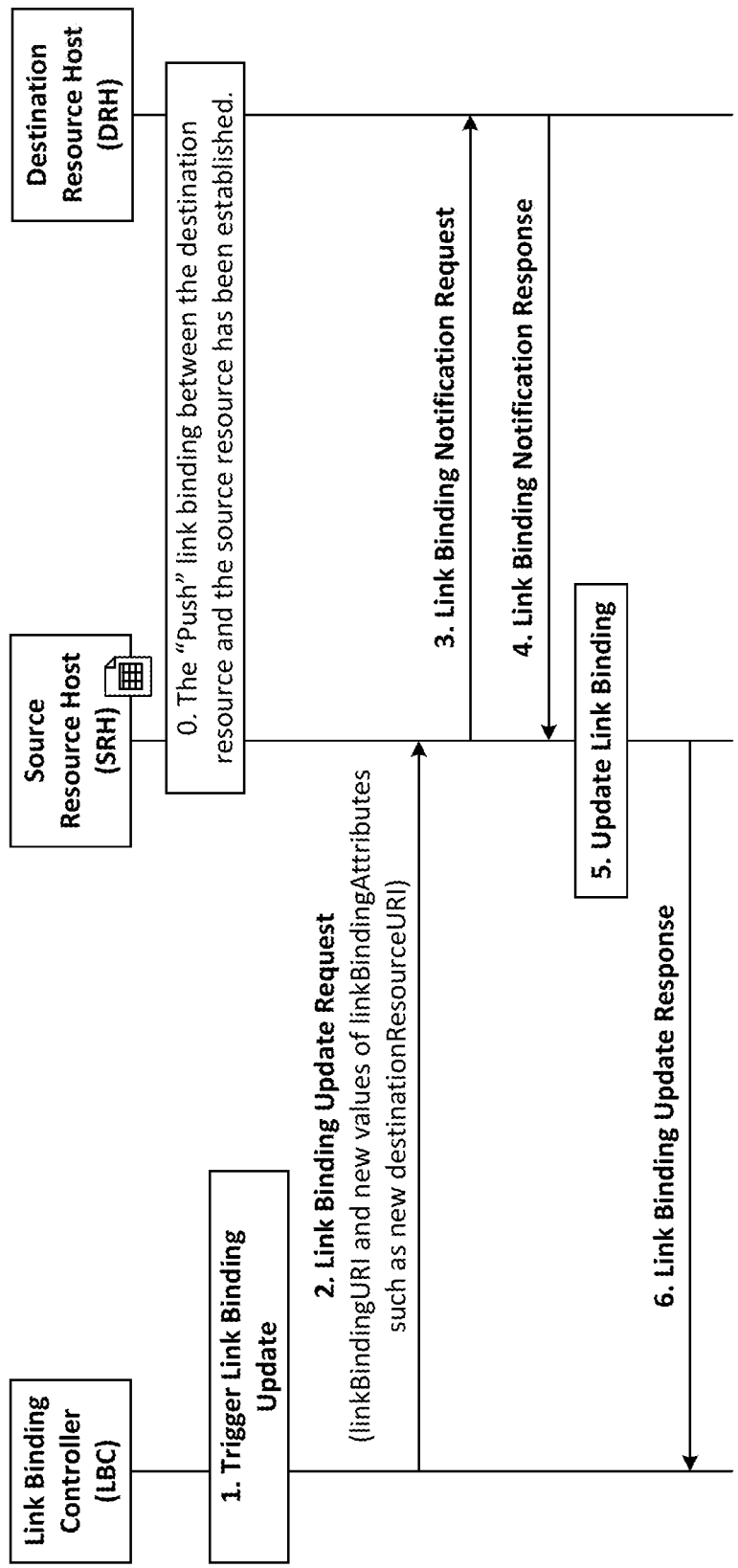
FIG. 21 shows an example option 1 for a link binding update for a push method.
Figure 22:
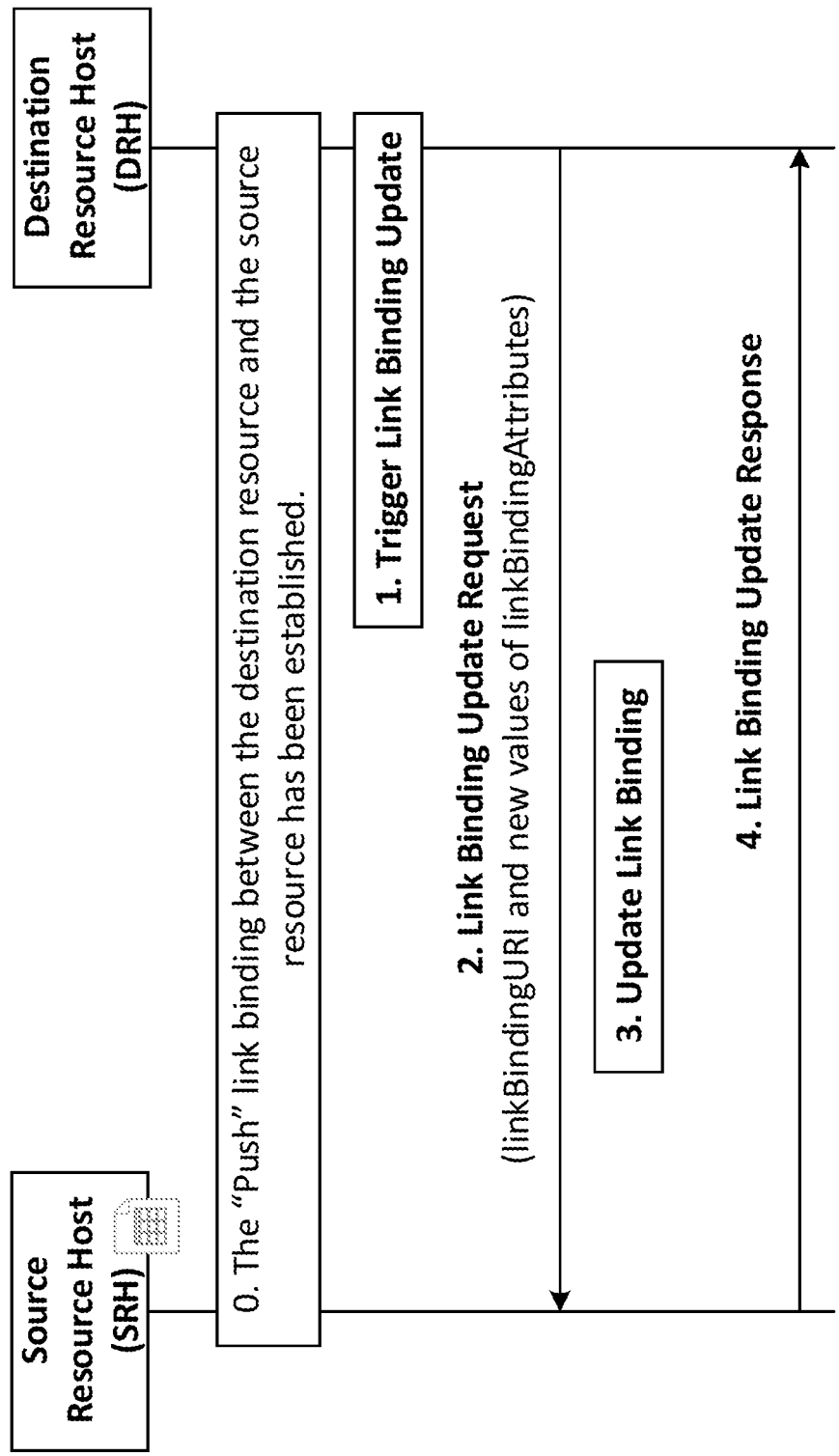
FIG. 22 shows an example option 2 for a link binding update for a push method.

After a link binding entry/instance is created at a DRH (for Poll/Observe mode) or at a SRH (for Push mode), its binding attributes can be updated by LBC, the SRH, and/or the DRH. FIG. 19 and FIG. 20 show an example link binding update procedure for Poll/Observe mode, while FIG. 21 and FIG. 22 illustrate an example link binding update procedure for Push mode.

FIG. 19 shows a link binding update procedure for Poll/Observe mode triggered by a LBC which knows the URI of a created link binding.

In step 0, assume a "Poll/Observe" link binding between a source resource and a destination resource has been created/established.

In step 1, the LBC may trigger a link binding update (e.g., it discovers a better source resource, or it receives new attributes about an existing link binding).

In step 2, the LBC may send a Link Binding Update Request to the DRH to request to update an existing link binding entry which has been previously created at the DRH. This message may contain the following parameters:

linkBindingURI: Indicates the URI of an existing link binding entry to be updated. The DRH uses this parameter to locate the existing link binding entry.

linkBindingAttributes: Indicates the new value of binding attributes for the existing link binding entry as denoted by linkBindingURI. Binding attributes to be updated may include: destinationResourceURI, sourceResourceURI, minimum period (pmin), maximum period (pmax), change step (cs), greater than (gt), and less than (lt).

In step 3, if the binding attribute to be updated is not sourceResourceURI or the SRH does not change, the DRH may send a Link Binding Notification Request to the SRH. This message contains linkBindingURI and other new binding attribute values as contained in step 2. This step is similar to step 3 in FIG. 13 for creating a link binding entry.

If sourceResourceURI is to be updated and the new source resource is hosted at another SRH, this request may be sent to the new SRH. Then, the DRH may need to send a separate message to the old SRH to cancel the link binding entry and its attributes which the SRH may maintain. This separate message may be referred to herein as link binding cancellation.

In step 4, the SRH may verify new binding attributes (similar to step 4 in FIG. 13) and may send a response to the DRH accordingly (similar to step 5 in FIG. 13).

In step 5, based on the response from step 4, the DRH may update the existing link binding entry as denoted by linkBindingURI in step 2. If the SRH rejects the new binding attributes as indicated in step 4, the DRH may not update the existing link binding and pass the rejection reason in step 6 to the LBC.

For "Observe" mode which implies that there is an observation or subscription being already created at the SRH by the DRH, the DRH may need to send another message to the SRH to update this observation or subscription according to new binding attributes as contained in step 2. As a result, the SRH, after receiving this message from the DRH, may update the corresponding observation or subscription and then send a response message to the DRH.

In step 6, the DRH may send a Link Binding Update Response to the LBC. This message may contain an update status (e.g., if the update has been successfully conducted or been rejected).

FIG. 20 shows an example procedure for a SRH to request to directly update binding attributes of an existing link binding entry which has been previously created at the DRH.

In step 0, assume a "Poll/Observe" link binding between a source resource and a destination resource has been created/established.

In step 1, the SRH may trigger link binding update (e.g., change to another source resource, increase change step (cs), decrease maximum period (pmax), etc).

In step 2, the SRH may send a Link Binding Update Request to the DRH to update an existing link binding entry which has been previously created at the DRH. This message may contain the following parameters:

linkBindingURI: Indicates the URI of an existing link binding entry to be updated. The DRH may use this parameter to locate the existing link binding entry.

linkBindingAttributes: Indicates the new value of binding attributes for the existing link binding entry as denoted by linkBindingURI. Binding attributes to be updated may include: destinationResourceURI, sourceResourceURI, minimum period (pmin), maximum period (pmax), change step (cs), greater than (gt), and less than (lt).

In step 3, the DRH may locate the existing link binding entry and update it with new link binding attribute values contained in step 3.

For "Observe" mode, which may imply that there is an observation or subscription being already created at the SRH by the DRH, the DRH may need to send another message to the SRH to update this observation or subscription according to new binding attributes as contained in step 2. As a result, the SRH after receiving this message from the DRH may update the corresponding observation or subscription and then send a response message to the DRH.

In step 4, the DRH may send a response to SRH to indicate if the requested update has been successfully performed. This message may contain linkBindingURI if the existing link binding entry was updated in step 3 with a new URI. In one embodiment, instead of sending Link Binding Update Request directly to the DRH, the SRH can send it to a LBC which may forward the Link Binding Update Request to the DRH. Then, the DRH may update the existing link binding entry and send a Link Binding Update Response to the LBC which may forward the response to the SRH.

FIG. 21 presents an example link binding update procedure for Push mode triggered by a LBC which knows the URI of a created link binding.

In step 0, assume a "Push" link binding between a source resource and a destination resource has been created/established.

In step 1, the LBC may trigger link binding update (e.g., it discovers a better source resource, or it receives new attributes about an existing link binding).

In step 2, LBC may send a Link Binding Update Request to the SRH to request to update an existing link binding entry which has been previously created at the SRH. This message may contain the following parameters:

linkBindingURI: Indicates the URI of an existing link binding entry to be updated. The DRH may use this parameter to locate the existing link binding entry.

linkBindingAttributes: Indicates the new value of binding attributes for the existing link binding entry as denoted by linkBindingURI. Binding attributes to be updated may include: destinationResourceURI, sourceResourceURI, minimum period (pmin), maximum period (pmax), change step (cs), greater than (gt), and less than (lt).

In step 3, if the binding attribute to be updated is not destinationResourceURI or the DRH does not change, the SRH may send a Link Binding Notification Request to the DRH. This message contains linkBindingURI and other new binding attribute values as contained in step 2. This step is similar to step 3 in FIG. 15 for creating a link binding entry.

If destinationResourceURI is to be updated and the new destination resource is hosted at another DRH, this request may be sent to the new DRH. The SRH may send a separate message to the old DRH to cancel the link binding entry and its attributes which the DRH may maintain; this separate message may be referred to herein as link binding cancellation.

In step 4, the DRH may verify new binding attributes (similar to step 4 in FIG. 15) and send a response to the SRH accordingly (similar to step 5 in FIG. 15).

In step 5, based on the response from step 4, the SRH may update existing link binding entry as denoted by linkBindingURI in step 2. If the DRH rejects the new binding attributes as indicated in step 4, the SRH may not update the existing link binding and pass the rejection reason in step 6 to the LBC.

In step 6, the SRH may send a Link Binding Update Response to the LBC. This message may contain an update status (e.g., if the update has been successfully conducted or been rejected).

FIG. 22 shows an example procedure for a DRH to request to directly update binding attributes of an existing link binding entry which has been previously created at the SRH.

In step 0, assume a "Push" link binding between a source resource and a destination resource has been created/established.

In step 1, the DRH may trigger a link binding update (e.g., change to another destination resource, increase change step (cs), decrease maximum period (pmax), etc.).

In step 2, the DRH may send a Link Binding Update Request to the SRH to update an existing link binding entry which has been previously created at the SRH. This message may contain the following parameters:

linkBindingURI: Indicates the URI of an existing link binding entry to be updated. The SRH may use this parameter to locate the existing link binding entry.

linkBindingAttributes: Indicates the new value of binding attributes for the existing link binding entry as denoted by linkBindingURI. Binding attributes to be updated may include: destinationResourceURI, sourceResourceURI, minimum period (pmin), maximum period (pmax), change step (cs), greater than (gt), and less than (lt).

In step 3, the SRH may locate the existing link binding entry and update it with new link binding attribute values contained in step 3.

In step 4, the SRH may send a response to the DRH to indicate if the requested update has been successfully performed. This message may contain linkBindingURI if the existing link binding entry was updated in step 3 with a new URI. In one embodiment, instead of sending Link Binding Update Request directly to the SRH, the DRH can send it to a LBC which may forward the Link Binding Update Request to the SRH. Then, the SRH may update the existing link binding entry and send a Link Binding Update Response to the LBC which may forward the response to the DRH.

After a link binding has been created, a LBC, a DRH, and/or a SRH may want to pause content synchronization but may not want to remove the corresponding link binding. For this purpose, the LBC, the DRH and/or the SRH can initiate to suspend the link binding. As a result, content synchronization as described by the link binding may be halted but the link binding itself may still be maintained at the DRH (for Poll/Observe mode) or at the SRH (for Push mode).

Figure 23:
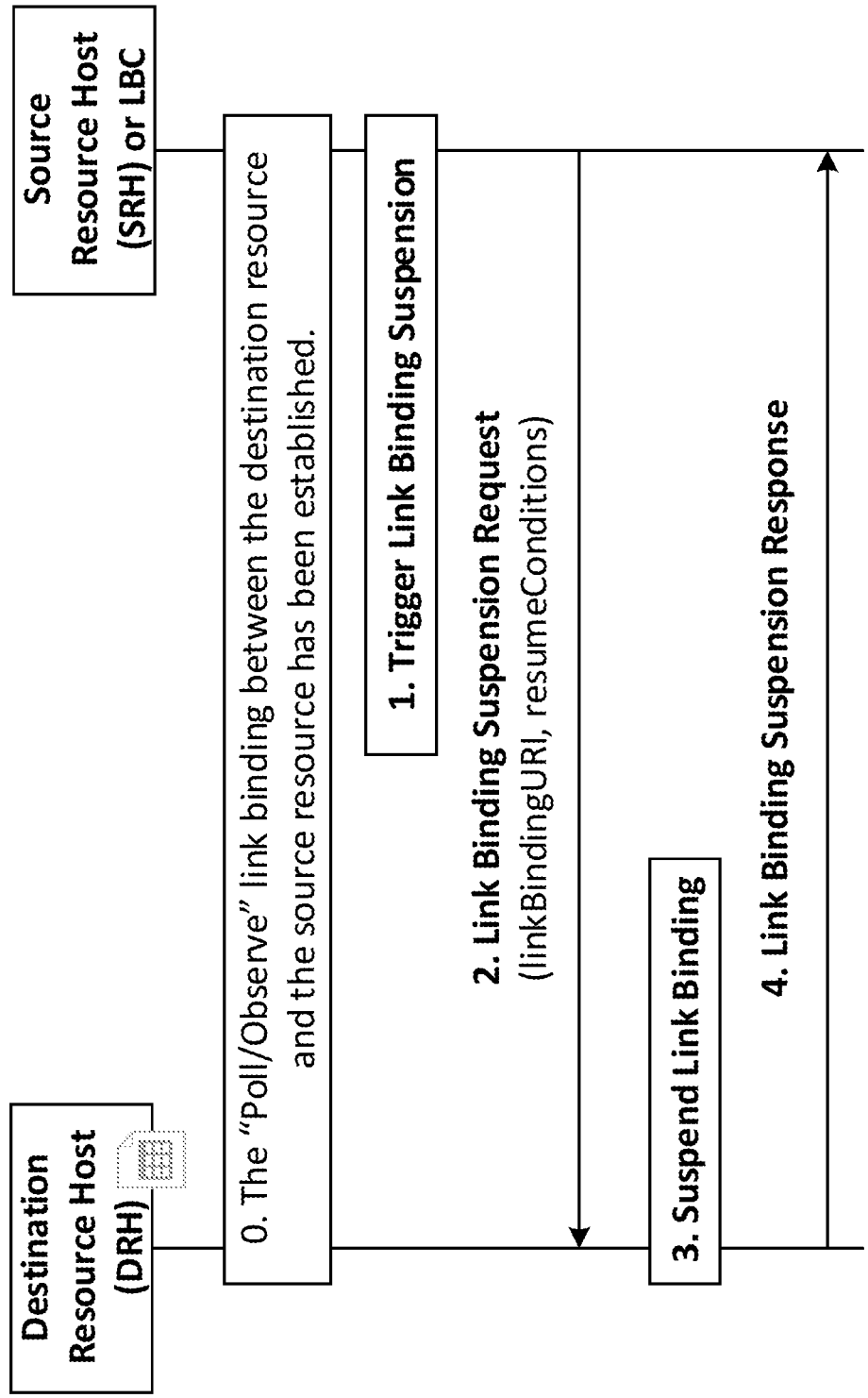
FIG. 23 shows an example link binding suspension for a poll/observe method.

FIG. 23 illustrates an example procedure of link binding suspension for Poll/Observe Mode. The LBC or the corresponding SRH may send a Link Binding Suspension Request to the DRH to suspend a particular created link binding at the DRH for a certain time period. The DRH may mark the link binding as suspended but may not remove it. The DRH may then send a Link Binding Suspension Response to the SRH or the LBC. When a created link binding for Poll is suspended, the DRH may not send periodical GET to the SRH anymore. For Observe mode, after a created link binding is suspended, the DRH may further contact the SRH to pause or cancel corresponding observation or subscription which has been created at the SRH as requested by the DRH.

In step 0, assume a "Poll/Observe" link binding between a source resource and a destination resource has been created/established.

In step 1, the SRH or the LBC may trigger to suspend a link binding. For example, the SRH may have limited resources (e.g., energy) to support future content synchronization with the DRH, or the LBC may simply want to stop the content synchronization from the SRH to the DRH for some time. Note that during the link binding creation phase, either the LBC or the SRH may know the URI for the created link binding.

In step 2, the SRH or the LBC may send a Link Binding Suspension Request to the DRH to suspend a created link binding. This message may contain the following parameters to specify the link binding to be suspended and the time duration for suspension:

linkBindingURI: The URI of an existing link binding at the DRH which may need to be suspended.

resumeConditions: The condition for the DRH to resume the link binding as denoted by linkBindingURI parameter in the future after it is suspended. This parameter may just simply indicate the time duration which the link binding may need to be suspended. In one embodiment, this parameter may not contain such a time duration but may simply indicate that the suspended link binding can be resumed only when the SRH or the LBC actively requests to resume it.

In step 3, the DRH may receive the Link Binding Suspension Request message from step 2. The DRH may use the linkBindingURI contained in step 2 to locate the link binding and suspend it. The DRH may also store resumeConditions as received from step 2 and may use this parameter to appropriately resume the suspended link binding in the future. If step 1 and step 2 are triggered by the LBC and the binding mode is "Observe," which may imply that there is an observation or subscription being already created at the SRH by the DRH, the DRH may send another message to the SRH to pause or cancel this observation or subscription. As a result, the SRH after receiving this message from the DRH may pause or cancel the observation or subscription and then send a response message to the DRH.

In step 4, the DRH may send a Link Binding Suspension Response to the SRH or the LBC to inform it if the link binding suspension as requested in step 2 is performed successfully or not. In addition, for "Poll/Observe" mode, the DRH itself may decide to suspend a created link binding. In this case, it may first suspend the link binding. Then it may contact the SRH and/or the LBC to inform that the link binding has been suspended. For "Observe" mode, which may imply that there is an observation or subscription being already created at the SRH by the DRH, the DRH may send another message to the SRH to pause or cancel this observation or subscription. As a result, the SRH after receiving this message from the DRH may pause or cancel the observation or subscription and then send a response message to the DRH.

Figure 24:
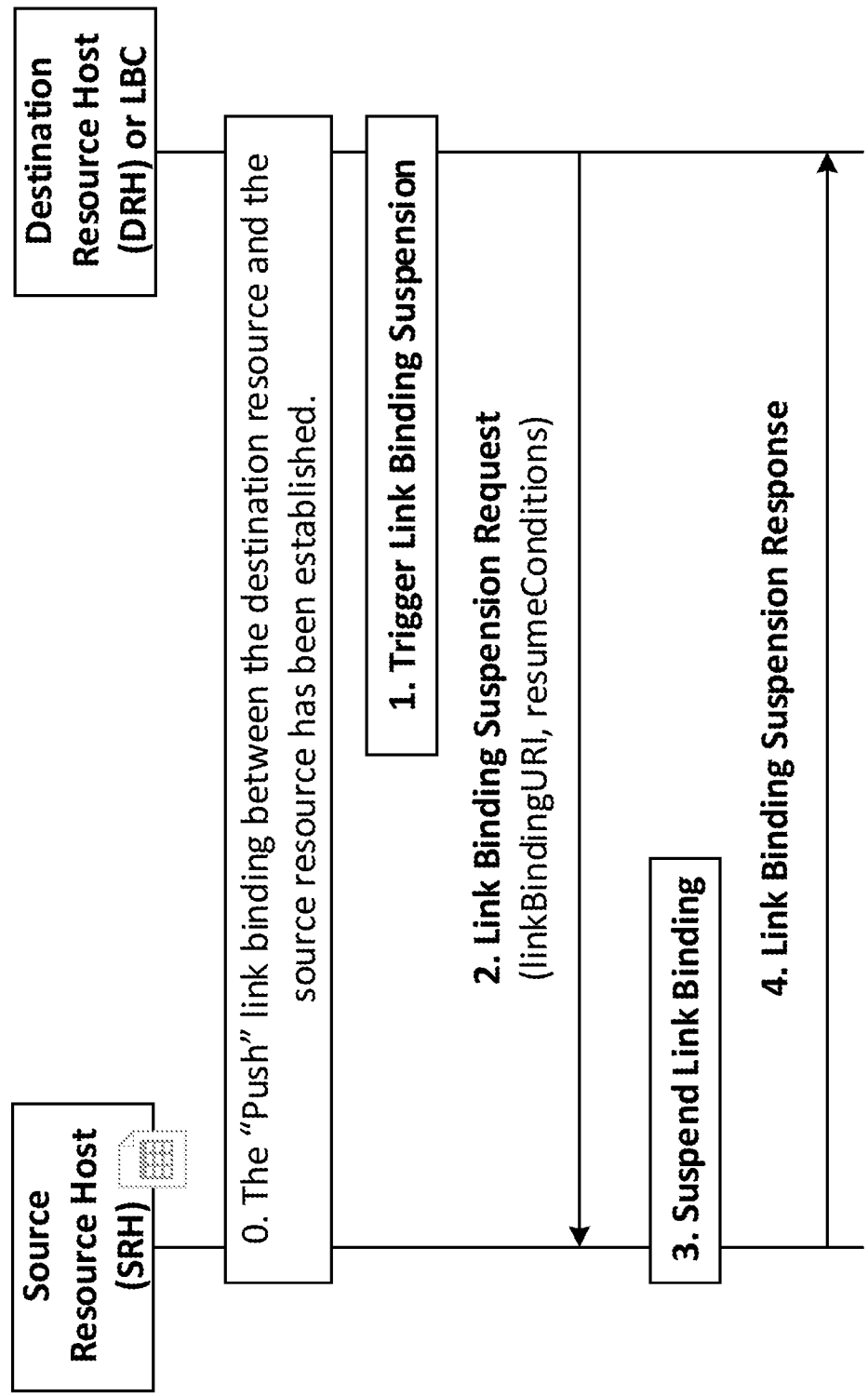
FIG. 24 shows an example link binding suspension for a push method.

FIG. 24 illustrates an example procedure of link binding suspension for Push Mode. The LBC or the corresponding DRH may send a Link Binding Suspension Request to the SRH to suspend a particular created link binding at the SRH for a certain time period. The SRH may mark the link binding as suspended but may not remove it after receiving the request from the DRH or the LBC. Then, the SRH may send a Link Binding Suspension Response to the DRH or the LBC. When a created link binding for Push mode is suspended, the SRH may not send periodical PUT to the DRH anymore.

In step 0, assume a "Push" link binding between a source resource and a destination resource has been created/established.

In step 1, the DRH or the LBC may trigger to suspend a link binding. For example, the DRH may have limited resources (e.g., energy) to support future content synchronization with the SRH or the LBC may simply want to stop the content synchronization from the SRH to the DRH for some time. Note that during the link binding creation phase, either the LBC or the DRH may know the URI for the created link binding.

In step 2, the DRH or the LBC may send a Link Binding Suspension Request to the SRH to suspend a created link binding. This message may contain the following parameter to specify the link binding to be suspended and the time duration for suspension:

linkBindingURI: The URI of an existing link binding at the SRH which may need to be suspended.

resumeConditions: The condition for the SRH to resume the link binding as denoted by linkBindingURI parameter in the future after it is suspended. This parameter may just simply indicate the time duration which the link binding may need to be suspended. This parameter may not contain such a time duration but simply indicate that the suspended link binding can be resumed only when the DRH or the LBC actively requests to resume it.

In step 3, the SRH may receive the Link Binding Suspension Request message from step 2 and may use the linkBindingURI contained in step 2 to locate the link binding and suspend it. The SRH may also store resumeConditions as received from step 2 and may use this parameter to appropriately resume the suspended link binding in the future.

In step 4, the SRH may send a Link Binding Suspension Response to the DRH or the LBC to inform it if the link binding suspension as requested in step 2 was performed successfully or not. In addition, for "Push" mode, the SRH itself may decide to suspend a created link binding. In this case, it first suspends the link binding. Then it may contact the DRH and/or the LBC to inform that the link binding has been suspended.

After a link binding has been suspended, a LBC, a DRH, and/or a SRH may want to resume it and to restore content synchronization from the SRH to the DRH. For this purpose, the LBC, the DRH and/or the SRH can initiate to resume the suspended link binding.

Figure 25:
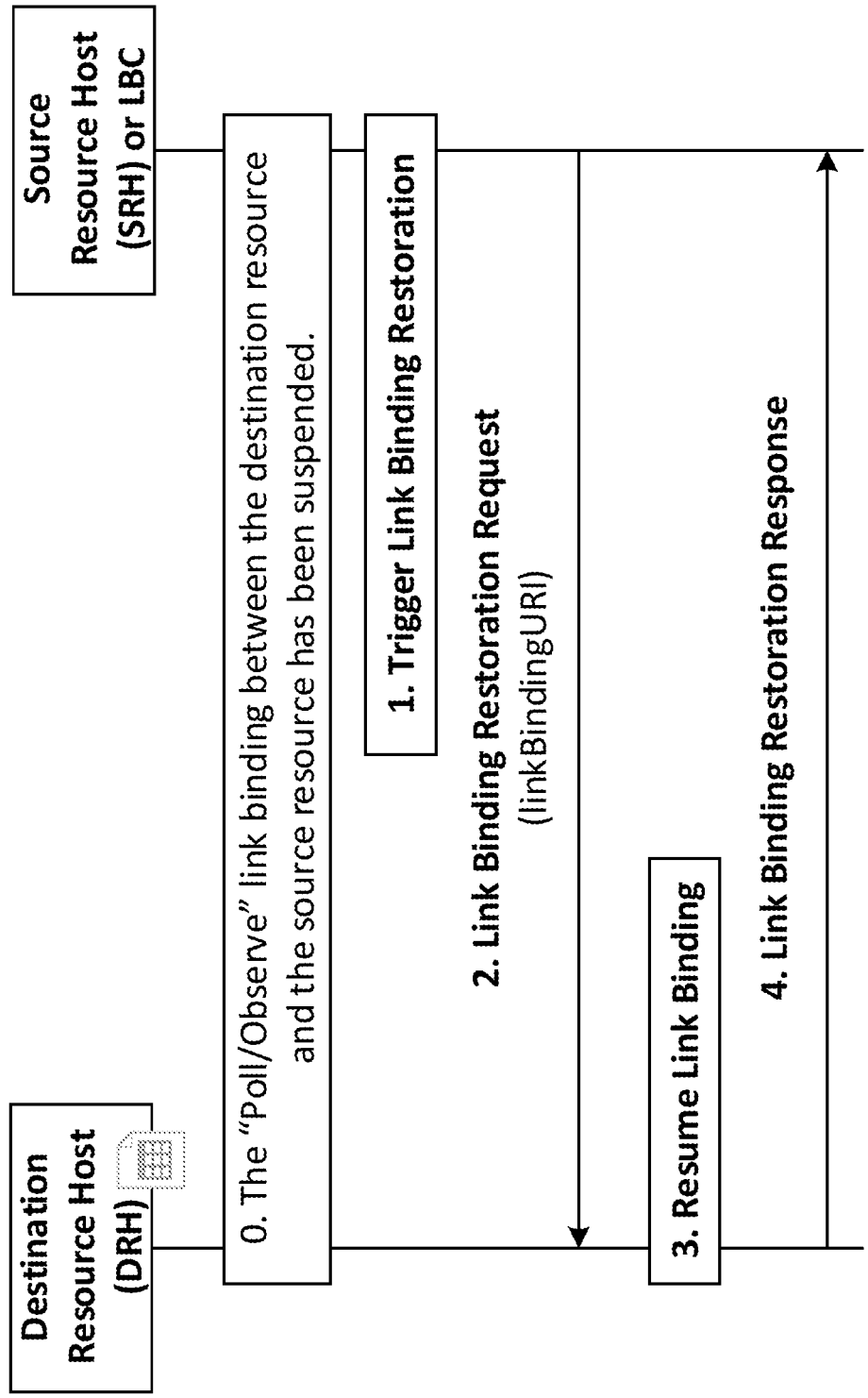
FIG. 25 shows an example link binding restoration for a poll/observe method.

FIG. 25 illustrates an example procedure of link binding restoration for Poll/Observe Mode. The LBC or the corresponding SRH may send a Link Binding Restoration Request to the DRH to resume a suspended link binding at the DRH. The DRH may mark the link binding as resumed and may send a Link Binding Restoration Response to the SRH or the LBC. When a suspended link binding for Poll is resumed, the DRH may restart to send periodical GET to the SRH. For Observe mode, after a suspended link binding is resumed, the DRH may further contact the SRH to resume (or recreate) the observation or subscription which has been suspended (or cancelled) by the DRH during Link Binding Suspension procedure as shown in FIG. 23.

In step 0, assume a "Poll/Observe" link binding between a source resource and a destination resource has been suspended.

In step 1, the SRH or the LBC may trigger to resume a link binding. For example, the SRH may have more resources (e.g., energy) to support future content synchronization with the DRH or the LBC may simply want to resume the content synchronization from the SRH to the DRH.

In step 2, the SRH or the LBC may send a Link Binding Restoration Request to the DRH to resume a created link binding. This message contains the URI of the suspended link binding.

In step 3, the DRH may receive the Link Binding Suspension Request message from step 2 and may use the linkBindingURI contained in step 2 to locate the link binding and resume it. If step 1 and step 2 are triggered by the LBC and the binding mode is "Observe," which my imply that there is an observation or subscription being already paused (or cancelled) at the SRH by the DRH, the DRH may send another message to the SRH to resume (or recreate) this observation or subscription. As a result, the SRH after receiving this message from the DRH may resume (or recreate) the observation or subscription and then send a response message to the DRH.

In step 4, the DRH may send a Link Binding Restoration Response to the SRH or the LBC to inform it if the link binding restoration as requested in step 2 is performed successfully or not. In addition, for "Poll/Observe" mode, the DRH itself may decide to resume a suspended link binding. In this case, it may first resume the link binding. It may then contact the SRH and/or the LBC to inform that the link binding has been resumed. For "Observe" mode which may imply that there is an observation or subscription being already paused (or cancelled) at the SRH by the DRH, the DRH may send another message to the SRH to resume (or recreate) this observation or subscription. As a result, the SRH after receiving this message from the DRH may resume (or recreate) the observation or subscription and then send a response message to the DRH.

Figure 26:
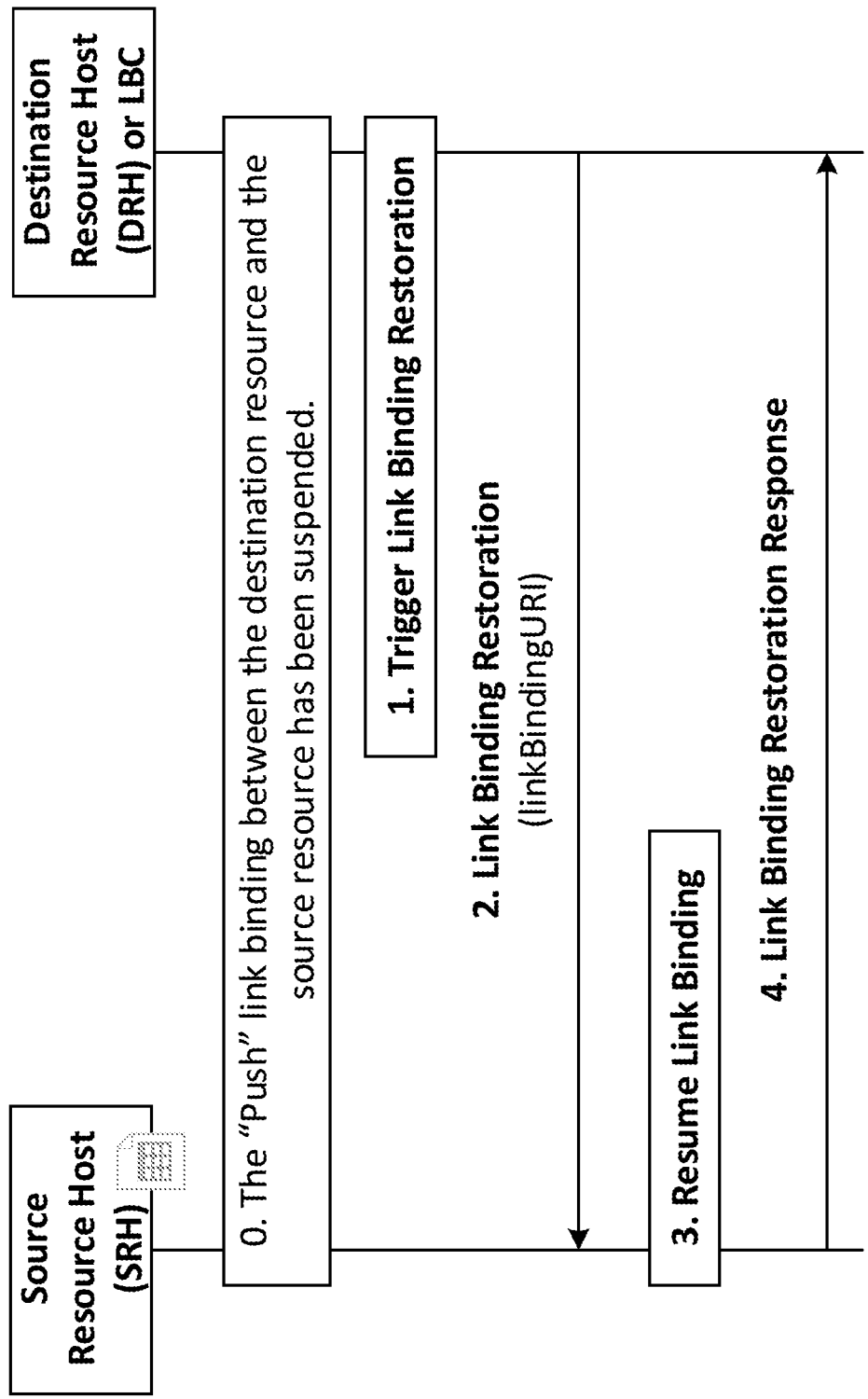
FIG. 26 shows an example link binding restoration for a push method.

FIG. 26 illustrates an example procedure of link binding restoration for Push Mode. The LBC or the corresponding DRH may send a Link Binding Restoration Request to the SRH to resume a suspended link binding at the SRH. The SRH may mark the link binding as resumed. Then, the SRH may send a Link Binding Restoration Response to the DRH or the LBC. When a suspended link binding for Push is resumed, the SRH may restart to send periodical PUT to the DRH.

In step 0, assume a "Push" link binding between a source resource and a destination resource has been suspended.

In step 1, the DRH or the LBC may trigger to resume a link binding. For example, the DRH may have more resources (e.g., energy) to support future content synchronization with the DRH or the LBC may simply want to resume the content synchronization from the SRH to the DRH.

In step 2, the DRH or the LBC may send a Link Binding Restoration Request to the SRH to resume a created link binding. This message may contain the URI of the suspended link binding.

In step 3, the SRH may receive the Link Binding Suspension Request message from step 2 and may use the linkBindingURI contained in step 2 to locate the link binding and resume it.

In step 4, the SRH may send a Link Binding Restoration Response to the DRH or the LBC to inform it if the link binding restoration as requested in step 2 is performed successfully or not. In addition, for "Push" mode, the SRH itself may decide to resume a suspended link binding. In this case, it may first resumes the link binding and may then contact the DRH and/or the LBC to inform that the link binding has been resumed.

Figure 27:
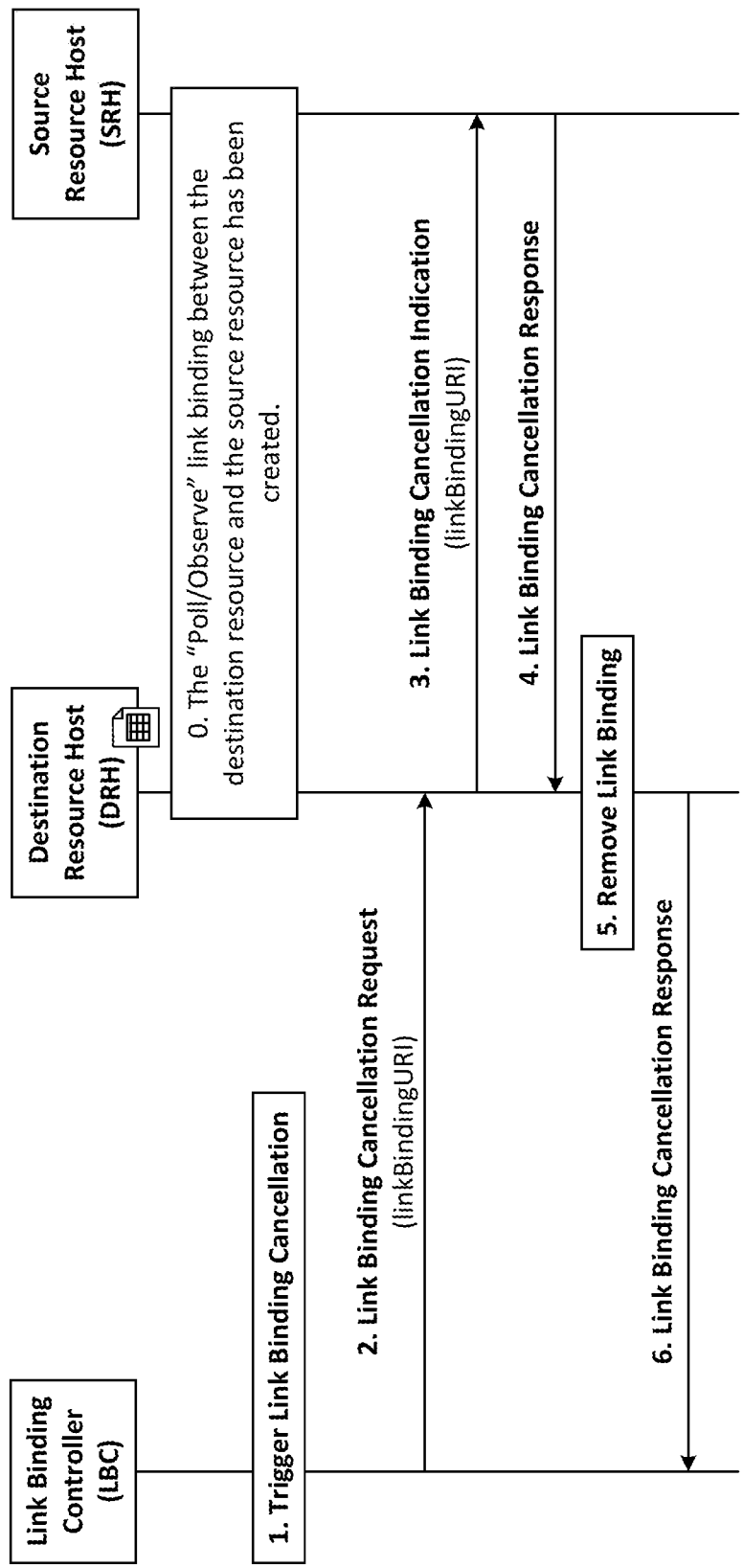
FIG. 27 shows an example option 1 for a link binding cancelation for a poll/observe method.
Figure 28:
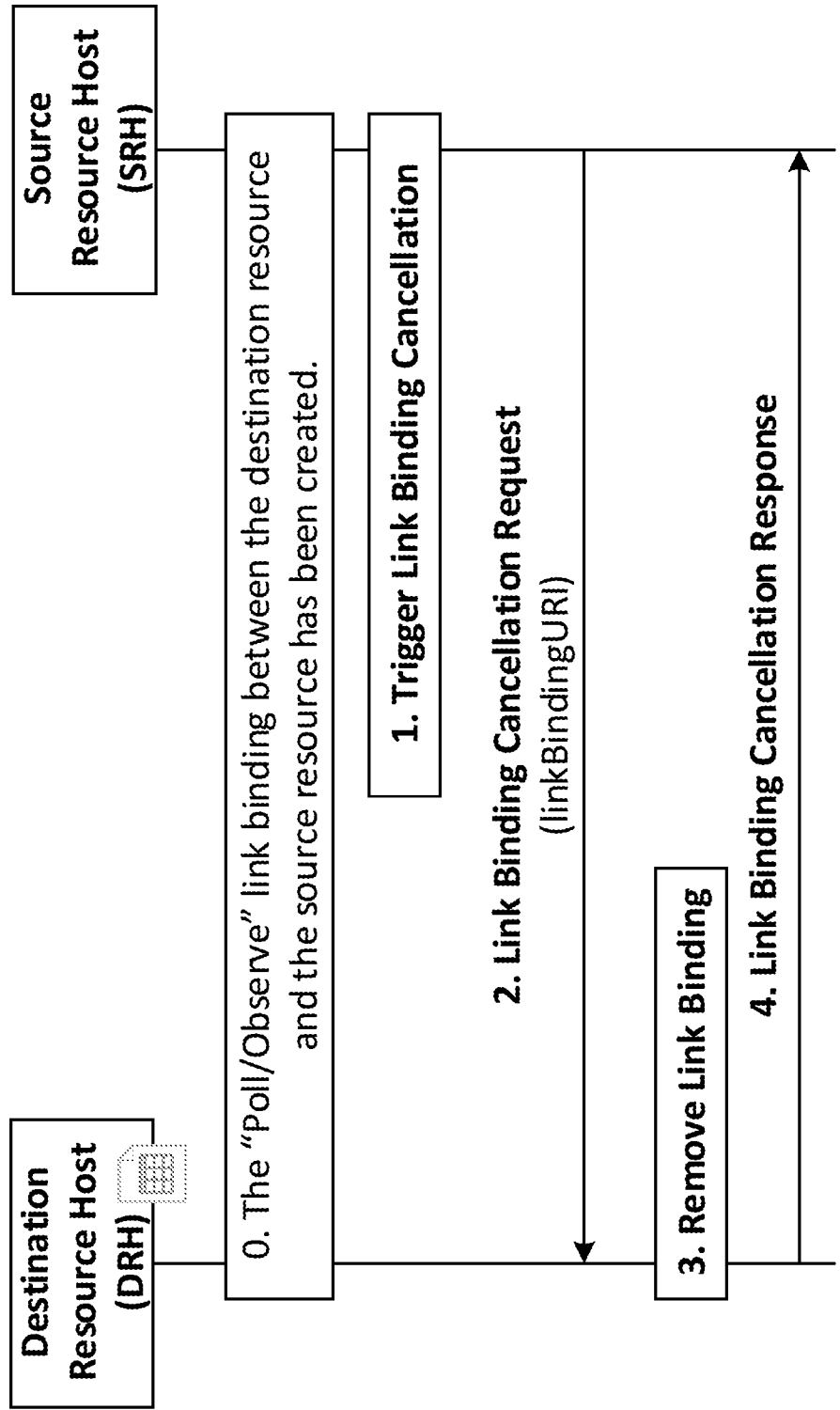
FIG. 28 shows an example option 2 for a link binding cancelation for a poll/observe method.
Figure 29:
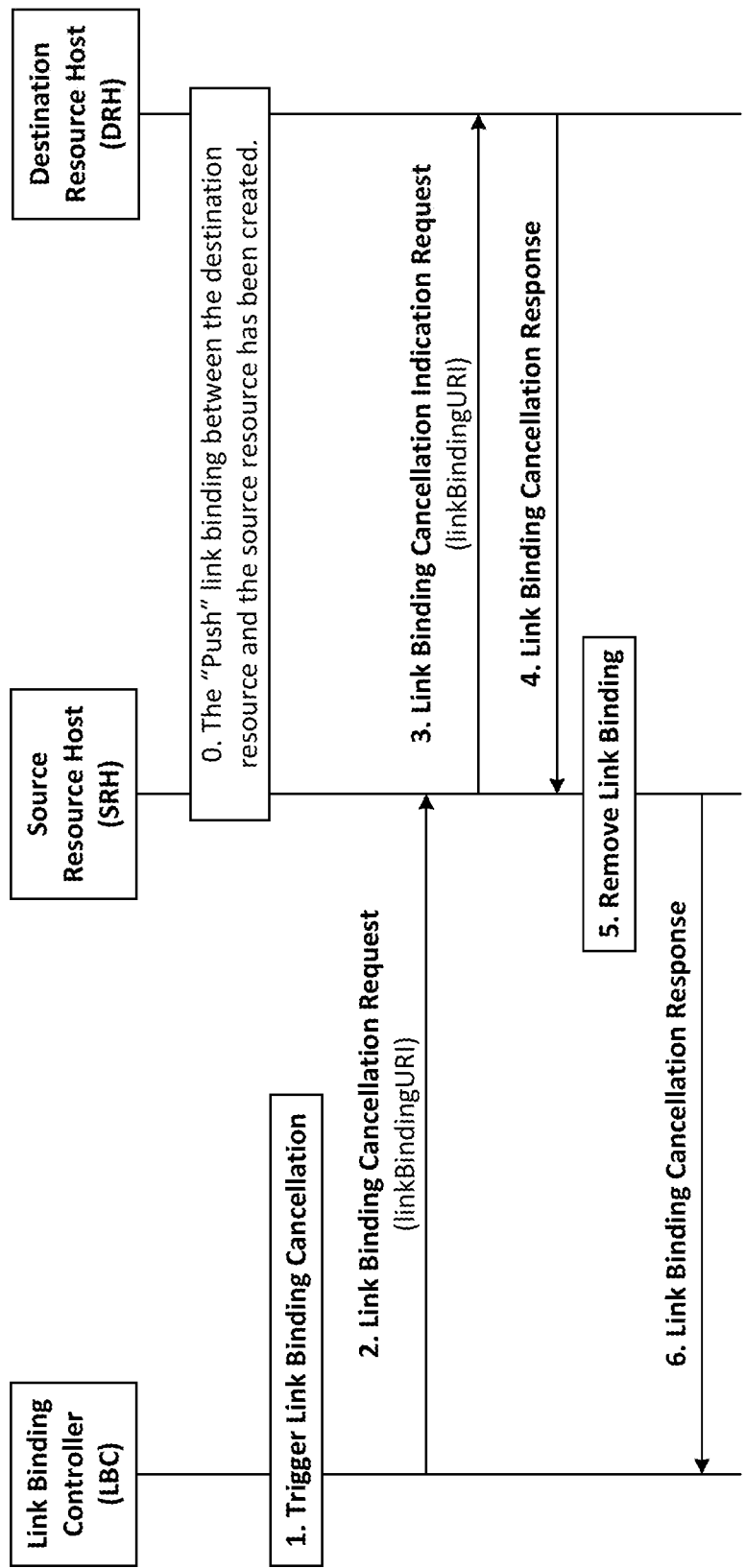
FIG. 29 shows an example option 2 for a link binding cancelation for a push method.
Figure 30:
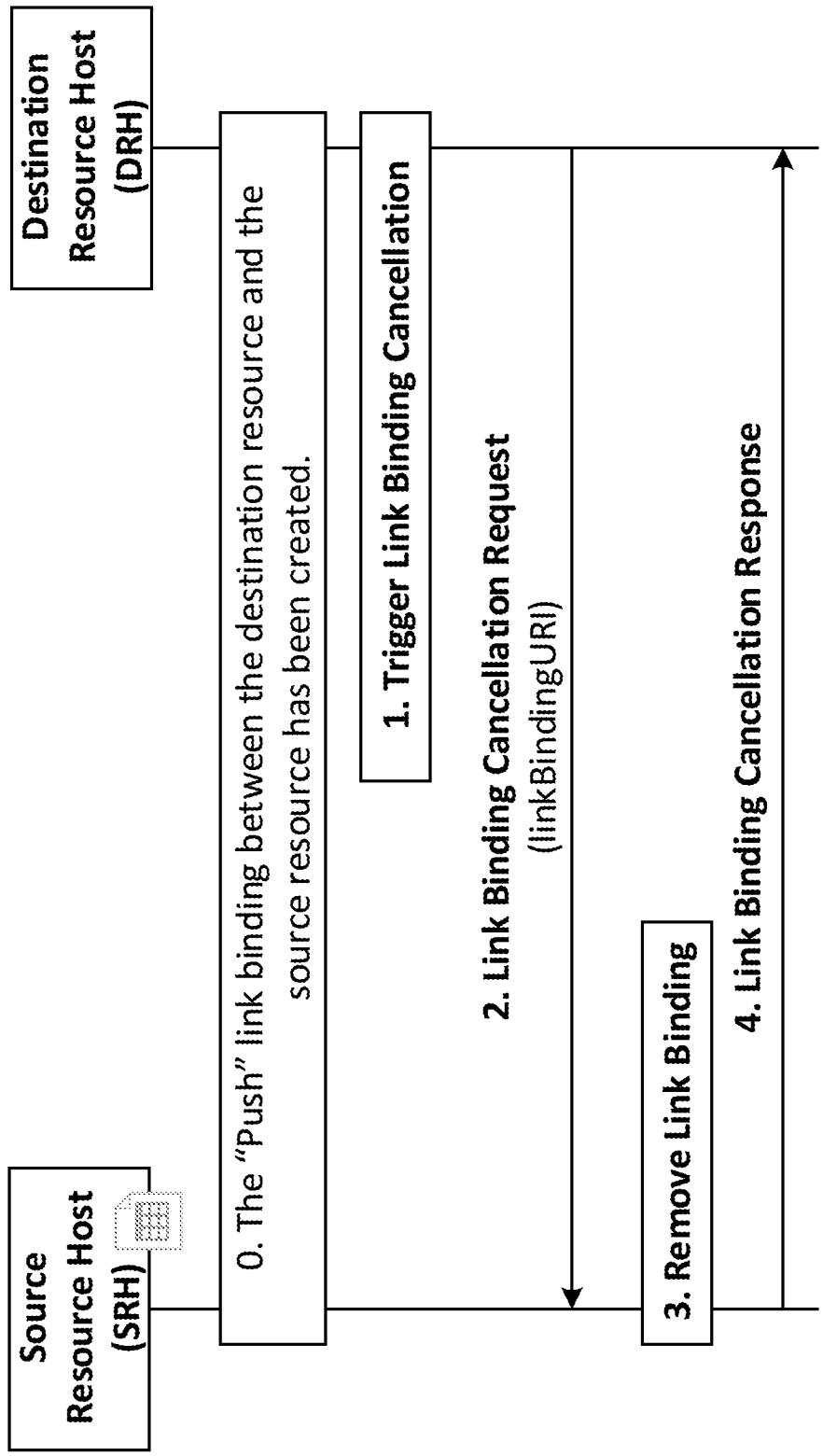
FIG. 30 shows an example option 2 for a link binding cancelation for a push method.

After a link binding entry/instance is created at a DRH (for Poll/Observe mode) or at a SRH (for Push mode), it can be cancelled or removed later by LBC, the SRH, and/or the DRH. FIG. 27 and FIG. 28 show an example link binding update procedure for Poll/Observe mode. FIG. 29 and FIG. 30 illustrate an example link binding update procedure for Push mode.

FIG. 27 presents the link binding cancellation procedure for Poll/Observe mode triggered by a LBC which knows the URI of a created link binding.

In step 0, assume that a "Poll/Observe" link binding between a source resource and a destination resource has been created/established.

In step 1, the LBC may trigger a link binding cancellation (e.g., if a source/destination resource becomes unavailable, etc.)

In step 2, the LBC may send a Link Binding Cancellation Request to the DRH to cancel an existing link binding entry which has been previously created at the DRH. This message may contain the parameter linkBindingURI to stand for the URI of the existing link binding entry.

In step 3, the DRH may send a Link Binding Cancellation Indication to the SRH. This message may contain linkBindingURI as received from step 2 to inform the SRH of the existing link binding entry to be cancelled at the DRH. This message may optionally contain binding attributes of the existing link binding entry (e.g., sourceResourceURI, destinationResourceURI, etc.)

In step 4, if the SRH maintained any information about the existing link binding entry to be cancelled, it may use linkBindingURI contained in step 3 to find such information and delete it. It may then send a response back to the DRH to inform that locally maintained information related to this existing link binding entry has been removed at the SRH.

In step 5, the DRH may remove the existing link binding entry as denoted by linkBindingURI from step 2. For "Observe" mode which may imply that there is an observation or subscription being already created at the SRH by the DRH, the DRH may need to send another message to the SRH to remove this observation or subscription. As a result, the SRH after receiving this message from the DRH may remove the corresponding observation or subscription and then send a response message to the DRH.

In step 6, the DRH may send a Link Binding Cancellation Response to the LBC as a response to step 2.

FIG. 28 shows an example procedure for a SRH to request to directly cancel an existing link binding entry which has been previously created at the DRH.

In step 0, assume a "Poll/Observe" link binding between a source resource and a destination resource has been created/established.

In step 1, the SRH may trigger a link binding cancellation (e.g., the source resource becomes deleted or unavailable).

In step 2, the SRH may send a Link Binding Cancellation Request to the DRH to cancel an existing link binding entry which has been previously created at the DRH. This message may contain linkBindingURI standing for the existing link binding entry to be cancelled at the DRH. This message may optionally contain binding attributes of the existing link binding entry (e.g., sourceResourceURI, destinationResourceURI, etc.).

In step 3, the DRH may locate the existing link binding entry and remove it (including its binding attributes). For "Observe" mode which may imply that there is an observation or subscription being already created at the SRH by the DRH, the DRH may need to send another message to the SRH to remove this observation or subscription. As a result, the SRH after receiving this message from the DRH may remove the corresponding observation or subscription and then send a response message to the DRH.

In step 4, the DRH may send a response to the SRH to indicate if the existing link binding entry has been successfully performed. In one embodiment, instead of sending Link Binding Cancellation Request directly to the DRH, the SRH can send it to a LBC which may forward the Link Binding Cancellation Request to the DRH. The DRH may then remove the existing link binding entry and send a Link Binding Cancellation Response to the LBC which may forward the response to the SRH.

FIG. 29 presents an example link binding cancellation procedure for Push mode triggered by a LBC which knows the URI of a created link binding.

In step 0, assume a "Push" link binding between a source resource and a destination resource has been created/established.

In step 1, the LBC may trigger a link binding cancellation (e.g., a source/destination resource becomes unavailable, etc.).

In step 2, the LBC may send a Link Binding Cancellation Request to the SRH to cancel an existing link binding entry which has been previously created at the SRH. This message may contain the parameter linkBindingURI to stand for the URI of the existing link binding entry.

In step 3, the SRH may send a Link Binding Cancellation Indication to the DRH. This message may contain a linkBindingURI as received from step 2 to inform the DRH of the existing link binding entry to be cancelled at the SRH. This message may optionally contain binding attributes of the existing link binding entry (e.g., sourceResourceURI, destinationResourceURI, etc.).

In step 4, if the DRH maintained any information about the existing link binding entry to be cancelled, it may use the linkBindingURI contained in step 3 to find such information and delete it. It may then send a response back to the SRH to inform that locally maintained information related to this existing link binding entry has been removed at the DRH.

In step 5, the SRH accordingly may remove the existing link binding entry as denoted by linkBindingURI from step 2.

In step 6, the SRH may send a Link Binding Cancellation Response to the LBC as a response to step 2.

FIG. 30 shows an example procedure for a DRH to request to directly cancel an existing link binding entry which has been previously created at the SRH.

In step 0, assume a "Push" link binding between a source resource and a destination resource has been created/established.

In step 1, the DRH may trigger link binding cancellation (e.g., if the source resource becomes deleted or unavailable).

In step 2, the DRH may send a Link Binding Cancellation Request to the SRH to cancel an existing link binding entry which has been previously created at the SRH. This message may contain linkBindingURI standing for the existing link binding entry to be cancelled at the SRH. This message may optionally contain binding attributes of the existing link binding entry (e.g., sourceResourceURI, destinationResourceURI, etc.).

In step 3, the SRH may locate the existing link binding entry and remove it, including its binding attributes.

In step 4, the SRH may send a response to the DRH to indicate if the existing link binding entry has been successfully performed. In one embodiment, instead of sending Link Binding Cancellation Request directly to the SRH, the DRH can send it to a LBC which may forward the Link Binding Cancellation Request to the SRH. Then, the SRH may remove the existing link binding entry and send a Link Binding Cancellation Response to the LBC which may forward the response to the DRH.

Procedures associated with Link Binding Management Architecture B are disclosed. In one embodiment, when a RH registers a resource to a RR, the RH may indicate a binding hint (e.g., linkBindingRole, boundToResourceType, supportedLinkBindingMethodsAndAttributes, etc.) for this resource. Furthermore, the RR can make link binding recommendations based on these binding hints and can send them to the RH as a part of resource registration response.

Figure 31:
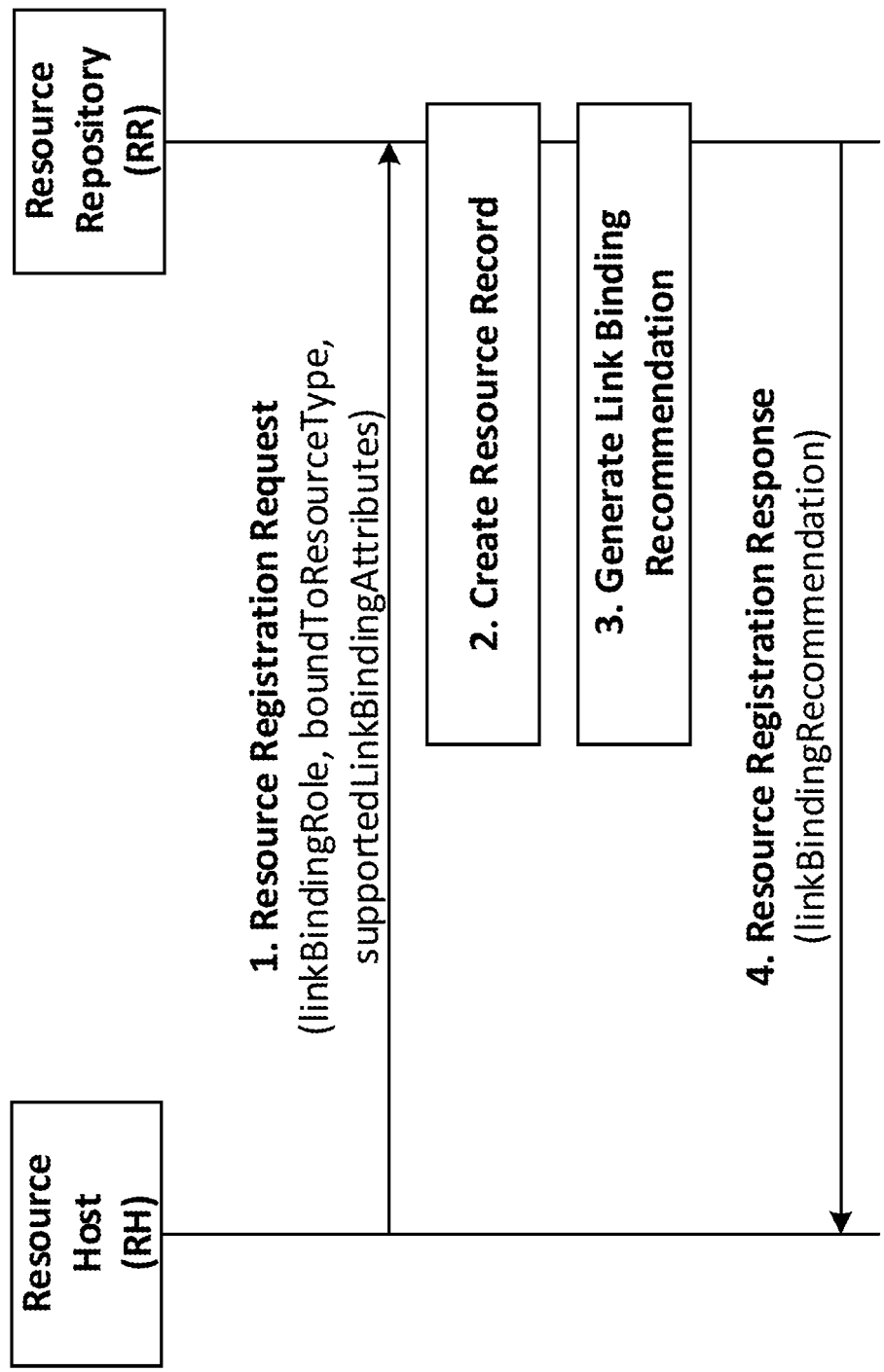
FIG. 31 shows an example resource registration with binding hint.

FIG. 31 presents an example procedure for resource registration with binding hints, where at least step 3 is optional.

In step 1, a RH may send a Resource Registration Request message to a RR for registering a resource. The RH could be, for example, a DRH or a SRH. This message may contain the following parameters to give binding hints for the resource being registered.

linkBindingRole: the link binding role of the resource to be registered. For example, this resource could be a source resource, a destination resource, either of source resource or a destination resource, or neither of them if it is not to be involved in a link binding. As a result, the value of this parameter could be: sourceResourceRole, destinationResourceRole, eitherSourceOrDestinationRole, or noRole. This parameter may be optional.

boundToResourceType: the type of resource which this resource to be registered may be bound to (e.g., temperature). If the registered resource is a source resource (e.g., linkBindingRole="sourceResourceRole"), this parameter may mean the type of destination resource. If the registered resource is a destination resource (e.g., linkBindingRole="destinationResourceRole"), this parameter may mean the type of source resource. This parameter may not be needed if linkBindingRole="noRole"

supportedLinkBindingMethodsAndAttributes: the potential link binding attributes which the registered resource can support or prefer to support. For example, this parameter may indicate if the registered resource supports Poll, Observe, and/or Push modes. For each binding mode, this parameter may also contain supported and/or preferred values of other binding attributes such as, but not limited to, "maximum period," "minimum period," "change step," "greater than," and "less than."

In step 2, the RR creates a resource record for the registered resource. The three binding hint parameters (e.g., linkBindingRole, boundToResourceType, and supportedLinkBindingMethodsAndAttribute) may be added as new attributes of the registered resource.

In step 3, after the resource is registered in step 2, the RR may search its local resource records and find pairs of matching source resource and destination resource, based on the binding hints of each registered resource. Accordingly, the RR may generate link binding recommendations for or related to the newly registered resource. In one embodiment, a link binding may be recommended for two resources A and B if all following conditions are satisfied. The RR may store newly generated link binding recommendation locally (e.g., as standalone resources, or as child resources or an attribute of registered resources). Each generated and stored link binding recommendation may have a few attributes: binding method, source resource type, source resource URI, destination resource type, destination resource URI, link binding status, maximum period, minimum period, change step, greater than, and less than, etc. As an example, possible values of link binding status could be "recommended" (which mean it is just a link binding recommendation) or "created and enforced" (which means this link binding has been created and enforced at a DRH or a SRH).

Resource A may be a source resource and Resource B may be a destination resource. This can be known from "linkBindingRole" parameter.

The type of Resource B matches "boundToResourceType" of Resource A, or the type of Resource A matches "boundToResourceType" of Resource B.

There may be an overlapping set between "supportedLinkBindingMethodsAndAttributes" of Resource A and "supportedLinkBindingMethodsAndAttributes" of Resource B. For example, both Resource A and Resource B may support/prefer the same binding mode. In addition, both resources may support/prefer the same "maximum period" and other binding attributes.

In step 4, the RR may send a Resource Registration Response message to the RH. In addition to containing the URI of the new resource record created in step 2, this message may include the representation or the URI of link binding recommendation generated in step 3 if the RR has conducted step 3. The representation of a link binding recommendation may include: source resource URI, destination resource URI, binding method, and/or other binding attributes. If only the URI of link binding recommendation is contained in this step, the RH can retrieve the representation of a link binding recommendation from the RR at a later time.

After resources (either source resources or destination resource) with their binding hints have been registered to a RR, a LBC can discover appropriate source resources and destination resources from the RR using binding hints as a filter. In addition, the generated link binding recommendations at the RR can also be searched by the LBC.

Figure 32:
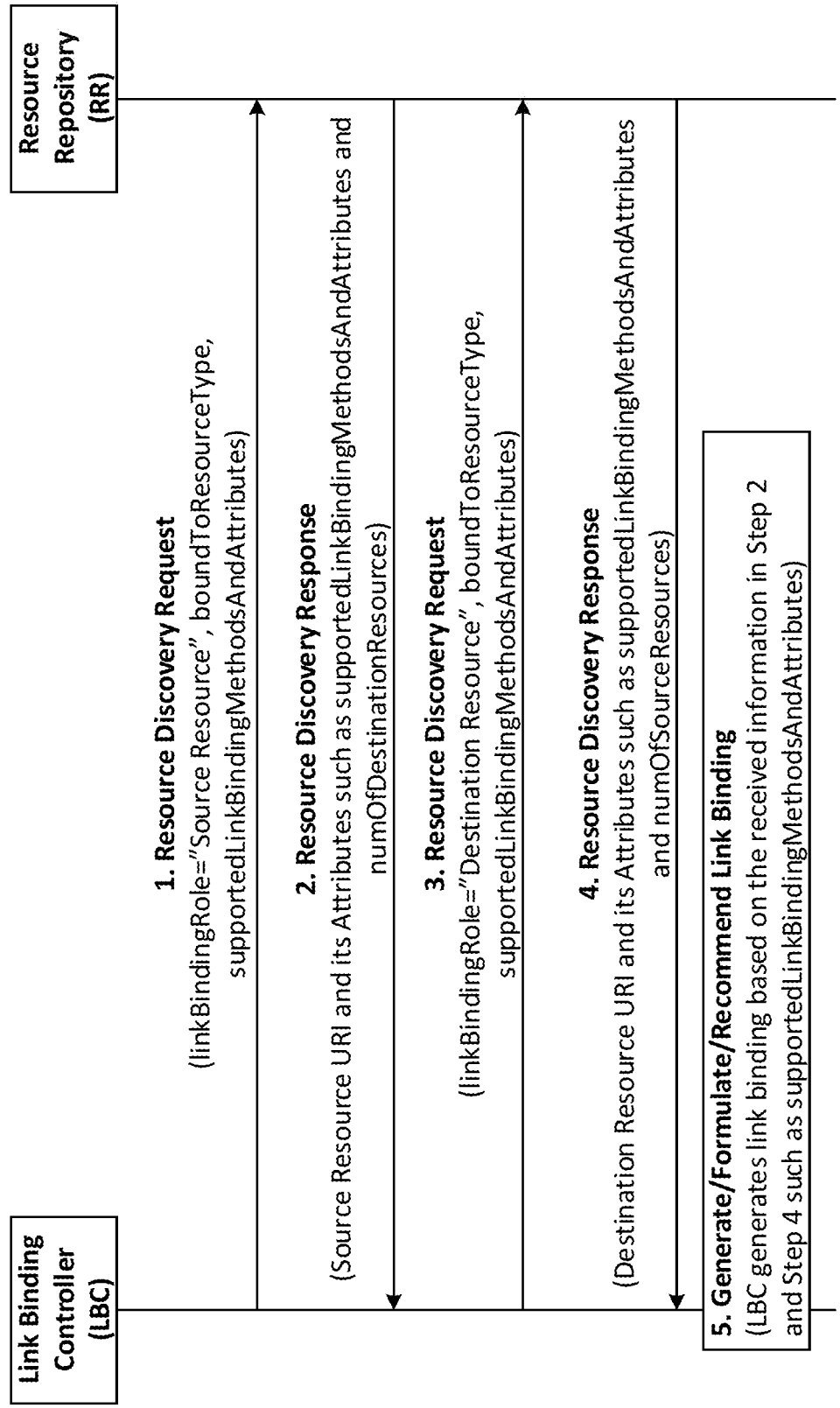
FIG. 32 shows an example option 1 for resource discovery link binding.

FIG. 32 shows an example procedure for the LBC to look up resources from the RR (similar to FIG. 12).

In step 1, the LBC may send a Resource Discovery Request message to the RR. This message may contain the following parameters as filters, which the RR may use to search expected resources.

linkBindingRole: indicates to discover resources which support the binding role as specified by this parameter. In the example with linkBindingRole="Source Respurce," the LBC may request to find source resources only.

boundToResourceType: indicates the type of resources to be bound to. Since linkBindingRole="Source Resource," this parameter may denote the type of destination resources which discovered source resources can bound to.

supportedLinkBindingMethodsAndAttributes: indicates other binding attributes which discovered resources can support.

In step 2, the RR may search local resource records for any registered resources which meet the filters contained in step 1. It may then send a Resource Discovery Response message to LBC. This message may contain a list of discovered source resources with their URI and other attributes. A new attribute, numOfDestinationResource, may be used by a source resource to track the number of destination resources which the source resource has already bound to. numOfDestinationResources can be contained in step 2. Additionally or alternatively, numOfDestinationResources may be contained in step 1 to be used as a filter, for example, to discover source resources which destination resources are equal to or less than a certain number.

In step 3, similar to step 1, the LBC may aim to discover destination resources which meet certain contains as specified by parameters such as boundToResoureType, supportedLinkBindingMethodsAndAttributes, etc.

In step 4, similar to step 2, the RR may send a list of discovered destination resources to the LBC. numOfSourceResources may be used by a destination resource to track the number of source resources which the destination resource has already bound to. numOfSourceResources can be contained in step 4. Additionally or alternatively, numOfSourceResources can be contained in step 3 to be used as a filter, for example, to discover destination resources whose associated source resources are equal to or less than a certain number.

In step 5, based on discovered source resources and destination resources in step 2 and step 4, the LBC may now have better knowledge on each of them including their binding-related attributes such as boundToResourceType and supportedLinkBindingMethodsAndAttributes. The LBC may then generate potential link bindings for pairs of a source resource and a destination resource. For example, assume there are two resources: 1) Resource1 is a Type-A resource with linkBindingRole="Source Resource," boundToResourceType="Type-B," and it supports Push binding mode; 2) Resource2 is a Type-B resource with linkBindingRole="Destination Resource," boundToResourceType="Type-A," and it supports Push binding mode. Then those two resources match with each other in term of link binding requirements. The LBC may generate a link binding between those two resources. However, the link binding may not be created at this point and there may be a separate procedure for the LBC to create generated link bindings at a SRH or a DRH.

Figure 33:
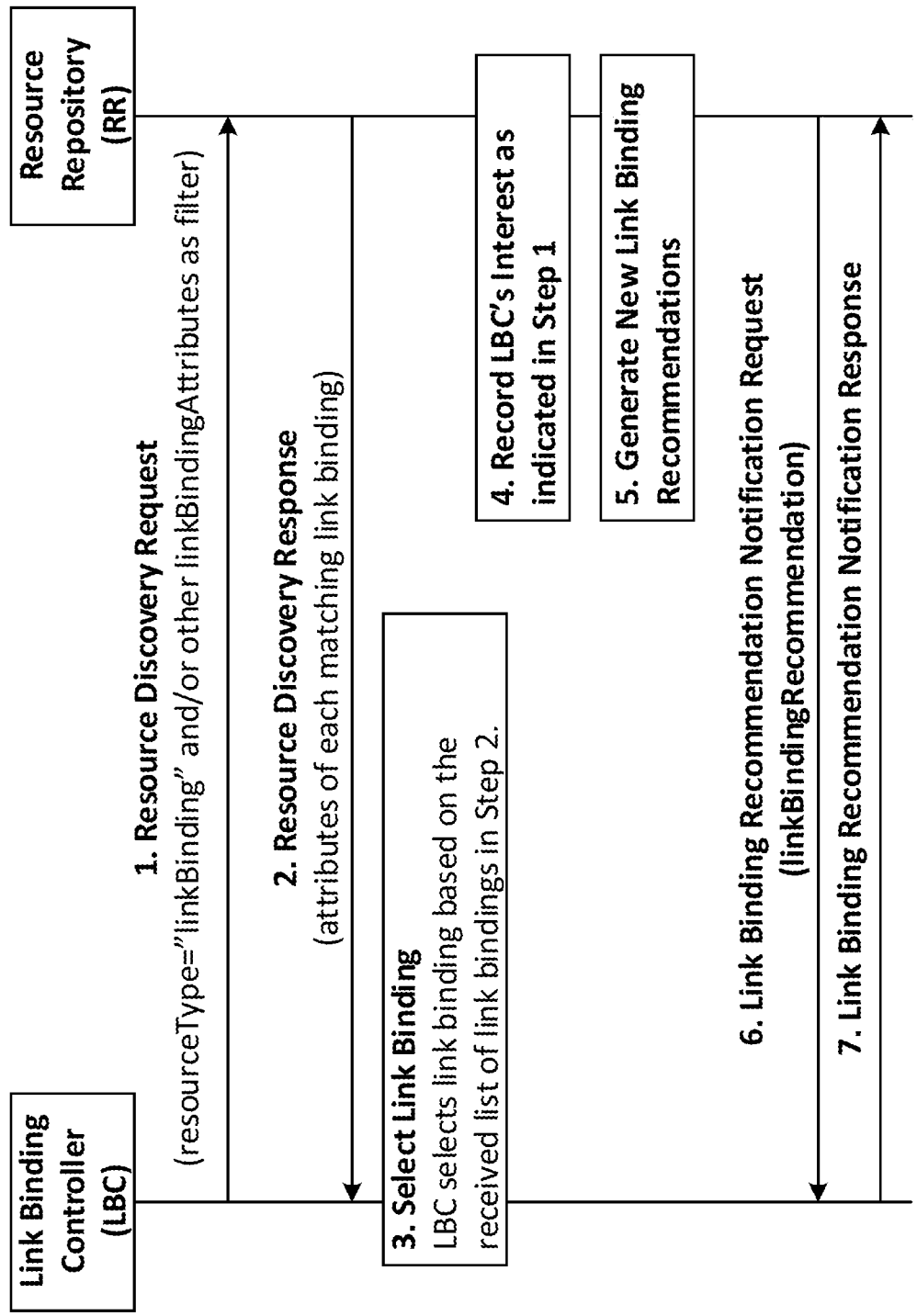
FIG. 33 shows an example option 2 for resource discovery link binding.

FIG. 33 shows an example procedure for a LBC to directly discover link binding recommendations which the RR has made (e.g., step 3 in FIG. 31). Note that steps 4-7 may be optional.

In step 1, the LBC may send a Resource Discovery Request to the RR to search link binding recommendations. This message may contain the following parameters as the filter.

resourceType="linkBinding": Indicate the type of resource to be discovered is link binding.

linkBindingStatus="recommended": Indicate to only discover link binding recommendations.

Link binding attributes (e.g., binding method, sourceResourceType, destinationResourceType, etc) can be contained as the filter as well.

In step 2, the RR may send a Resource Discovery Response message to the LBC. This message may contain a list of matching link binding recommendations including their attributes.

In step 3, the LBC may select certain link binding recommendations from the received list in step 2.

In step 4, the RR may record the LBC's interest (e.g., filers for discovering link binding recommendations) as it has indicated in step 1.

In step 5, at a later time when a new resource is registered or triggered by other conditions, the RR may generate a new link binding recommendation.

In step 6, if there are some new link binding recommendations which match the LBC's interest, the RR may send them to the LBC in a Link Binding Recommendation Notification Request message.

In step 7, the LBC may send a response message to the RR as a confirmation.

For a link binding creation process, the same procedures described in FIGS. 17-20 may be used.

Since LBM Architecture B includes RR, any created link binding can be registered to the RR so that it can be discovered by other entities. A LBC, a DRH, and/or a SRH can register a created link binding to the RR. In Poll/Observe mode, after a link binding is created at the DRH, the DRH may know all information about the created link binding and can register it to the RR. Still in Poll/Observe mode, if the LBC has triggered to create the link binding at the DRH, the LBC may know all information about the created link binding and can register it to the RR. In Push mode, after a link binding is created at the SRH, the SRH may know all information about the created link binding and can register it to the RR. Still in Push mode, if the LBC has triggered to create the link binding at the SRH, the LBC may know all information about the created link binding and can register it to the RR.

Figure 34:
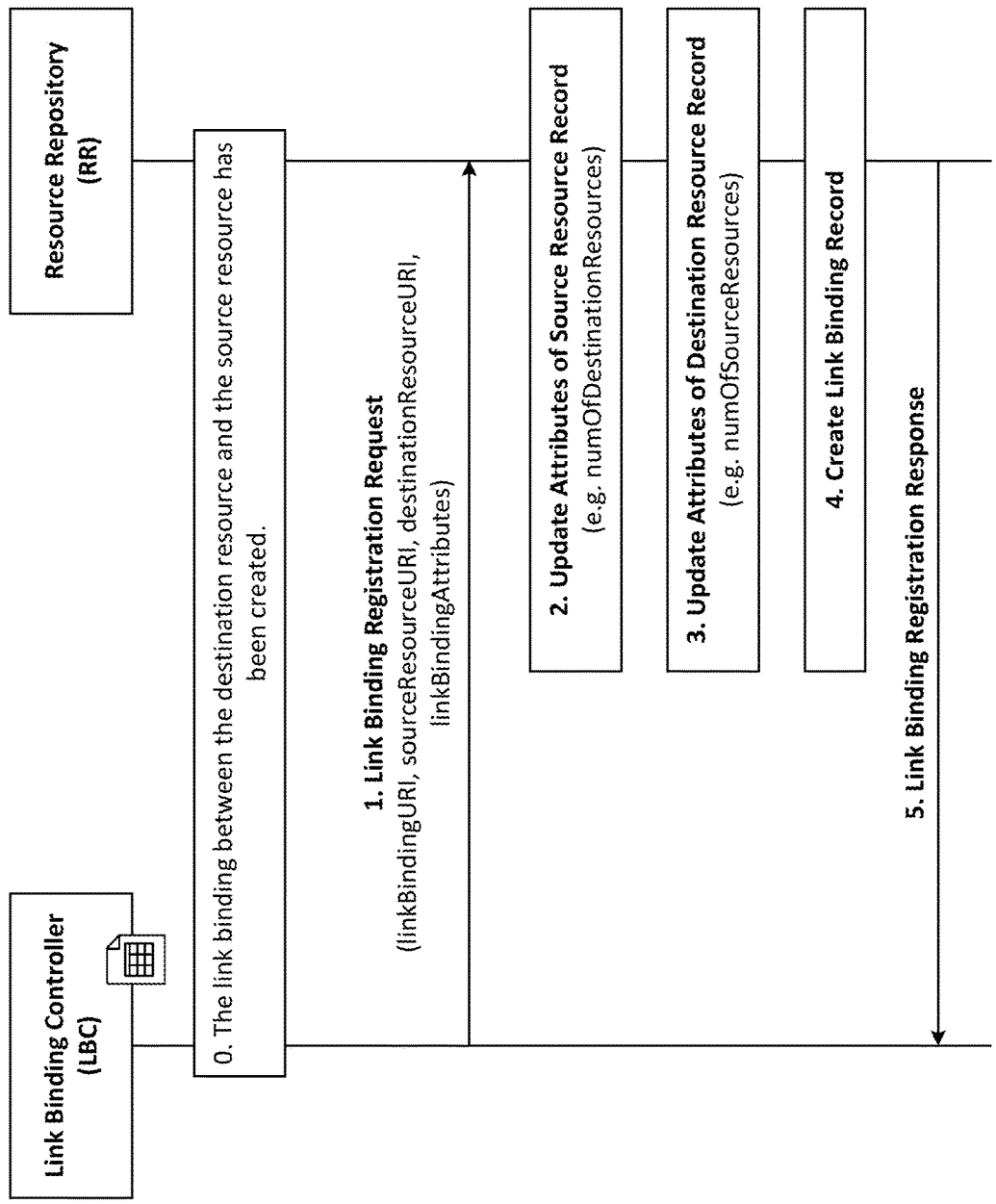
FIG. 34 shows an example link binding registration.

FIG. 34 shows a example procedure for registering a created link binding where the LBC can be replaced with the DRH or the SRH as described in above paragraph.

In step 0, assume a link binding has been created between a source resource and a destination resource.

In step 1, the LBC may send a Link Binding Registration Request message to the RR. Note that each created link binding may have some attributes (e.g., linkBindingMethod, sourceResourceType, sourceResourceURI, destinationResourceType, destinationResourceURI, etc.) which may be included in this message. In addition, this message may also contain linkBindingURI, which is the URI of the created link binding at the DRH (for Poll/Observe mode) or at the SRH (for Push mode).

In step 2, the RR may search for whether it maintains a resource record for the source resource based on sourceResourceType and sourceResourceURI as contained in step 1. If it indeed has created a resource record for the source resource (e.g., according to the procedures in FIG. 31), the RR may increase the numOfDestinationResources attribute of this resource record by one, which may mean that this source resource has one more link binding being created. The RR may also add linkBindingURI as contained in step 1 as an attribute to this resource record.

In step 3, the RR may search whether it maintains a resource record for the destination resource based on destinationResourceType and destinationResourceURI as contained in step 1. If it indeed has created a resource record for the destination resource (e.g., according to the procedures in FIG. 31), the RR may increase the numOfSourceResources attribute of this resource record by one, which may mean that this destination resource has one more link binding being created. The RR may also add linkBindingURI as contained in step 1 as an attribute to this resource record.

In step 4, the RR may create a new link binding record. This resource record may maintain all binding attributes as contained step 1 for the link binding being registered. The created link binding record has a URI.

In step 5, the RR may send a Link Binding Registration Response message to the LBC. This message may contain the URI of the created link binding record at step 4. The LBC may add this URI as a new attribute to the created link binding, so that the LBC can locate use this URI to locate the link binding record at the RR (e.g., in order to update the link binding record due to the update on the link binding itself, or in order to delete the link binding record due to the removal of the link binding itself).

The procedure for binding aware content synchronization may be similar to those in FIG. 17 and FIG. 18.

The procedure for link binding update may be similar to those in FIGS. 23-26. In addition, once a link binding is updated, its URI and/or its attributes as registered and maintained at the RR may become outdated and may need to be updated. For this purpose, the LBC, the DRH, and/or the SRH may use the same link binding registration procedure in FIG. 34 to update corresponding link binding record at the RR.

The procedure for link binding suspension may be similar to those in FIG. 23 and FIG. 24. In addition, once a link binding is suspended, the LBC, the DRH, and/or the SRH may use the same link binding registration procedure in FIG. 34 to update corresponding link binding records at the RR (e.g., to inform the RR that this link binding is suspended).

The procedure for link binding suspension may be similar to those in FIG. 25 and FIG. 26. In addition, once a halted link binding is restored or resumed, the LBC, the DRH, and/or the SRH may use the same link binding registration procedure in FIG. 34 to update corresponding link binding record at the RR (e.g., to inform the RR that this previously suspended link binding is now resumed).

The procedure for link binding cancellation may be similar to those in FIGS. 31-34. After a link binding is removed, its corresponding link binding record if any as created at the RR may be removed as well. The LBC, the DRH, or the SRH can simply send a delete request to the RR to remove the link binding record. Note that in step 5 of FIG. 34, the URI of the link binding record at the RR has been added as an attribute of the corresponding link binding. This URI may be contained in this delete operation for the RR to locate the right link binding record and remove it.

Procedures associated with an example oneM2M embodiment are disclosed. The link binding management functions and procedures disclosed herein may be implemented as a new LBM CSF in the oneM2M functional architecture. This LBM CSF may reside in a CSE and expose its services to other CSEs and/or AEs. In one embodiment, the LBM CSF may have the following functionalities:

LBM CSF can automatically generate link binding recommendations (e.g., <linkBindingRecommendation>) by discovering appropriate source resources and destination resources from other Hosting CSEs.

LBM CSF may expose <linkBindingRecommendation> resources to other AEs/CSEs. In other words, an AE/CSE can create/retrieve/update/delete a <linkBindingRecommendation> resource from LBM CSF.

After a <linkBindingRecommendation> resource is created, an AE (or a CSE) can retrieve its representations and in turn use link binding method, source resource, destination resource, and binding attributes contained in this <linkBindingRecommendation> resource to create <linkBindingInstance> resource. Note that to create a <linkBindingInstance> is to enforce a link binding (e.g., take it in effect), while to create a <linkBindingRecommendation> is just to formulate and record a potential link binding (but not being taken in effect yet).

LBM CSF can host link binding resources (e.g., a <linkBindingInstance>). Note that each <linkBindingInstance> resource may correspond to a link binding entry.

An AE/CSE can request to create/retrieve/update/delete a <linkBindingInstance> resource from LBM CSF.

In one embodiment, the following actors disclosed herein may map to oneM2M entities as follows: 1) LBC maps to an oneM2M AE or CSE; 2) RC maps to an oneM2M AE or CSE; 3) DRH, SRH, and RR maps to an oneM2M CSE with LBM CSF.

For example, an IN-AE (as a LBC) may create a link binding at an IN-CSE. This link binding is for a "Poll/Observe" binding relationship from a source resource at a MN-CSE (e.g., as a SRH) to a destination resource at the IN-CSE (e.g., as a DRH).

In another example, the MN-CSE may create a link binding at the IN-CSE. This link binding is for "Push" binding relationship from a source resource at the IN-CSE (e.g., as a SRH) to a destination resource at the MN-CSE (e.g., as a DRH).

Further, an ADN-AE may also create a link binding at the ADN. This link binding is for "Push" binding relationship from its local source resource to a destination resource at the MN-CSE (e.g., as a DRH).

In one embodiment, the following procedures disclosed herein may be mapped to oneM2M operations as follows:

"Resource Creation with Binding Support" may be implemented by enhancing existing resource creation procedure in oneM2M via adding new binding-related attributes to each resource being created. Those new attributes are described, for example, in Table 1.

"Resource Discovery for Link Binding" can be implemented by expanding existing resource discovery procedure in oneM2M via adding new filters to resource discovery request. The new filter criterial conditions are described, for example, in Table 2.

"Binding-Aware Content Synchronization" can be implemented by expanding existing RETRIEVE and UPDATE operations in oneM2M via adding some new request message parameters as described, for example, in Table 3.

"Link Binding Creation," "Link Binding Update," and "Link Binding Cancellation" can be implemented via CREATE, UPDATE, and DELETE operations, respectively, on a <linkBindingInstance> resource.

"Link Binding Suspension" can be implemented via RETRIEVE operation on a suspend child resource of a <linkBindingInstance> resource.

"Link Binding Restoration" can be implemented via RETRIEVE operation on a resume child resource of a <linkBindingInstance> resource.

Several new common attributes are illustrated in Table 1. The attributes may be used to describe several binding-related parameters for a resource. These attributes can be given when a resource is created. They can also be dynamically updated after the resource is created. They can also be leveraged as new filter criteria conditions to support resource discovery for link binding.

TABLE 1

New Common Attributes for Link Binding

| Attribute Name | Description |
| --- | --- |
| linkBindingRole | Indicates the link binding role of the parent resource. For example, the parent resource could be a source resource, a destination resource, either of source resource or a destination resource, or neither of them if it may not be involved in a link binding. As a result, the value of this attribute could be: sourceResourceRole, destinationResourceRole, eitherSourceOrDestinationRole, or noRole. |
| boundToResourceType | Indicates the type of resources which the parent resource can be bound to. If the parent resource is a source resource (e.g., linkBindingRole = |

TABLE 1-continued

New Common Attributes for Link Binding

| Attribute Name | Description |
| --- | --- |
| | "sourceResourceRole"), this attribute may mean the type of destination resources. If the parent resource is a destination resource (e.g., linkBindingRole = "destinationResourceRole"), this attribute may mean the type of source resources. This attribute may not be needed if linkBindingRole = "noRole" |
| supportedLinkBindingMethodsAndAttributes | Indicates the potential link binding attributes which the parent resource can support or prefer to support. For example, this attribute may indicate if the parent resource supports Poll, Observe, and/or Push mode. For each binding mode, this attribute may also contain supported and/or preferred values of other binding attributes such as, but not limited to, "maximum period," "minimum period," "change step," "greater than," and "less than." |
| linkBindingInstanceURI | Indicates the URI of each created/enforced link binding for the parent resource. |
| numOfDestinationResources | Indicate the number of destination resources which the parent resource has been bound to. If the parent resource is a destination resource, this parameter may not be needed. |
| numOfSourceResources | Indicate the number of source resources which the parent resource has been bound to. If the parent resource is a source resource, this parameter may not be needed. |

Table 2 includes several new filter criteria conditions for discovering more appropriate sources resources and destination resources which can be bound to each other or which have been bound together.

TABLE 2

New Filter Criteria Conditions

| Condition tag | Multiplicity | Matching condition |
| --- | --- | --- |
| linkBindingRole | 0 . . . 1 | The linkBindingRole attributes of the resource contains at least the specified value. |
| boundToResourceType | 0 . . . n | The boundToResourceType attribute of the resource contains at least the specified value. |
| supportedLinkBindingMethodsAndAttributes | 0 . . . 1 | The supportedLinkBindingAttributes attributes of the resource contains at least the specified value. The value could be an expression for the filtering of key-value pair. The expression is about the relationship between linkBindingAttribute-key and linkBindingAttribute-value which may include equal to or not equal to, within or not within a specified set, etc. |
| numOfDestinationResourcesAbove | 0 . . . 1 | The numOfDestinationResource attribute of the resource is equal to or greater than the specified value. |

TABLE 2-continued

| Condition tag | Multiplicity | Matching condition |
|---|---|---|
| numOfDestinationResourcesBelow | 0 . . . 1 | The numOfDestinationResource attribute of the resource is smaller than the specified value. |
| numOfSourceResourcesAbove | 0 . . . 1 | The numOfSourceResource attribute of the resource is equal to or greater than the specified value. |
| numOfSourceResourcesBelow | 0 . . . 1 | The numOfSourceResource attribute of the resource is smaller than the specified value. |

New Filter Criteria Conditions

Table 3 lists three new request message parameters for RETRIEVE and UPDATE operations, which can be used to support Binding-Aware Content Synchronization idea described herein. Note that RETRIEVE operation may be used for Poll/Observe mode; while UPDATE operation may be for Push mode.

TABLE 3

Summary of New Request Message Parameters

| | Request message parameter | Create | Retrieve | Update | Delete | Notify |
|---|---|---|---|---|---|---|
| Optional | Link Binding Flag - Indicate whether the operation is due to a created link binding | N/A | O | O | N/A | N/A |
| | Link Binding URL - the URI of a created link binding | N/A | O | O | N/A | N/A |
| | Link Binding Attributes - the binding attributes of a created link binding | N/A | O | O | N/A | N/A | linkBindingRecommendation may be used to represent suggestion on potential link bindings which LBM CSF recommends. Those potential link bindings may not be created or enforced at a DRH or a SRH yet. An AE/CSE can discover and retrieve a linkBindingRecommendation resource and then can use a separate operation to create/enforce a link binding (e.g., linkBindingInstance resource) at a DRH or a SRH.

Figure 35:
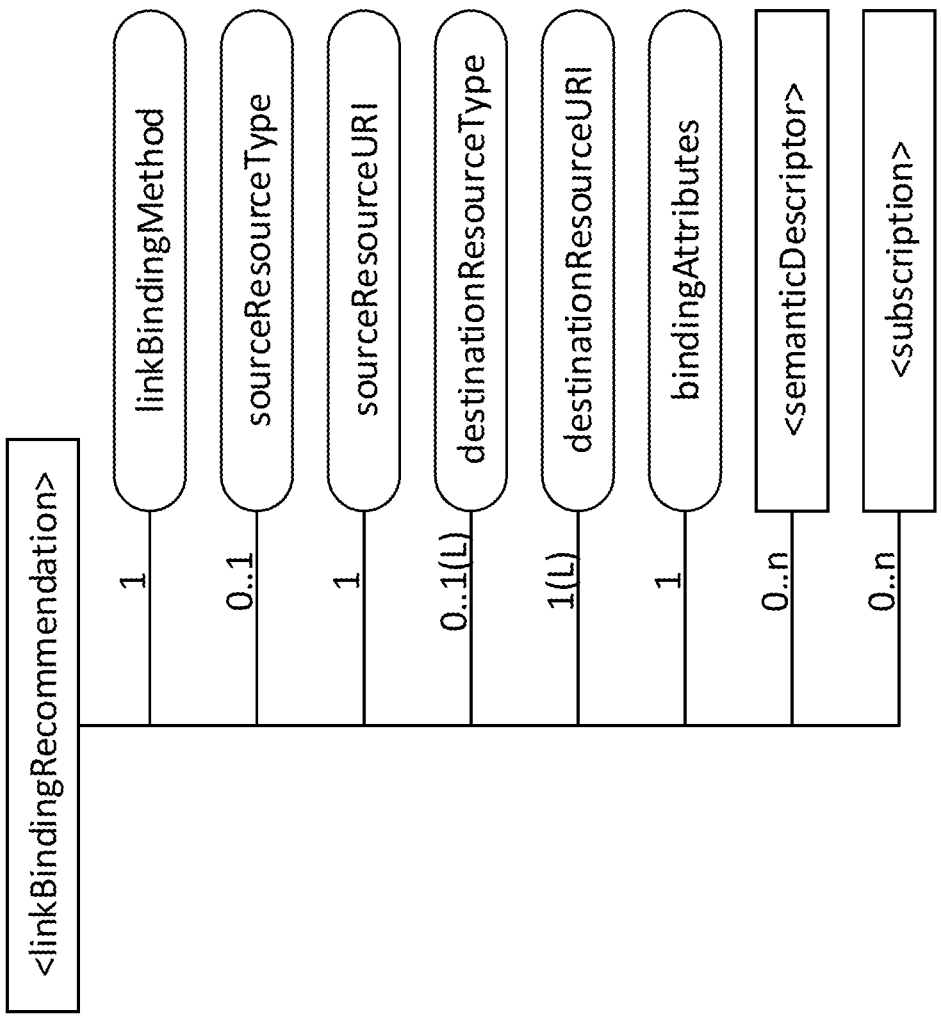
FIG. 35 shows an example structure of a <linkBindingRecommendation> Resource.

The structure of linkBindingRecommendation resource is illustrated in FIG. 35. In addition, the <linkBindingRecommendation> resource may contain the child resources specified in Table 4.

TABLE 4

Child resources of <linkBindingRecommendation> resource

| Child Resources of <linkBindingRecommendation> | Child Resource Type | Multiplicity | Description | <linkBindingRecommendationAnnc> Child Resource Types |
|---|---|---|---|---|
| [variable] | <subscription> | 0 . . . n | A child resource used to make subscriptions on <linkBindingRecommendation> resource. | <subscription> |
| [variable] | <semanticDescriptor> | 0 . . . n | Semantic description on <linkBindingRecommendation> resource. | <semanticDescriptor> |

The <linkBindingRecommendation> resource may contain the attributes specified in Table 5.

TABLE 5

Attributes of <linkBindingRecommendation> resource

| Attributes of <linkBindingRecommendation> | Multiplicity | RW/RO/WO | Description | <linkBindingRecommendationAnnc> Attributes |
|---|---|---|---|---|
| linkBindingMethod | 1 | RW | Indicates the binding method of a link binding recommendation (e.g., Poll, Observe, or Push). | OA |
| sourceResourceType | 0 . . . 1 | RW | Indicates the type of the source resource in <linkBindingRecommendation>. | OA |
| sourceResource URI | 1 | RW | Indicates the URI of the source resource in <linkBindingRecommendation>. | OA |
| destinationResourceType | 0 . . . 1 (L) | RW | Indicates the type of the destination resource in <linkBindingRecommendation>. | OA |
| destinationResourceURI | 1 (L) | RW | Indicates the URI of the destination resource in <linkBindingRecommendation>. | OA |
| bindingAttributes | 1 | RW | Indicates binding attributes such as, but not limited to, "maximum period," "minimum period," "change step," "greater than," and "less than." | OA |

Figure 36:
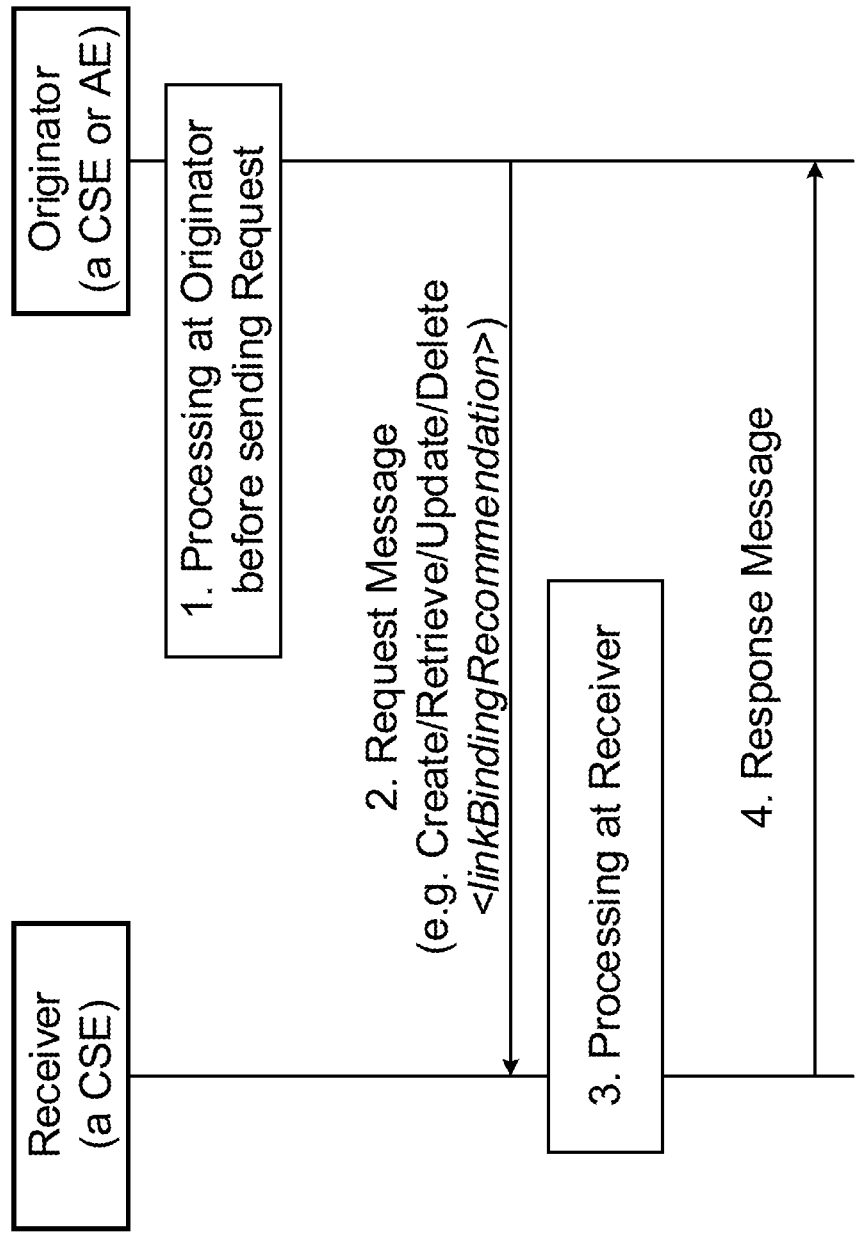
FIG. 36 shows an example procedure for operating a <linkBindingRecommendation> Resource

FIG. 36 illustrates an example procedure to operate a <linkBindingRecommendation> resource (e.g., Create/Retrieve/Update/Delete a <linkBindingRecommendation> resource). The Originator can be a CSE or an AE (e.g., LBC, DRH, or SRH), while the Receiver can be a CSE (e.g., RR, DRH or SRH). Detail descriptions are given in Table 6, Table 7, Table 8 and Table 9, respectively.

Create <linkBindingRecommendation>

This procedure may be used for creating a <linkBindingRecommendation> resource as described in Table 6.

TABLE 6

| | <linkBindingRecommendation> CREATE<br><linkBindingRecommendation> CREATE |
|---|---|
| Associated Reference Point | Mca, Mcc and Mcc'. |
| Information in Request message | All parameters defined in Table 8.1.2-3 in oneM2M-TS-0001 apply with the specific details for:<br>Content: The resource content may provide the information about a <linkBindingRecommendation> resource (e.g., attribute values) as described herein. |
| Processing at Originator before sending Request | According to clause 10.1.1.1 in oneM2M-TS-0001, if the Originator knows sourceResourceType or destinationResourceType, it can include them in the Request message. |
| Processing at Receiver | According to clause 10.1.1.1 in oneM2M-TS-0001. |
| Information in Response message | All parameters defined in Table 8.1.3-1 in oneM2M-TS-0001 apply with the specific details for:<br>Content: Address of the created <linkBindingRecommendation> resource according to clause 10.1.1.1 in oneM2M-TS-0001. |
| Processing at Originator after receiving Response | According to clause 10.1.1.1 in oneM2M-TS-0001. |
| Exceptions | According to clause 10.1.1.1 in oneM2M-TS-0001. |

Retrieve <linkBindingRecommendation>

This procedure may be used for retrieving the attributes of a <linkBindingRecommendation> resource as described in Table 7.

TABLE 7

| | <linkBindingRecommendation> RETRIEVE<br><linkBindingRecommendation> RETRIEVE |
|---|---|
| Associated Reference Point | Mca, Mcc and Mcc'. |
| Information in Request message | All parameters defined in Table 8.1.2-3 in oneM2M-TS-0001 apply with the specific details for:<br>Content: void. |

TABLE 7-continued

| | <linkBindingRecommendation> RETRIEVE<br><linkBindingRecommendation> RETRIEVE |
|---|---|
| Processing at Originator before sending Request | According to clause 10.1.2 in oneM2M-TS-0001. |
| Processing at Receiver | The Receiver may verify the existence (including Filter Criteria checking, if it is given) of the target resource or the attribute and check if the Originator has appropriate privileges to retrieve information stored in the resource/attribute. Otherwise clause 10.1.2 in oneM2M-TS-0001 applies. |
| Information in Response message | All parameters defined in Table 8.1.3-1 in oneM2M-TS-0001 apply with the specific details for:<br>Content: attributes of the <linkBindingRecommendation> resource as described herein |
| Processing at Originator after receiving Response | According to clause 10.1.2 in oneM2M-TS-0001. |
| Exceptions | According to clause 10.1.2 in oneM2M-TS-0001. |

Update <linkBindingRecommendation>

This procedure as described in Table 8 may be used to update an existing <linkBindingRecommendation>, e.g., an update to its sourceResourceURI or destinationResourceURI attribute.

TABLE 8

| | <linkBindingRecommendation> UPDATE<br><linkBindingRecommendation> UPDATE |
|---|---|
| Associated Reference Point | Mca, Mcc and Mcc'. |
| Information in Request message | All parameters defined in Table 8.1.2-3 in oneM2M-TS-0001 apply with the specific details for:<br>Content: attributes of the <linkBindingRecommendation> resource as described herein to be updated. |
| Processing at Originator before sending Request | According to clause 10.1.3 in oneM2M-TS-0001. |
| Processing at Receiver | According to clause 10.1.3 in oneM2M-TS-0001. |
| Information in Response message | According to clause 10.1.3 in oneM2M-TS-0001. |
| Processing at Originator after receiving Response | According to clause 10.1.3 in oneM2M-TS-0001. |
| Exceptions | According to clause 10.1.3 in oneM2M-TS-0001. |

Delete <linkBindingRecommendation>

This procedure as described in Table 9 may be used to delete an existing <linkBindingRecommendation>.

TABLE 9

| | <linkBindingRecommendation> DELETE<br><linkBindingRecommendation> DELETE |
|---|---|
| Associated Reference Point | Mca, Mcc and Mcc'. |
| Information in Request message | All parameters defined in Table 8.1.2-3 in oneM2M-TS-0001 apply. |
| Processing at Originator before sending Request | According to clause 10.1.4.1 in oneM2M-TS-0001. |
| Processing at Receiver | According to clause 10.1.4.1 in oneM2M-TS-0001. |
| Information in Response message | According to clause 10.1.4.1 in oneM2M-TS-0001. |
| Processing at Originator after receiving Response | According to clause 10.1.4.1 in oneM2M-TS-0001. |
| Exceptions | According to clause 10.1.4.1 in oneM2M-TS-0001. |

New Resource <linkBindingInstance> linkBindingInstance resource represents a created/enforced link binding at a DRH (for Poll/Observe mode) or a SRH (for Push mode). An AE/CSE can request to create/retrieve/update/delete a linkBindingInstance resource from another CSE.

linkBindingInstance Definition

Figure 37:
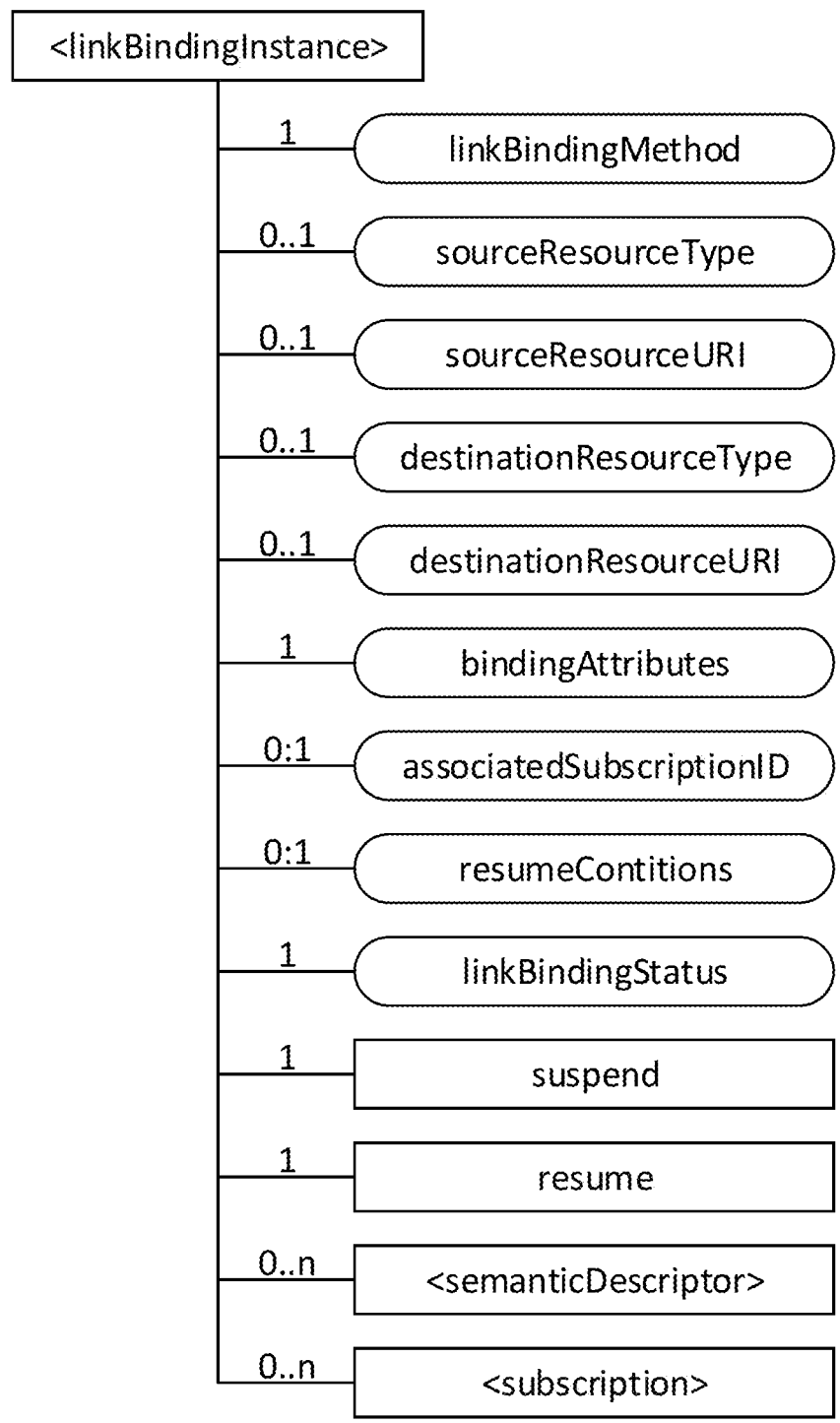
FIG. 37 shows an example of a <linkBindingInstance> Resource.

The structure of linkBindingInstance resource is illustrated in FIG. 37. The <linkBindingInstance> resource may contain the child resources specified in Table 10.

TABLE 10

Child resources of <linkBindingInstance> resource

| Child Resources of <linkBindingInstance> | Child Resource Type | Multiplicity | Description | <linkBindingInstanceAnnc> Child Resource Types |
|---|---|---|---|---|
| [variable] | <subscription> | 0 . . . n | A child resource used to make subscriptions on <linkBindingInstance> resource. | <subscription> |
| [variable] | <semanticDescriptor> | 0 . . . n | Semantic description on <linkBindingInstance> resource. | <semanticDescriptor> |
| suspend | <suspend> | 1 | A virtual resource. A RETRIEVE operation on this virtual resource may be used to suspend the parent <linkBindingInstance> resource. Only a "created" or "resumed" <linkBindingInstance> may be suspended. | none |
| resume | <resume> | 1 | A virtual resource. A RETRIEVE operation on this virtual resource may be used to resume the parent <linkBindingInstance> resource. Only a "suspended" <linkBindingInstance> can be resumed. | none |

The <linkBindingInstance> resource may contain the attributes specified in Table 11. In one embodiment, there may be two ways to place <linkBindingInstance> resources.

Create and place a <linkBindingInstance> resource as a child resource of the destination resource (for Poll/Observe mode); in this case, destinationResourceType and destinationResourceURI attributes may not be needed. For Push mode, a <linkBindingInstance> may be created/placed as a child resource of the source resource; in this case, sourceResourceType and sourceResourceURI attributes may not be needed.

Create and place a <linkBindingInstance> resource as a child resource of a general resource (e.g., <CSEbase> or <AE>). This general resource is neither a source resource nor a destination resource. In this case, sourceResourceURI and destinationResourceURI may be mandatory while sourceResourceType and destinationResourceType may be optional.

TABLE 11

Attributes of <linkBindingInstance> resource

| Attributes of <linkBindingInstance> | Multiplicity | RW/ RO/ WO | Description | <linkBindingInstanceAnnc> Attributes |
|---|---|---|---|---|
| linkBindingMethod | 1 | RW | Indicates the binding method of a link binding (e.g., Poll, Observe, or Push). | OA |
| sourceResourceType | 0 . . . 1 | RW | Indicates the type of the source resource in <linkBindingInstance>. | OA |
| sourceResourceURI | 0 . . . 1 | RW | Indicates the URI of the source resource in <linkBindingInstance>. | OA |

TABLE 11-continued

Attributes of <linkBindingInstance> resource

| Attributes of <linkBindingInstance> | Multiplicity | RW/ RO/ WO | Description | <linkBindingInstanceAnnc> Attributes |
|---|---|---|---|---|
| destinationResourceType | 0 . . . 1 | RW | Indicates the type of the destination resource in <linkBindingInstance>. | OA |
| destinationResourceURI | 0 . . . 1 | RW | Indicates the URI of the destination resource in <linkBindingInstance>. | OA |
| bindingAttributes | 1 | RW | Indicates binding attributes such as, but not limited to, "maximum period," "minimum period," "change step," "greater than," and "less than." | OA |
| associatedSubscriptionID | 0:1 | RW | May only be applicable for Observe mode. It indicates the URI of <subscription> resource at the SRH which has been created by the DRH for observing the source resource. This <subscription> is a child resource of the source resource involved in <linkBindingInstance>. | OA |
| resumeConditions | 0:1 | RW | Indicates the condition for resuming a "suspended" <linkBindingInstance>. This attribute may only be present when retrieving <linkBindingInstance>/suspend to suspend a link binding. | |
| linkBindingStatus | 1 | RO | Indicates the status of <linkBindingInstance> which could be "created," "suspended," or "resumed." When <linkBindingInstance> is created, the Hosting CSE sets this attribute to "created"; when <linkBindingInstance> is suspended, the Hosting CSE sets this attribute to "suspended"; when <linkBindingInstance> is resumed, the Hosting CSE sets this attribute to "resumed." Only a "created" or a "resumed" <linkBindingInstance> takes in effect (e.g., trigger periodically content synchronization from the SRH to the DRH). | OA |

Figure 38:
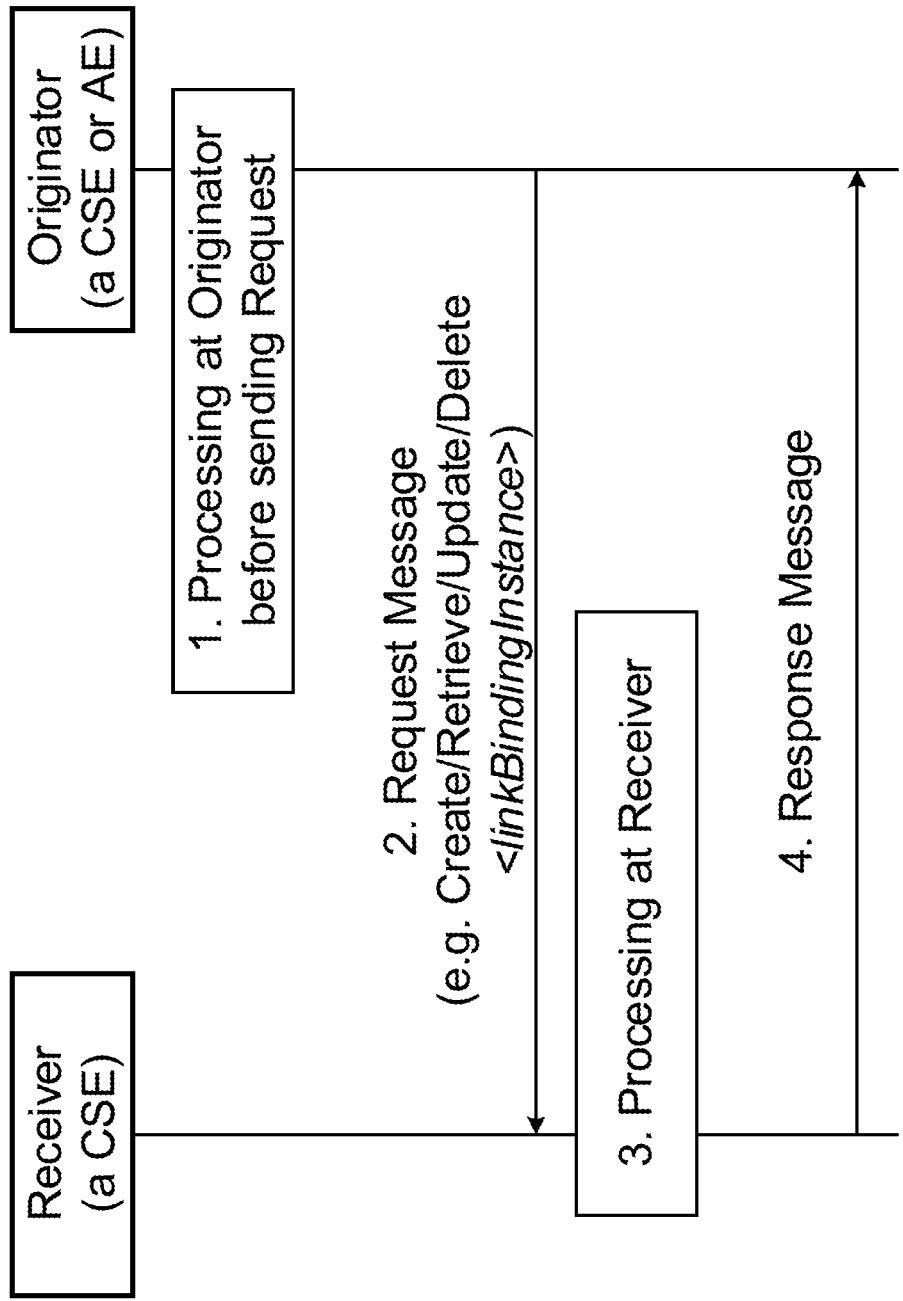
FIG. 38 shows example procedures for operating a <linkBindingInstance> Resource.

FIG. 38 illustrates an example procedure to operate a <linkBindingInstance> resource (e.g., Create/Retrieve/Update/Delete a <linkBindingInstance> resource). The Originator can be a CSE or an AE (e.g., LBC, DRH, or SRH), while the Receiver may be a CSE (e.g., DRH or SRH). Detail descriptions are provided, for example, in Table 12, Table 13, Table 14, and Table 15, respectively.

Create <linkBindingInstance>

This procedure may be used for creating/enforcing a <linkBindingInstance> resource as described in Table 12.

TABLE 12

| | <linkBindingInstance> CREATE<br><linkBindingInstance> CREATE |
|---|---|
| Associated Reference Point | Mca, Mcc and Mcc'. |
| Information in Request message | All parameters defined in Table 8.1.2-3 in oneM2M-TS-0001 apply with the specific details for:<br>Content: The resource content may provide the information about a <linkBindingInstance> resource (e.g., attribute values) as described herein. |
| Processing at Originator before sending Request | According to clause 10.1.1.1 in oneM2M-TS-0001. If the Originator knows sourceResourceType or destinationResourceType, it can include them in the Request message. |
| Processing at Receiver | According to clause 10.1.1.1 in oneM2M-TS-0001.<br>If the parent resource is the destination resource, the Receiver may contact another Hosting CSE which hosts the source resource for verifying/confirming/indicating whether this link binding should be created and what the appropriate binding attributes are.<br>If the parent resource is the source resource, the Receiver may contact other Hosting CSEs which host destination resources for verifying/confirming/indicating whether this link binding should be created and what the appropriate binding attributes are.<br>Then, the Receiver waits for response from other Hosting CSEs. Based on their responses, the Receiver decides the appropriate values for binding attributes. |

TABLE 12-continued

| <linkBindingInstance> CREATE | |
| --- | --- |
| <linkBindingInstance> CREATE | |
| Information in Response message | If the link binding method contained in Request message is "Observe," the Receiver may contact another Hosting CSE (e.g., a SRH) which hosts the source resource to create a <subscription> child resource under the source resource. Then, the Receiver sets associatedSubscriptionID attribute of <linkBindingInstance> to be created to the URI of this <subscription>. After <linkBindingInstance> is created, the Receiver sets its linkBindingStatus attribute to "Created." All parameters defined in Table 8.1.3-1 in oneM2M-TS-0001 apply with the specific details for: Content: Address of the created <linkBindingInstance> resource according to clause 10.1.1.1 in oneM2M-TS-0001. |
| Processing at Originator after receiving Response | According to clause 10.1.1.1 in oneM2M-TS-0001. |
| Exceptions | According to clause 10.1.1.1 in oneM2M-TS-0001. |

Retrieve <linkBindingInstance>

This procedure may be used for retrieving the attributes of a <linkBindingInstance> resource as described in Table 13.

TABLE 13

| <linkBindingInstance> RETRIEVE | |
| --- | --- |
| <linkBindingInstance> RETRIEVE | |
| Associated Reference Point | Mca, Mcc and Mcc'. |
| Information in Request message | All parameters defined in Table 8.1.2-3 in oneM2M-TS-0001 apply with the specific details for: Content: void. |
| Processing at Originator before sending Request | According to clause 10.1.2 in oneM2M-TS-0001. |
| Processing at Receiver | The Receiver may verify the existence (including Filter Criteria checking, if it is given) of the target resource or the attribute and check if the Originator has appropriate privileges to retrieve information stored in the resource/attribute. Otherwise clause 10.1.2 in oneM2M-TS-0001 may apply. |
| Information in Response message | All parameters defined in Table 8.1.3-1 in oneM2M-TS-0001 apply with the specific details for: Content: attributes of the <linkBindingInstance> resource as described herein. |
| Processing at Originator after receiving Response | According to clause 10.1.2 in oneM2M-TS-0001. |
| Exceptions | According to clause 10.1.2 in oneM2M-TS-0001. |

Update <linkBindingInstance>

This procedure as described in Table 14 may be used to update an existing <linkBindingInstance>, e.g., an update to its sourceResourceURI or destinationResourceURI attribute.

TABLE 14

| <linkBindingInstance> UPDATE | |
| --- | --- |
| <linkBindingInstance> UPDATE | |
| Associated Reference Point | Mca, Mcc and Mcc'. |
| Information in Request message | All parameters defined in Table 8.1.2-3 in oneM2M-TS-0001 apply with the specific details for: Content: attributes of the <linkBindingInstance> resource as defined described herein. |
| Processing at Originator before sending Request | According to clause 10.1.3 in oneM2M-TS-0001. |
| Processing at Receiver | According to clause 10.1.3 in oneM2M-TS-0001. If the updated attribute is destinationResourceURI, the Receiver may contact new Hosting CSEs which hosts new destination |

TABLE 14-continued

| | |
|---|---|
| | <linkBindingInstance> UPDATE |
| | <linkBindingInstance> UPDATE |
| | resources for verification, confirmation, and indication. |
| | If the updated attribute is sourceResourceURI, the Receiver may contact the new Hosting CSE which hosts the new source resource for verification, confirmation, and indication. |
| | If the updated attribute is bindingAttributes, the Receiver may contact another Hosting CSE which hosts the source resource (for Poll/Observe mode) or Hosting CSEs which hosts destination resources (for Push) mode for verification, confirmation, and indication. |
| | If linkBindingMethod attribute is "Observe," the Receiver may contact another Hosting CSE (e.g., a SRH) to update the associated <subscription> resource as denoted by the <associatedSubscriptionID> attribute according to new binding attributes contained in Request message. |
| Information in Response message | According to clause 10.1.3 in oneM2M-TS-0001. |
| Processing at Originator after receiving Response | According to clause 10.1.3 in oneM2M-TS-0001. |
| Exceptions | According to clause 10.1.3 in oneM2M-TS-0001. |

Delete <linkBindingInstance>

This procedure as described in Table 15 may be used to delete an existing <linkBindingInstance>.

TABLE 15

| | |
|---|---|
| | <linkBindingInstance> DELETE |
| | <linkBindingInstance> DELETE |
| Associated Reference Point | Mca, Mcc and Mcc'. |
| Information in Request message | All parameters defined in Table 8.1.2-3 in oneM2M-TS-0001 apply. |
| Processing at Originator before sending Request | According to clause 10.1.4.1 in oneM2M-TS-0001. |
| Processing at Receiver | According to clause 10.1.4.1 in oneM2M-TS-0001. |
| | The Receiver may contact another Hosting CSE which hosts the source resource or the destination resource to inform the removal of this <linkBindingInstance>. Accordingly, another Hosting CSE may delete or update those binding-related attributes (in Table 1) being added to the source resource and the destination resource. |
| | If linkBindingMethod attribute is "Observe," the Receiver may contact another Hosting CSE (e.g., a SRH) to delete the associated <subscription> resource as denoted by the <associatedSubscriptionID> attribute. |
| Information in Response message | According to clause 10.1.4.1 in oneM2M-TS-0001. |
| Processing at Originator after receiving Response | According to clause 10.1.4.1 in oneM2M-TS-0001. |
| Exceptions | According to clause 10.1.4.1 in oneM2M-TS-0001. |

Retrieve <linkBindingInstance>/suspend

This procedure may be used for request to suspend a link binding as denoted by the <linkBindingInstance> resource as described in Table.

TABLE 16

| | |
|---|---|
| | <linkBindingInstance>/suspend RETRIEVE |
| | <linkBindingInstance>/suspend RETRIEVE |
| Associated Reference Point | Mca, Mcc and Mcc'. |
| Information in Request message | All parameters defined in Table 8.1.2-3 in oneM2M-TS-0001 apply with the specific details for:<br>Content: resumeConditions. This message may contain resumeConditions to indicate some conditions for resuming <linkBindingInstance> in the future after it is suspend. |

TABLE 16-continued

| | <linkBindingInstance>/suspend RETRIEVE<br><linkBindingInstance>/suspend RETRIEVE |
|---|---|
| Processing at Originator before sending Request | According to clause 10.1.2 in oneM2M-TS-0001. |
| Processing at Receiver | The Receiver may verify the existence (including Filter Criteria checking, if it is given) of the target resource or the attribute and check if the Originator has appropriate privileges to retrieve information stored in the resource/attribute. Otherwise clause 10.1.2 in oneM2M-TS-0001 applies.<br>If the Originator is allowed to perform this operation as contained in the Request message, the Receiver may check linkBindingStatus attribute:<br>If linkBindingStatus is "Created" or "Resumed," the Receiver suspends the <linkBindingInstance> by setting its linkBindingStatus to "Suspended." Then the Receiver copies resumeConditions contained in the Request message to resumeConditions attribute.<br>If linkBindingStatus is "Suspended," the Receiver copies resumeConditions contained in the Request message to resumeConditions attribute.<br>If the Originator is allowed to perform this operation as contained in the Request message, the Receiver also checks linkBindingMethod attribute:<br>If linkBindingMethod attribute is "Observe," the Receiver contacts another Hosting CSE to pause or cancel the <subscription> resource as denoted by the <associatedSubscriptionID> attribute. |
| Information in Response message | All parameters defined in Table 8.1.3-1 in oneM2M-TS-0001 simply apply with the specific details for:<br>Content: response codes for indicating if the link binding suspension operation has been successfully performed or not. |
| Processing at Originator after receiving Response | According to clause 10.1.2 in oneM2M-TS-0001. |
| Exceptions | According to clause 10.1.2 in oneM2M-TS-0001. |

Retrieve <linkBindingInstance>/resume

This procedure may be used for request to resume a link binding as denoted by the <linkBindingInstance> resource as described in Table.

TABLE 17

| | <linkBindingInstance>/resume RETRIEVE<br><linkBindingInstance>/resume RETRIEVE |
|---|---|
| Associated Reference Point | Mca, Mcc and Mcc'. |
| Information in Request message | All parameters defined in Table 8.1.2-3 in oneM2M-TS-0001 apply with the specific details for:<br>Content: void. |
| Processing at Originator before sending Request | According to clause 10.1.2 in oneM2M-TS-0001. |
| Processing at Receiver | The Receiver may verify the existence (including Filter Criteria checking, if it is given) of the target resource or the attribute and check if the Originator has appropriate privileges to retrieve information stored in the resource/attribute. Otherwise clause 10.1.2 in oneM2M-TS-0001 applies.<br>If the Originator is allowed to perform this operation as contained in the Request message, the Receiver checks linkBindingStatus attribute:<br>If linkBindingStatus is "Suspended," the Receiver resumes the <linkBindingInstance> by setting its linkBindingStatus to "Resumed." Then, if linkBindingMethod attribute is "Observe," the Receiver may contact another Hosting CSE to resume or recreate the <subscription> resource as denoted by the <associatedSubscriptionID> attribute. |
| Information in Response message | All parameters defined in Table 8.1.3-1 in oneM2M-TS-0001 apply with the specific details for:<br>Content: response codes for indicating if the link binding restoration operation has been successfully performed or not. |
| Processing at Originator after receiving Response | According to clause 10.1.2 in oneM2M-TS-0001. |
| Exceptions | According to clause 10.1.2 in oneM2M-TS-0001. |

In W3C WoT architecture, a device and/or a thing may be modelled as a WoT Servient. The resources hosted on the device (e.g., WoT Servient) may be described as Properties in a TD document; for example, each resource can be described as a Property in the TD document. The resources hosted on the WoT servient could be source resource or a destination resource. Accordingly, a WoT Servient could be SRH or a DRH. In addition, TD repository in WoT architecture could correspond to the RR in LBM Architecture B. LBC and RC in LBM architectures can be a WoT Client.

The following example embodiments are described to expand TD to support link binding and related functions:

TD Embodiment 1: Describe New Resource Attributes in TD

The following new terms or vocabularies may be used to describe bind-related attributes for a resource hosted on the WoT Servient and described in a TD document.

linkBindingRole: Indicates the link binding role of the resource being described in the TD. For example, this resource could be a source resource, a destination resource, either of source resource or a destination resource, or neither of them if it may not be involved in a link binding. As a result, the value of this parameter could be: sourceResourceRole, destinationResourceRole, eitherSourceOrDestinationRole, or noRole.

boundToResourceType: Indicates the type of resources which this described resource can be bound to. If the described resource is a source resource (e.g., linkBindingRole="sourceResourceRole"), this term may mean the type of destination resources. If the described resource is a destination resource (e.g., linkBindingRole="destinationResourceRole"), this term may mean the type of source resources. This term may not be needed if linkBindingRole="noRole."

supportedLinkBindingAttributes: Indicates the potential link binding attributes which this described resource can support or prefer to support. For example, this parameter may indicate if this described resource supports Poll, Observe, and/or Push mode. For each binding mode, this parameter may also contain supported and/or preferred values of other binding attributes such as, but not limited to, "maximum period," "minimum period," "change step," "greater than," and "less than."

TD Embodiment 2: Describe Link Bindings in TD

The following new terms or vocabularies may be used to describe created/enforced link bindings which a resource on the WoT Servient is involved (as either a source resource or a destination resource).

linkBindingURI: Indicates the URI of each created/enforced link binding for this described resource.

linkBindingAttributes: Indicates binding attributes of each created/enforced link binding for this described resource. This term may contain the following parameters:

linkBindingMethod; Indicates the binding method of a link binding;

destinationResourceType: Indicates the type of the destination resource in the link binding. If the described resource is a destination resource, this parameter may not be needed;

destinationResourceType: Indicates the type of the destination resource in a link binding. If the described resource is a destination resource, this parameter may not be needed;

destinationResourceURI: Indicates the URI of the destination resource in a link binding. If the described resource is a destination resource, this parameter may not be needed;

sourceResourceType: Indicates the type of the source resource in a link binding. If the described resource is a source resource, this parameter may not be needed;

sourceResourceURI: Indicates the URI of the source resource in a link binding. If the described resource is a source resource, this parameter may not be needed;

numOfDestinationResources: Indicate the number of destination resources which the described resource has been bound to. If the described resource is a destination resource, this parameter may not be needed; and numOfSourceResources: Indicate the number of source resources which the described resource has been bound to. If the described resource is a source resource, this parameter may not be needed.

Then, procedures described herein can be mapped to W3C WoT architecture as follows. Note that other mapping alternatives may be possible too.

For LBM Architecture A—RC maps to WoT Client; DRH and SRH maps to WoT Servient; LBC maps to WoT Client or WoT Servient.

For LBM Architecture B—RR maps to TD Repository; DRH and SRH maps to WoT Servient; LBC maps to WoT Client or WoT Servicent.

Assume there are two WoT Servient: WoT Servient1 and WoT Servient2. Each WoT Servient has some resources which have been described with link binding terms as described herein. Their TD documents show that WoT Servient1 maintains source resources while WoT Servient2 hosts destination resources.

WoT Servient1 and WoT Servient2 register their TD documents to a TD repository using the procedure in FIG. 31.

WoT Servient1 and WoT Servient2 discover each other's TD document from the TD repository. Now, both know binding-related terms for each described resource and figure out that WoT Servient1 is a SRH and WoT Servient2 is a DRH according to "linkBindingRole."

Assume WoT Servient2 finds a source resource S1 from WoT Servient1's TD and S1 supports Push mode. Also assume WoT Servient2 has a destination resource D1 which supports Push mode as well.

Then, using the link binding creation procedure in FIG. 16 (by removing LBC), WoT Servient2 can directly create a link binding from S1 to D1 by updating WoT Servient1's TD document; this is done by adding "linkBindingAttributes" term to WoT Servient1's TD document.

After this is done, WoT Servient1 uses link binding registration procedure in FIG. 34 in to register its updated TD including the newly created link binding by WoT Servient2 to the TD repository.

Then, using the binding-aware content synchronization procedure in FIG. 18, WoT Servient1 as the SRH push the representation of its S1 resource to D1 resource hosted at WoT Servient2 as the DRH.

Figure 39:
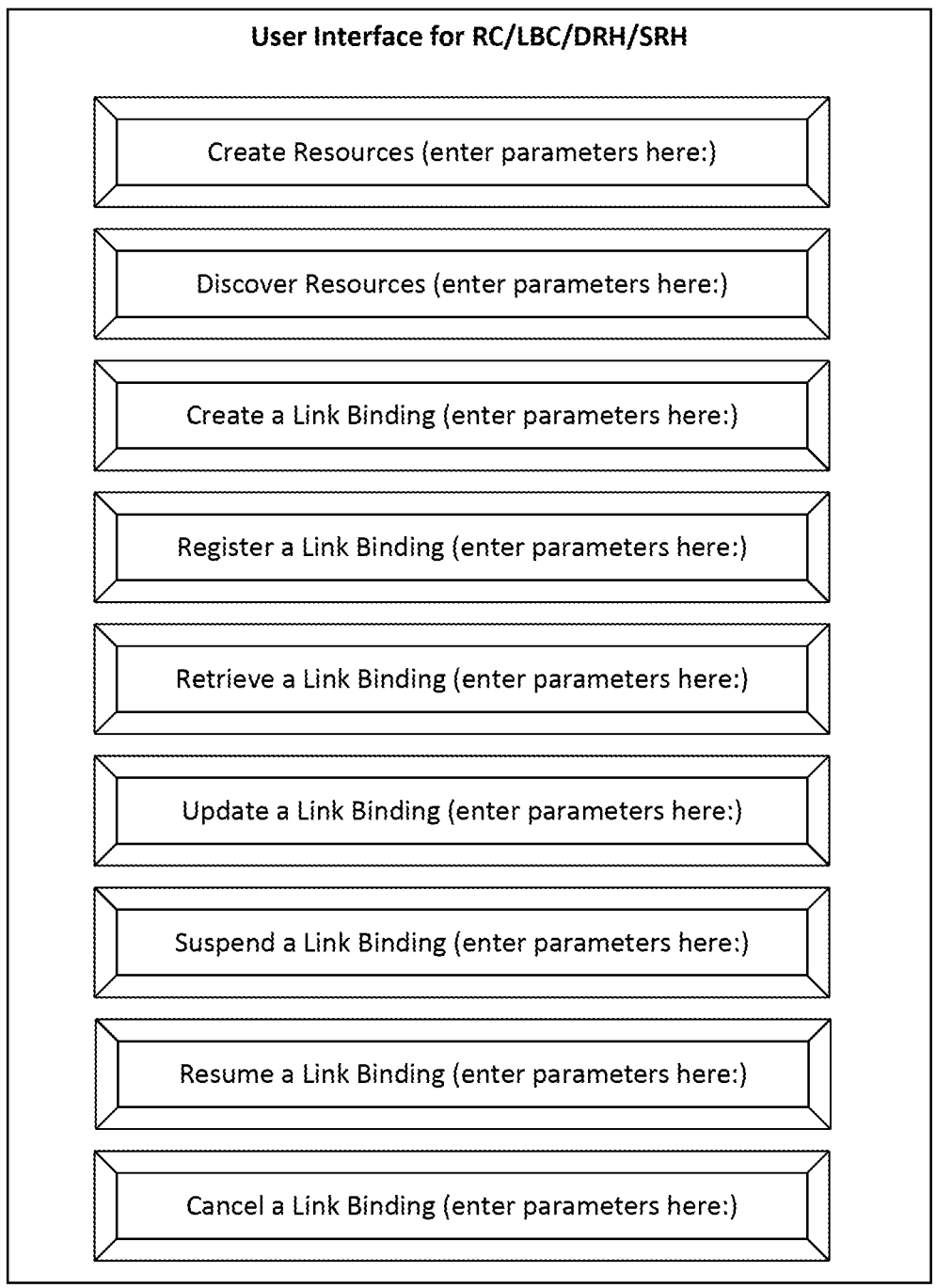
FIG. 39 shows an example user interface for RC/LBC/DRH/SRH.

FIG. 39 shows an example user interface for a RC, a LBC, a DRH, and/or a SRH. This user interface provides some buttons for a user to trigger the following actions. For each action, the user may input certain necessary parameters which are required for each procedure described herein, for example:

To create a source resource at a SRH or a destination resource at a DRH.

To discover source resources, destination resources, link binding recommendations, and created link bindings.

To create a link binding at a DRH or a SRH.

To register a link binding to a RR.

To update a link binding created at a DRH or a SRH.

To retrieve the representation of a link binding from a DRH or a SRH

To cancel a link binding created at a DRH or a SRH.

When such an RC, LBC, DRH, or SRH is implemented using one of the apparatus architectures of FIGS. 3 and 4, the user interface may be displayed, for example, on display 42 or display 86.

Figure 40A:
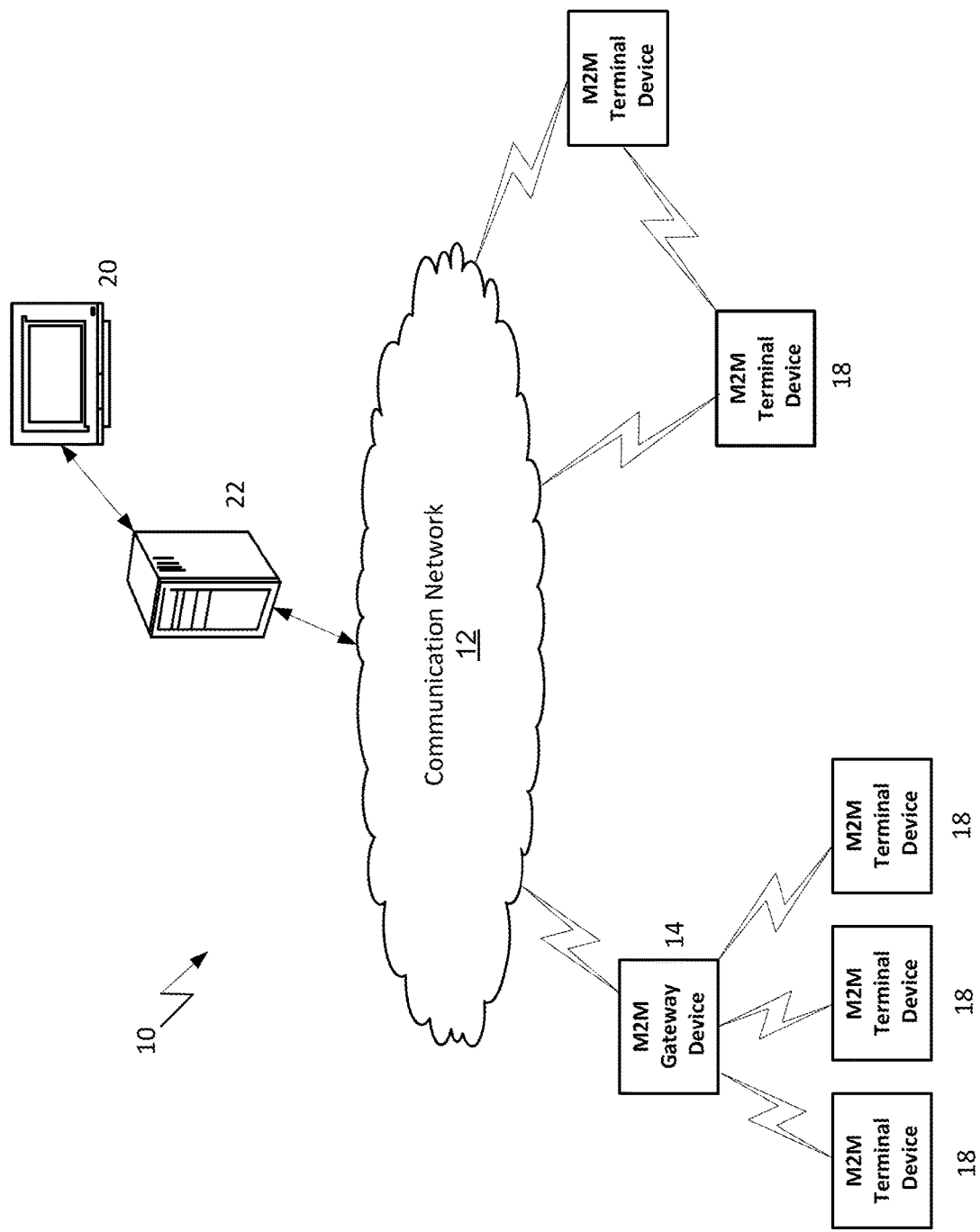
FIG. 40A shows an example system diagram of an example machine-to-machine (M2M) or Internet of Things (IoT) communication system in which one or more disclosed embodiments may be implemented.
Figure 40B:
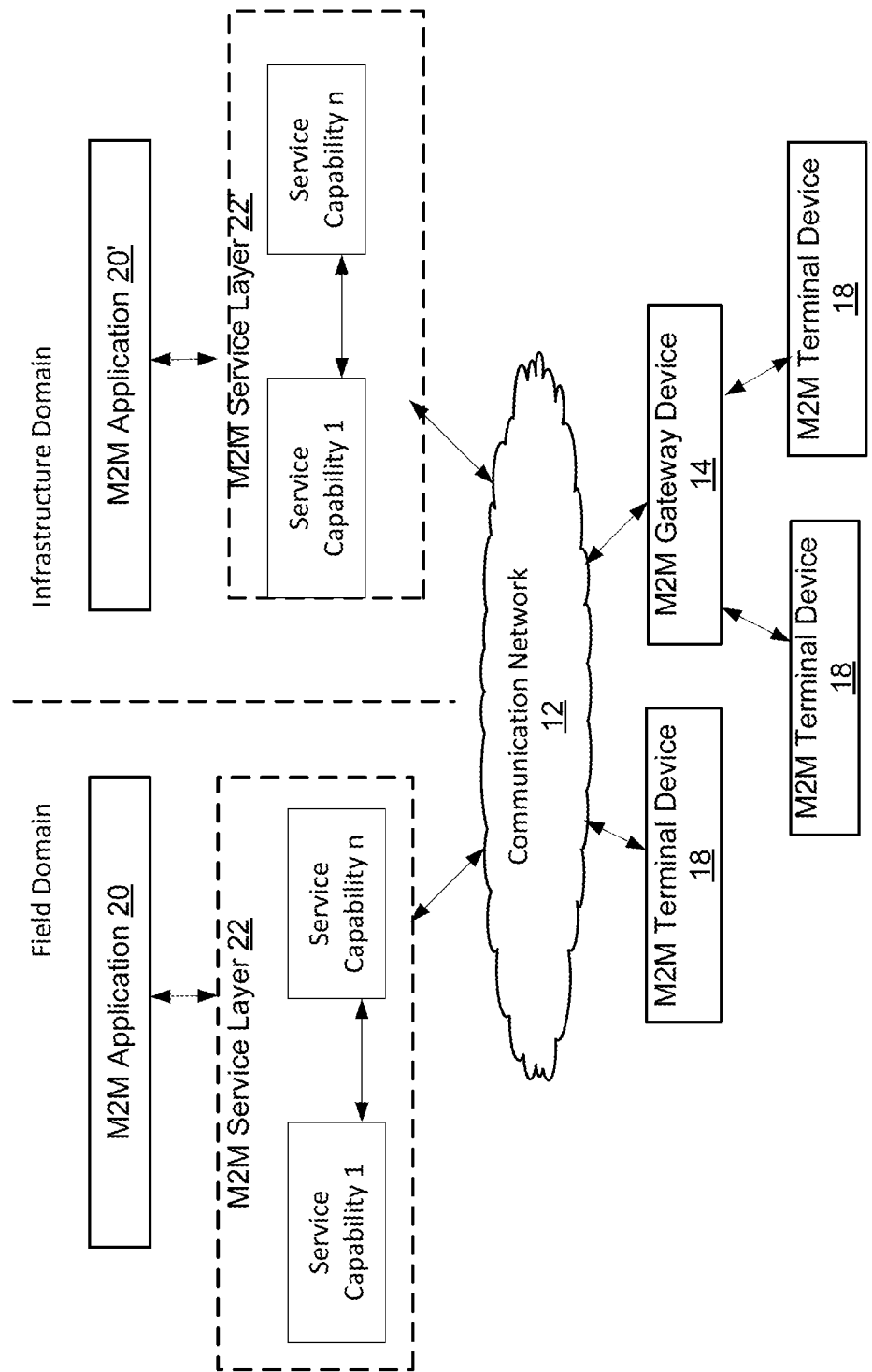
FIG. 40B shows an example system diagram of an example architecture that may be used within the M2M/IoT communications system illustrated in FIG. 40A.
Figure 40C:
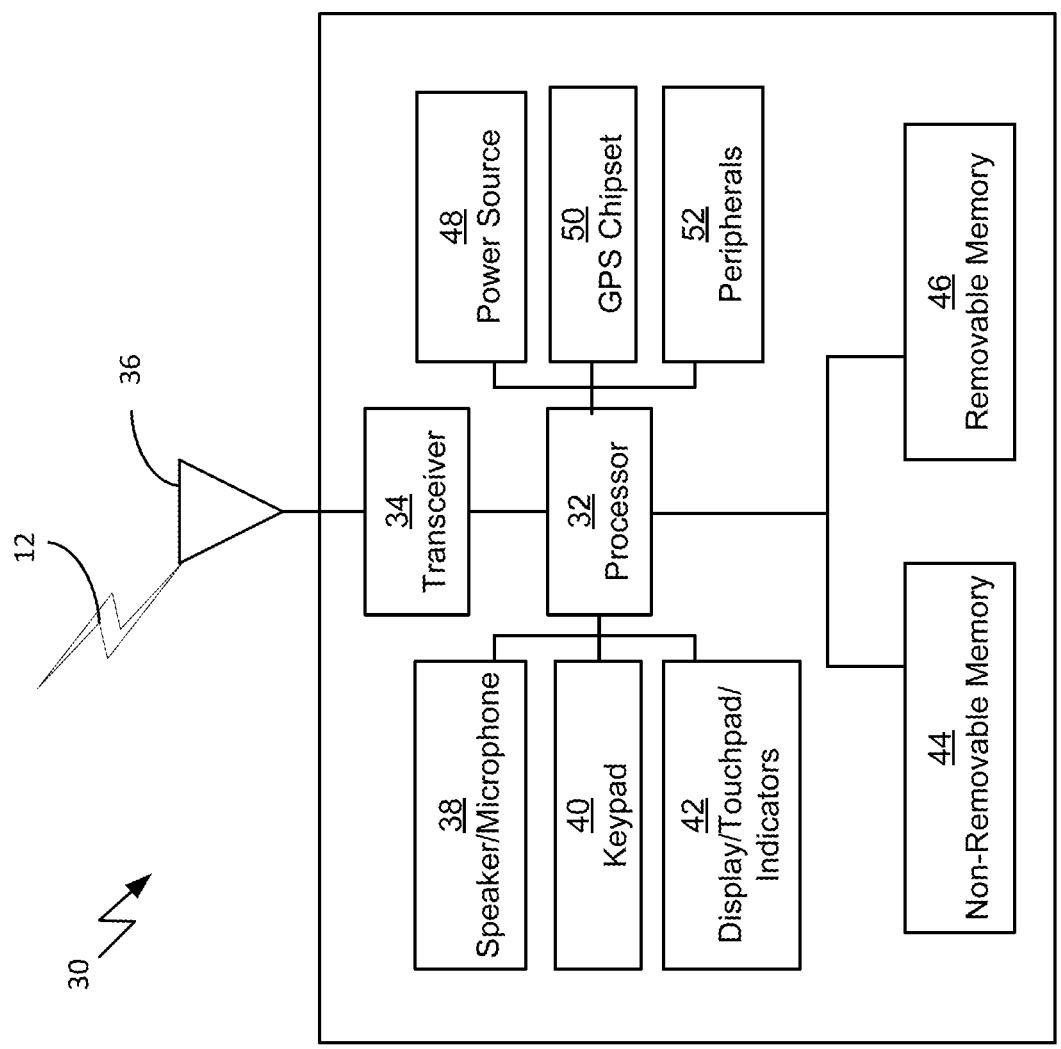
FIG. 40C shows an example system diagram of an example M2M/IoT terminal or gateway device that may be used within the communications system illustrated in FIG. 40A.
Figure 40D:
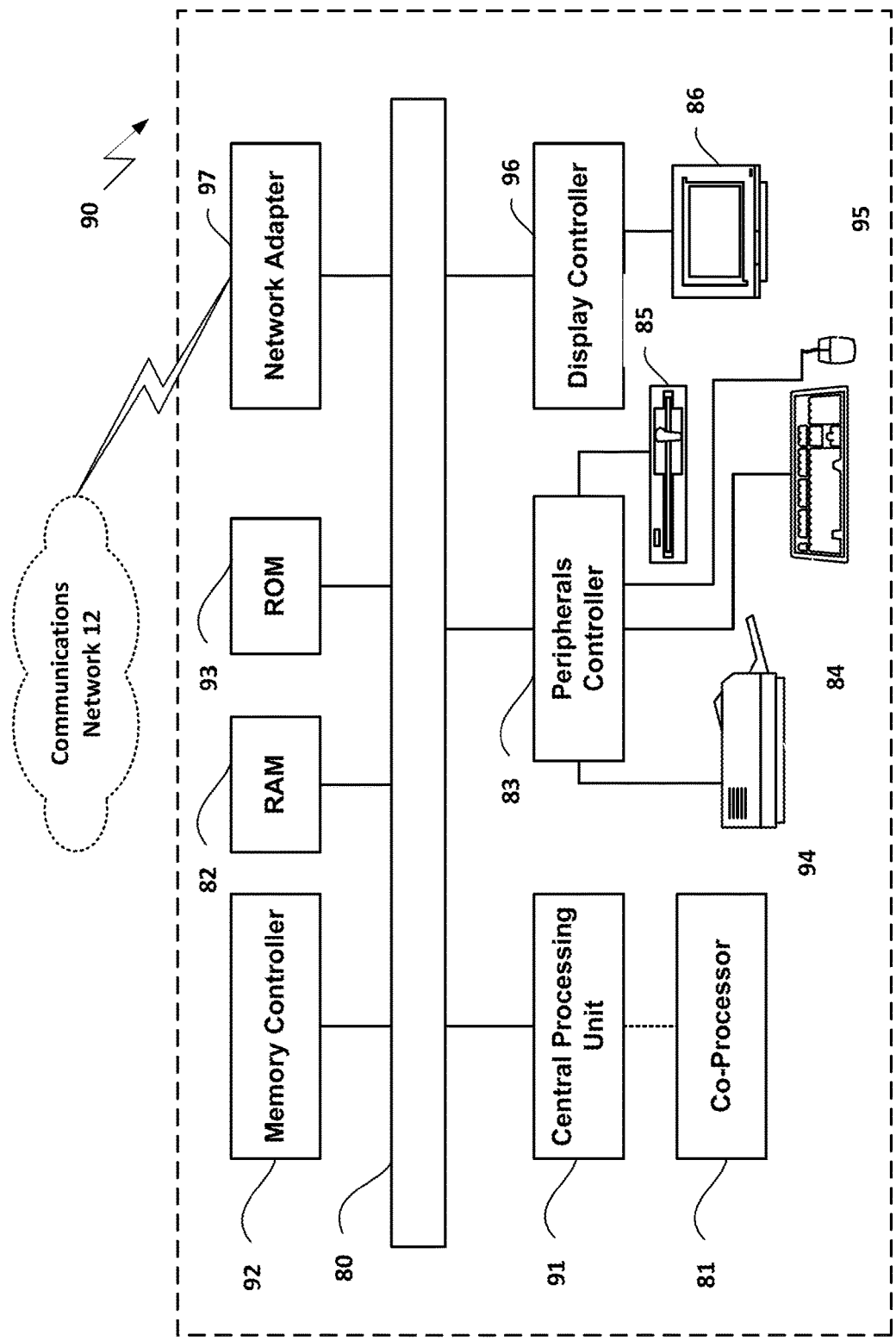
FIG. 40D shows an example block diagram of an example computing system in which aspects of the communication system of FIG. 40A may be embodied.

Any of the entities performing the steps illustrated in FIGS. 1-39, such as the service layer, service layer device, service layer application, application entity, and the like, may be logical entities that may be implemented in the form of software (i.e., computer-executable instructions) stored in a memory of, and executing on a processor of, an apparatus configured for wireless and/or network communications or a computer system such as those illustrated in FIG. 40C or FIG. 40D. That is, the method(s) illustrated in FIGS. 1-39 may be implemented in the form of software (i.e., computer-executable instructions) stored in a memory of an apparatus, such as the apparatus or computer system illustrated in FIG. 40C or FIG. 40D, which computer executable instructions, when executed by a processor of the apparatus, perform the steps illustrated in FIGS. 1-39. It is also understood that any transmitting and receiving steps illustrated in FIGS. 1-39 may be performed by communication circuitry of the apparatus/entity under control of the processor of the apparatus and the computer-executable instructions (e.g., software) that it executes.

FIG. 40A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or apparatus of the IoT/WoT as well as an IoT/WoT Service Layer, etc. Any of the entities illustrated in any of FIGS. 1-39 may comprise a network apparatus of a communication system, such as the ones illustrated in FIGS. 40A-40D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above-mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 40A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 40A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network apparatuses (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link.

A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Example M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 40B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more network apparatuses of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more network apparatuses of the network, which may comprise servers, computers, devices, virtual machines (e.g., cloud computing/storage farms, etc.) or the like.

Referring also to FIG. 40B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other network apparatuses of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 40B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network apparatus (e.g., server, computer, gateway, device or the like) having the general architecture illustrated in FIG. 40C or FIG. 40D described below.

Further, the methods and functionalities described herein may be implemented as part of an M2M network that uses a Service Oriented Architecture (SOA) and/or a Resource-Oriented Architecture (ROA) to access services.

From a deployment perspective, a service layer can be deployed on various types of network nodes including servers, gateways and devices as shown in the various figures herein. Any such node, server, gateway, device, apparatus, or other logical entity of a communications network that implements service layer functionality or otherwise incorporates an instance of a service layer may be referred to herein as a service layer entity.

FIG. 40C is a block diagram of an example hardware/software architecture of an apparatus of a network, such as one of the entities illustrated in FIGS. 1-39, which may operate as an M2M server, gateway, device, or other network apparatus in an M2M network such as that illustrated in FIGS. 40A and 40B. As shown in FIG. 40D, the network apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The network apparatus 30 may also include communication circuitry, such as a transceiver 34 and a transmit/receive element 36. It will be appreciated that the network apparatus 30 may include any sub-combination of the foregoing elements while remaining consistent with an embodiment. This network apparatus may be an apparatus that implements the methods for service layer resource link binding management, such as the methods operations illustrated and described in relation to FIGS. 1-39.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the network apparatus in order to perform the various required functions of the network apparatus. For example, the processor 32 may perform signal coding, data processing, power control, input/output processing, and/or any other functionality that enables the network apparatus 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 40C, the processor 32 is coupled to its communication circuitry (e.g., transceiver 34 and transmit/receive element 36). The processor 32, through the execution of computer executable instructions, may control the communication circuitry in order to cause the network apparatus 30 to communicate with other network apparatuses via the network to which it is connected. In particular, the processor 32 may control the communication circuitry in order to perform the transmitting and receiving steps described herein (e.g., in FIGS. 1-39) and in the claims. While FIG. 40C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other network apparatuses, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 40C as a single element, the network apparatus 30 may include any number of transmit/receive elements 36. More specifically, the network apparatus 30 may employ MIMO technology. Thus, in an embodiment, the network apparatus 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the network apparatus 30 may have multi-mode capabilities. Thus, the transceiver 34 may include multiple transceivers for enabling the network apparatus 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the network apparatus 30, such as on a server or a home computer. The processor 32 may be configured to control lighting patterns, images, or colors on the display or indicators 42 to reflect the status of an apparatus or configure an apparatus, and in particular underlying networks, applications, or other services in communication with the network apparatus. In one embodiment, the display/indicators 42 may present the graphical user interface illustrated in FIG. 40D and described herein.

The processor 32 may receive power from the power source 48, and may be configured to distribute and/or control the power to the other components in the network apparatus 30. The power source 48 may be any suitable device for powering the network apparatus 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the network apparatus 30. It will be appreciated that the network apparatus 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The network apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The network apparatus 30 may connect to other components, modules, or systems of such apparatuses or devices via one or more interconnect interfaces, such as an interconnect interface that may comprise one of the peripherals 52.

FIG. 40C is a block diagram of an example computing system 90 which may also be used to implement one or more network apparatuses of a network, such as the entities illustrated in FIGS. 1-39 and described herein, which may operate as an M2M server, gateway, device, or other network apparatus in an M2M network such as that illustrated in FIGS. 40A and 40B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 40D and its accompanying description.

Further, computing system 90 may contain communication circuitry, such as for example a network adaptor 97, that may be used to connect computing system 90 to an external communications network, such as network 12 of FIG. 40A-40D, to enable the computing system 90 to communicate with other apparatuses of the network. The communication circuitry, alone or in combination with the CPU 91, may be used to perform the transmitting and receiving steps described herein (e.g., in FIGS. 1-39) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service layer technologies that may appear in the above description. Unless otherwise specified, the acronyms used herein refer to the corresponding term listed below:

AE Application Entity
CSE Common Service Entity
CSF Common Service Function
CoAP Constrained Application Protocol
CoRE Constrained RESTful Environment
DRH Destination Resource Host
HTTP HyperText Transfer Protocol
IETF Internet Engineering Task Force
IoT Internet of Things
LBC Link Binding Coordinator
LBM Link Binding Management
M2M Machine-to-Machine
OCF Open Connectivity Foundation
OIC Open Interconnection Consortium
RC Resource Creator
REST Representational State Transfer
RR Resource Repository
SRH Source Resource Host
TD Thing Description
UDP User Datagram Protocol
URI Uniform Resource Identifier
W3C World Wide Web Consortium
WoT Web of Things This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

It is understood that any of the methods and processes described herein may be embodied in the form of computer executable instructions (i.e., program code) stored on a computer-readable storage medium which instructions, when executed by a machine, such as a computer, server, M2M terminal/device, M2M gateway, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. A method performed by a first device, the method comprising:
    receiving a request to create a link binding entry defining a link binding, wherein the link binding is a unidirectional binding relationship from a source resource to a destination resource, the request to create the link binding entry comprising one or more link binding attributes;
    generating a link binding Uniform Resource Identifier (URI) associated with the link binding entry;
    sending, to a second device, a link binding notification, the link binding notification comprising an indication of the one or more link binding attributes;
    receiving, from the second device, a response to the link binding notification, the response to the link binding notification comprising an indication that one or more of the link binding attributes has been approved; and
    creating, based on receiving the response to the link binding notification, a link binding entry comprising the link binding URI.

2. The method of claim 1, wherein the request to create the link binding entry is received from a link binding controller.

3. The method of claim 1, further comprising:
    receiving a request to update one or more link binding attributes of the link binding entry; and
    updating, based on receiving the request to update the one or more link binding attributes of the link binding entry, the one or more link binding attributes of the link binding entry.

4. The method of claim 1, further comprising performing one or more of:
    suspending the link binding entry;
    restoring the link binding entry; and
    canceling the link binding entry.

5. The method of claim 1, further comprising sending, to a resource creator, the created link binding entry and the associated link binding URI.

6. The method of claim 1, wherein the response to the link binding notification comprises an indication of at least one reason that the request to create the link binding entry was approved or rejected.

7. The method of claim 1, wherein the link binding notification further comprises the link binding URI.

8. A first device comprising a processor and a memory, the memory storing computer-executable instructions which, when executed by the processor, cause the first device to perform operations comprising:
    receiving a request to create a link binding entry defining a link binding, wherein the link binding is a unidirectional binding relationship from a source resource to a destination resource, the request to create the link binding entry comprising one or more link binding attributes;
    generating a link binding Uniform Resource Identifier (URI) associated with the link binding entry;
    sending, to a second device, a link binding notification, the link binding notification comprising an indication of the one or more link binding attributes;
    receiving, from the second device, a response to the link binding notification, the response to the link binding notification comprising an indication that one or more of the link binding attributes has been approved; and
    creating, based on receiving the response to the link binding notification, a link binding entry comprising the link binding URI.

9. The first device of claim 8, wherein the request to create the link binding entry is received from a link binding controller.

10. The first device of claim 8, wherein the instructions when executed further cause the first device to perform operations comprising:
    receiving a request to update one or more link binding attributes of the link binding entry; and
    updating, based on receiving the request to update the one or more link binding attributes of the link binding entry, the one or more link binding attributes of the link binding entry.

11. The first device of claim 8, wherein the instructions when executed further cause the first device to perform operations comprising performing one or more of:
    suspending the link binding entry;
    restoring the link binding entry; and
    canceling the link binding entry.

12. The first device of claim 8, wherein the instructions when executed further cause the first device to perform operations comprising sending, to a resource creator, the created link binding entry and the associated link binding URI.

13. The first device of claim 8, wherein the response to the link binding notification comprises an indication of at least one reason that the request to create the link binding entry was approved or rejected.

14. The first device of claim 8, wherein the link binding notification further comprises the link binding URI.

15. A computer-readable storage medium comprising computer-executable instructions which, when executed by a processor of a first device, cause the first device to perform operations comprising:
    receiving a request to create a link binding entry defining a link binding, wherein the link binding is a unidirectional binding relationship from a source resource to a destination resource, the request to create the link binding entry comprising one or more link binding attributes;
    generating a link binding Uniform Resource Identifier (URI) associated with the link binding entry;
    sending, to a second device, a link binding notification, the link binding notification comprising an indication of the one or more link binding attributes;
    receiving, from the second device, a response to the link binding notification, the response to the link binding notification comprising an indication that one or more of the link binding attributes has been approved; and
    creating, based on receiving the response to the link binding notification, a link binding entry comprising the link binding URI.

16. The first device of claim 15, wherein the request to create the link binding entry is received from a link binding controller.

17. The first device of claim 15, wherein the instructions when executed further cause the first device to perform operations comprising:
   receiving a request to update one or more link binding attributes of the link binding entry; and
   updating, based on receiving the request to update the one or more link binding attributes of the link binding entry, the one or more link binding attributes of the link binding entry.

18. The first device of claim 15, wherein the instructions when executed further cause the first device to perform operations comprising sending, to a resource creator, the created link binding entry and the associated link binding URI.

19. The first device of claim 15, wherein the response to the link binding notification comprises an indication of at least one reason that the request to create the link binding entry was approved or rejected.

20. The first device of claim 15, wherein the link binding notification further comprises the link binding URI.

\* \* \* \* \*